(12) United States Patent
Carrieri

(10) Patent No.: US 12,111,064 B2
(45) Date of Patent: Oct. 8, 2024

(54) CLOUD BASED HVAC MANAGEMENT APPARATUS AND SYSTEM FOR AIR PURIFICATION, INDOOR AIR QUALITY MONITORING, AND METHODS FOR IMPLEMENTING THE SAME

(71) Applicant: Energy Cloud Inc., San Diego, CA (US)

(72) Inventor: John Carrieri, San Diego, CA (US)

(73) Assignee: Energy Cloud Inc., San Diego, CA (US)

( * ) Notice: Subject to any disclaimer, the term of this patent is extended or adjusted under 35 U.S.C. 154(b) by 0 days.

(21) Appl. No.: 18/138,111

(22) Filed: Apr. 23, 2023

(65) Prior Publication Data

US 2023/0383975 A1   Nov. 30, 2023

Related U.S. Application Data

(63) Continuation of application No. 17/336,100, filed on Jun. 1, 2021, now Pat. No. 11,635,221.

(60) Provisional application No. 63/033,199, filed on Jun. 1, 2020.

(51) Int. Cl.
| | |
|---|---|
| *F24F 11/39* | (2018.01) |
| *F24F 8/22* | (2021.01) |
| *F24F 11/38* | (2018.01) |
| *F24F 11/58* | (2018.01) |

(Continued)

(52) U.S. Cl.
CPC ............... *F24F 11/39* (2018.01); *F24F 8/22* (2021.01); *F24F 11/38* (2018.01); *F24F 11/58* (2018.01); *F24F 11/63* (2018.01); *F24F 2110/50* (2018.01)

(58) Field of Classification Search
CPC .......... F24F 8/22; F24F 11/30; F24F 2110/10; F24F 8/10; F24F 2110/64; F24F 11/46; F24F 2110/50; F24F 11/54; F24F 11/63; F24F 11/74; F24F 2110/66; F24F 11/0001; F24F 11/56; F24F 3/044; F24F 11/65; F24F 11/72; F24F 11/80; F24F 11/89; F24F 2110/65; F24F 11/39; F24F 2110/74; F24F 11/79; F24F 13/08; F24F 11/38; F24F 8/108; F24F 8/30; F24F 8/80; F24F 1/0007; F24F 1/0035; F24F 1/0047; F24F 11/32; Y02B 20/40; G05B 15/02;

(Continued)

(56) References Cited

U.S. PATENT DOCUMENTS

| | | |
|---|---|---|
| 5,933,702 A | 8/1999 | Goswami |
| 6,716,406 B2 | 4/2004 | Reisfeld et al. |
| 7,291,315 B2 | 11/2007 | Obee et al. |

(Continued)

*Primary Examiner* — Darrin D Dunn
(74) *Attorney, Agent, or Firm* — James Scott Nolan

(57) ABSTRACT

The present disclosure is directed to a uniquely designed air-purification, remote HVAC management, and indoor air quality monitoring system including an online cloud-based platform. In various embodiments, the air purification system is configured for generating a photocatalytic oxidation reaction so as to purify the air traversing through an HVAC unit. The system may be a locally based system that utilizes a specially designed Artificial Intelligence platform for optimizing energy efficiency, enthalpy, and air quality based on continual sensor data collection, indoor air quality measurements, and dynamically adjusted operating parameters. A fault indicator and communications display may also be included.

20 Claims, 17 Drawing Sheets

(51) Int. Cl.
*F24F 11/63* (2018.01)
*F24F 110/50* (2018.01)

(58) Field of Classification Search
CPC .......... G05B 2219/2614; G05B 19/042; G05B 13/041; G06F 1/20; G06F 2200/201; G06F 1/206
See application file for complete search history.

(56) References Cited

U.S. PATENT DOCUMENTS

| | | |
|---|---|---|
| 8,795,588 B2 | 8/2014 | Dardas et al. |
| 9,216,233 B2 | 12/2015 | Ota et al. |
| 9,468,699 B2 | 10/2016 | Park et al. |
| 9,522,210 B2 | 12/2016 | Worrilow |
| 2005/0129589 A1 | 6/2005 | Wei et al. |
| 2005/0129591 A1 | 6/2005 | Wei et al. |
| 2005/0186108 A1 | 8/2005 | Fields |
| 2006/0150818 A1* | 7/2006 | Okamoto ................. F24F 8/30 96/223 |
| 2010/0269521 A1 | 10/2010 | Moore |
| 2011/0117002 A1 | 5/2011 | Dardas et al. |
| 2011/0274588 A1 | 11/2011 | Bergeron et al. |
| 2013/0052113 A1 | 2/2013 | Molins et al. |
| 2014/0205495 A1 | 7/2014 | Ota et al. |
| 2015/0320900 A1 | 11/2015 | Goswami et al. |
| 2015/0352242 A1 | 12/2015 | Ando et al. |
| 2017/0080373 A1 | 3/2017 | Engelhard |
| 2018/0126028 A1* | 5/2018 | Engelhard ................. A61L 9/20 |
| 2018/0293864 A1* | 10/2018 | Wedig .................... G08B 25/08 |
| 2018/0373278 A1 | 12/2018 | Walser |
| 2020/0182495 A1 | 6/2020 | Park et al. |
| 2020/0268927 A1 | 8/2020 | Asano et al. |
| 2020/0269255 A1 | 8/2020 | Sung et al. |
| 2020/0282097 A1 | 9/2020 | Baldi et al. |
| 2020/0363081 A1 | 11/2020 | Park et al. |
| 2021/0010693 A1 | 1/2021 | Gamroth et al. |
| 2021/0356153 A1* | 11/2021 | Nesler ..................... F24F 11/46 |
| 2022/0062489 A1 | 3/2022 | Morgan-Lange et al. |
| 2022/0226533 A1 | 7/2022 | Worrilow |
| 2022/0234002 A1 | 7/2022 | Trent et al. |
| 2022/0305438 A1 | 9/2022 | Wenger et al. |
| 2022/0404045 A1 | 12/2022 | Park et al. |
| 2022/0412585 A1 | 12/2022 | McMillan |

* cited by examiner

406 — 405

| | |
|---|---|
| ENERGY CLOUD | |

401 — HVAC Commissioning: Create HVAC System — 402

HVAC Customer & Location Information
Customer [Select Customer ▼]
Location [Select Location ▼]

HVAC Normal Operating Hours
Operating Hours: Start Time: [Select Start Time ▼] End Time: [Select End Time ▼]
Operating Days: Monday Tuesday Wednesday Thursday Friday Saturday Sunday

403 — 404

HVAC System Information
*Bolded Items Required
Contractor*: [Select Contractor ▼]
Utility*: [Select is Landed Utility Area ▼]
Equipment*: [Select Equipment Type ▼]
Manufacturer*: [Select Equipment Manufacturer ▼]
Manufacture Date: [Select Month ▼] [Select Year ▼]
HVAC Model*: [ ]
HVAC Serial*: [ ]
System Name:*[ ] (ex. Family Room AC or AC1)
Tonnage*: [ ] (Number or decimal Only) ie. 3.5
BTU's: [Se. 42000]
TXV of Fixed Office: [TXV ▼]
Refrigerant*: [Select Refrigerant ▼]
 SEER:[ ] or EER [ ] or
Efficiency Ratings*:
 AFUE:[ ] or HSPF[ ] (Decimal)

[Create HVAC]

HVAC Power Information
Fill out Manual Power Readings. If model does not include Live Power Monitoring HVAC System Volts* [ ]
Power Phases: [Single ▼]
 Fill out either Amps or Watts
 Amps Watts
HVAC at Rest/Off: [ ] [ ]
Cooling Mode Fan Only On* [ ] [ ]
Heating Mode Fan Only On* [ ] [ ]
HVAC Compressor L1: [ ] [ ]
HVAC Compressor L2: [ ] [ ]
HVAC Compressor L3: [ ] [ ]

Power Factor measurement is required if doing Amp Measurements, and optional for watt measurements although preferred if possible, HVAC System Power Factor [ ] (ie: .92 use decimal)

Are these actual Measurement or taken from Spec. Sheet? [ ] Actual Measurements [ ] Spec. Sheet

ENERGY CLOUD

FIG. 10

CLOUD BASED HVAC MANAGEMENT APPARATUS AND SYSTEM FOR AIR PURIFICATION, INDOOR AIR QUALITY MONITORING, AND METHODS FOR IMPLEMENTING THE SAME

CROSS-REFERENCE TO RELATED APPLICATIONS

This application is a continuation of U.S. patent application Ser. No. 17/336,100, titled "CLOUD BASED HVAC MANAGEMENT APPARATUS AND SYSTEM FOR AIR PURIFICATION, INDOOR AIR QUALITY MONITORING, AND METHODS FOR IMPLEMENTING THE SAME" and filed Jun. 1, 2021, which claims priority to and the benefit of U.S. Provisional Patent Application No. 63/033,199, titled "CLOUD BASED HVAC MANAGEMENT APPARATUS AND SYSTEM FOR AIR PURIFICATION, INDOOR AIR QUALITY MONITORING AND METHODS FOR IMPLEMENTING THE SAME," and filed on Jun. 1, 2020, the disclosure of which is incorporated herein by reference in its entirety for all purposes.

FIELD OF THE INVENTION

The present disclosure is directed to the fields of air-purification systems (APS) and Heating, Ventilation, & Air Conditioning (HVAC) systems. Specifically, provided herein is a uniquely designed combined air-purification and remote HVAC management system that employs photocatalytic oxidation as a mechanism for purifying and/or conditioning air and indoor air quality monitoring system. In various embodiments, the combined air-purification and HVAC system may be a locally centered arrangement that is controllable via an online cloud-based engagement platform.

BACKGROUND

This document presents a uniquely designed combined air-purification and remote HVAC management system and indoor air quality monitoring system. Heating, Ventilation, & Air Conditioning (HVAC) as well as Refrigeration and Chilling systems are complex systems that include many features and factors that should be optimized to run efficiently, including but not limited to: air flow, refrigerant charge and pressure, duct construction and materials, fan, compressor controls and power, enthalpy output and other temperature and humidity set points and factors. The purpose of HVAC systems is to deliver conditioned air with either heat or cooling along with ventilation.

In addition to moving and bringing fresh air through a building or facility, the ventilation system also functions to expel unhealthy and/or unwanted air. In all cases, it is important for the air quality to be healthy for the inhabitants regardless of the delivered enthalpy. By default, these systems are designed with the basic functionality of heating and cooling environments with simple temperature adjustment being determined by physical manipulation of an archaic thermostat control. Present HVAC systems do not typically have the technology to keep them running efficiently, to purify the air, or to provide continual feedback as to the operational efficiency of the HVAC unit. Additionally, they do not monitor the quality of the air they are delivering. Specifically, they are not equipped with advanced air filtration, indoor air quality measurement, and do not have a live combination of system measurements for key components such as refrigerant levels, static pressure, altitude, temperature, and humidity on both the supply as well as return. Instead, they rely on individual measurements, which by themselves are not sufficient to measure and/or maintain the health and performance of the whole system.

For instance, HVAC systems are rated for efficiency based on a variety of different standards, such as SEER, EER, AFUE. While the systems might be engineered initially with the goal of providing output based on these efficiency levels, a myriad of factors can affect such system's overall performance, such as: mechanical design, ducting, filtration mediums, environmental conditions both in and outside the building, and difficulty of installation of the unit. A problem is that any of these elements that are either designed or installed incorrectly from the start can affect performance, waste energy, and deliver unhealthy air.

In addition, environmental conditions that constantly change over time, such as air quality, occupant levels in the building, static pressure and refrigerant levels of the system, which are not monitored on a continual basis and factored into the system efficiency and communicated to the building owner or facility manager, lead to a gradual degradation of performance. Often times this degradation is unknown to building owner or manager. Even periodic commissioning and tune-ups regarding charge and air flow, which are known to save energy, are not sufficient to maintain a multitude of HVAC systems. Specifically, without continual monitoring and measurement there is no way to detect a refrigerant leak which will cause energy waste, environmental damage, and potential discomfort to occupants due to premature damage and failure of the system.

Particularly, based on industry statistics and research, only 65% of commercial HVAC systems are installed and operating at their intended efficiencies, and only 57% of residential systems, respectively. The reasons for this vary from installer incompetence, poor design that does not match the final build out of the building, inadequate tools used, elements that are not factored such as altitude, or not enough final measurement and verification to ensure that the system is actually operating like it is supposed to per manufacturer specifications. In addition to potential design and installation issues, there is a natural degradation of the system over time, such as due to vibration, environmental deterioration of the components including ducting, losses of refrigerant, malfunctions of components, and potentially poor maintenance. The effects of a system not running efficiently include wasting energy, and consequently money, negatively impacting the environment from excessive energy use or by leaking refrigerants into the atmosphere, as well as a shortening the equipment life.

Further to the challenges of keeping a HVAC system running efficiently there is a need to keep the air quality healthy on a continual basis. Air quality can be affected by many factors including these unhealthy pollutants: VOC's (volatile organic compounds), particulates, excessive $CO^2$ levels, viruses, bacteria, and unhealthy gases. Volatile organic compounds can be generated from many different sources ranging from paints, furniture finishes, carpet, plastics, electronics, and many other manufactured goods. Particulate matter can be a combination of solid particles and liquid droplet pollutants such as dust, dirt, pollen, smoke, soot and mist.

Some particles can visibly be seen and others are small enough that they can only be detected using an electron microscope. These inhalable sizes ranges from $PM_{10}$ with diameters that are 10 micrometers to smaller $PM_1$ or 1 micrometer or smaller. PM2.5 or 2.5 micrometers or smaller is of primary focus and concern as this size is the most efficient at traversing filtration mediums and represents a serious health risk if inhaled in lungs. In addition, to VOC's and particulates there are many other harmful gases that need to be measured and eliminated for healthy air. Some of these gases include Ozone, CO (Carbon Monoxide), and high levels of $C0^2$ (Carbon Dioxide).

Additionally, in late 2019, COVID-19 (SARS-CoV2), an infectious respiratory illness caused by a novel (new) coronavirus threatened the human population and caused a worldwide pandemic. While the world's leading scientists and health experts have created vaccines, and surface sterilization techniques and products exist, there remain substantial risks of escalation of transmission of the virus through the air. Additional analysis and information are being collected daily, but current study and data indicate COVID-19 can remain in the air for up to 3 hours. Further analysis has also shown SARS-CoV2 can be further spread throughout buildings via the HVAC system. Part of this invention's testing further showed that SARS-CoV2 can survive in HVAC systems, even in extreme air velocities of up to 50 miles per hour.

While the world's mechanical engineers and professional organizations such as ASHRAE gave revised guidance to mitigate the airborne transmission risks by increasing outside air concentration and/or increasing the density of filtration media such as higher MERV levels or HEPA filtration, these measures by themselves would tax already strained existing HVAC systems. If an existing HVAC system was already challenged with keeping up with its heating or cooling requirements, adding additional outside air in to either heat or cool, depending on the season, would overburden the system. Similarly, if a system already was at or close to its limit from a static pressure perspective, adding a higher level of MERV filtration or HEPA filtration could essentially break the system and reduce its air flow to non-functional levels.

Further, UVC lights can deactivate viruses and may be employed in HVAC in-ducts applications. Generally, UCV light may be effective when applied to a surface for a period of time. Therefore, using UVC to irradiate viruses and/or bacteria on a HVAC coil has some effect. However, for general air treatment, the air velocity is too high to provide enough exposure time to effectively deactivate within the air stream. Specifically, the efficacy is suspect when air velocity and distance from the light source are not taken into account. For instance, the irradiation time required for a disinfection ratio for a 10 cm×10 cm surface is 3 times more than that of 5 cm×5 cm. Consequently, UVC light applications by themselves are not sufficient to comprehensively deactivate viruses in normal HVAC air velocities.

In addition, current HVAC air filtration does not provide measurement and verification of the air quality prior to the air filtration being applied or during and after it's been applied. During a pandemic, customers and employees are rightfully concerned about the air quality of a building they might enter or work in. A static past report does not address immediate concerns, and reports or technologies that only account for $C0^2$ levels, do not address other air quality concerns. Even internal systems that might separately measure air quality, do not provide feedback and the ability for a customer, employee, resident or other potential occupant to see the air quality before they enter the facility.

The present devices, systems, and their methods of use as disclosed herein address the challenges of keeping HVAC systems running efficiently while at the same time ensuring the systems are providing quality and healthy air to the building occupants.

SUMMARY

Accordingly, in one aspect, the present disclosure is directed to a uniquely designed air-purification and remote HVAC management system including an online cloud-based engagement platform. In various embodiments, the system may be a locally based system that utilizes a specially designed analytics platform, e.g., including AI, for optimizing energy efficiency, enthalpy, and air quality based on continual sensor data collection, indoor air quality measurements, and dynamically adjusted operating parameters. A fault indicator and communications display may also be included.

For instance, in one aspect, provided herein is a system for monitoring and purifying air quality. Particularly, the system may include an intelligent heating, ventilation, and air conditioning (HVAC) unit, an air purification unit, and/or an indoor air quality (IAQ) monitoring sub-system. More particularly, in various embodiments, an intelligent heating, ventilation, and air conditioning (HVAC) unit is provided for efficiently purifying air of a compartmentalized environment in a manner that conserves enthalpy. For example, the intelligent HVAC and/or intelligent air purification and/or IAQ monitoring systems may include on-board intelligence, such as one or more processing elements and/or may otherwise be associated with a computing resource, such as an integrated circuit or processors, including one or more of an FPGA, ASIC, and the like, which may be positioned on a printed circuit board that is part of one or more control modules of the system, whereby the intelligence is configured for sensing conditions of the systems and the environments they serve, collecting and analyzing data pertaining thereto, and then configuring and monitoring system functionalities as well as the individual components that make up the system both individually and collectively.

In a particular embodiment, the HVAC unit may include one or more of the following: ducting, an air conditioner, a compressor, a condenser, a thermal expansion valve, an air handler, a control unit, and/or a communications unit. For instance, the intelligent HVAC unit may include ducting for receiving a first amount of air from a compartmentalized environment, and for directing a second amount of air to the compartmentalized environment, where the second amount of air differs from the first amount of air by being purified, warmed, cooled, or otherwise conditioned with respect thereto. The HVAC unit may include an air conditioner that is coupled to or otherwise contained within the ducting, where the air conditioner contains one or more copper coils and tubbing having refrigerant contained therein. Accordingly, the air conditioner may be configured for removing heat from air traversing through the ducting, such as by transferring the heat into the refrigerant converting it from a cooled refrigerant to a warmed refrigerant.

A compressor may also be included and coupled to the copper coils of the air conditioner. The compressor may be configured for compressing the warmed refrigerant into a warm pressurized refrigerant and may further be configured for moving the warmed pressurized refrigerant throughout the copper coils. A condenser may also be present and coupled to one or more of the copper coils and the compressor, and the condenser may be configured for removing heat from the warm pressurized refrigerant to produce a cooled pressurized refrigerant. In such an instance, a thermal expansion valve may be coupled to the compressor, and configured for opening and closing so as to thereby release pressure from within the copper coils and ducting to thereby convert the cooled pressurized refrigerant into a cooled refrigerant. An air handler may also be coupled to the ducting such as where the air handler for withdrawing the first amount of air from and for supplying the second amount of air to the compartmentalized environment.

Further, the system for monitoring and purifying air quality, may include one or more air purification units. For instance, the system may include a plurality of air purification units, such as where each air purification unit may include one or more high efficiency particulate filters, which may be configured for trapping small particulate matter. The filters may be positioned with respect to the HVAC unit, e.g., the ducting thereof, so as to perform a pre-, mid-, or post-filter operation, so as to remove particulate matter from the air passing through the HVAC ducting. In certain instances, the air purification unit may include at least one potassium permanganate filter, such as positioned as a post filter for further removing odorous gases from the air.

Additionally, one, or two, or more photocatalytic oxidation (PCO) units may be included, which units may include one or more UVC germicidal lamps and/or LEDs and one or more cell matrices, such as a titanium dioxide or zinc oxide matrix, positioned relative to the germicidal lamps so as to create a photocatalytic oxidation reaction within one or more zones through which the air is being passed. Specifically, the PCO units may include one or more germicidal lamps, e.g., UVC germicidal lamps, and a titanium dioxide or zinc oxide matrix that may be provided where the particulate filters, germicidal lamps, and/or PCO cell matrices may be configured for creating a plurality of treatment zones, e.g., germicidal treatment zones or chambers, which may be configured for removing particulate matter and/or neutralizing airborne microbes.

For example, the air purification unit may include one or more PCO-cell panels, such as where each PCO panel may include a plurality of PCO cells for clarifying air of particulate matter and/or volatile organic compounds. Particularly, each PCO cell may include a UVC lamp and a PCO cell matrix, e.g., composed of titanium dioxide or zinc oxide, whereby as air is passed through the chambers of the unit, UV light is shined on the PCO cell matrix, and a photocatalytic reaction takes place in a manner that deactivates and/or terminates air born microbes, viruses, bacteria, mold, spores, and the like. And as stated, the air purification unit may include one or more particulate filters that may be positioned pre- and/or post each PCO panel.

Further, the HVAC and air purification system may include a smart air quality sensing module coupled to the HVAC unit. In such an instance, the smart air quality module may include one or more sensors that are configured for monitoring one or more air quality conditions within the HVAC unit as air passes through the HVAC unit so as to produce sensed air quality data. Particularly, the smart air quality sensing module may include a communications module for transmitting sensed air quality data via a network connection such as to one or more control units and/or monitoring systems of the overall HVAC and air purification system. More particularly, the system may include, and the communications module may be configured for communicating with, an air quality processing unit, such as a cloud-based air quality processing server that is communicably coupled to one or more of the smart air quality sensing components and the HVAC unit via the network connection.

For instance, the system may include an air quality processing unit, such as a cloud-based air quality processing server. In such an instance, the air quality cloud processing server may include a plurality of processing engines for receiving, analyzing, and employing air quality data, such as for the purpose of purifying air as it moves through the HVAC and AP (air purification) systems. For example, the air quality processing computing device, e.g., including one or more servers, may include a first processing engine for receiving the sensed air quality data, a second processing engine for analyzing the sensed air quality data, a third processing engine for employing the analyzed data so as to generate control instructions, such as for communication with a control module of the HVAC and/or AP (air purification) systems for implementation thereby. A number of other processing engines may also be included for performing the processing operations detailed herein.

Specifically, the cloud-based air quality processing server may be configured for receiving a data packet including a number of sensed conditions characterizing and/or quantifying air quality, comparing that data to historic norms and/or manufacturer determined set points, and based on the results of that analysis, may generate control instructions for configuring the system so as to achieve certain set point goals and/or increasing efficiency and overall air quality. The control instructions may then be sent to one or more system controllers, for automatic and autonomous implementation thereby, such as for changing operational parameters of the HVAC or AP (air purification) units, and/or the components thereof. Additionally, the instructions may be sent to a system user, e.g., via an application running on a mobile or other computing device, whereby the user can then review the instructions, e.g., operational suggestions, and decide when, where, and how to change the system and/or component configurations, such as by interacting directly with the client application.

Accordingly, the system may include an analytics module, such as implemented in one or more server processing engines, whereby the analytics module is configured for receiving sensed air quality data from the smart air quality sensing component, e.g., the IAQ (indoor air quality), and for analyzing the received sensed air quality data, so as to determine an overall air quality condition. Specifically, where it is determined that the overall air quality condition(s) is below a defined set point, e.g., where the system is not appropriately configured for achieving and/or maintaining a defined healthy air quality, the air quality cloud processing server may then generate and transmit one or more air quality control commands to the intelligent HVAC and/or AP units, e.g., to one or more control modules thereof, such as where the air quality control commands include instructions for dynamically adjusting one or more operational parameters of the HVAC and/or AP (air purification) unit and/or their component configurations, so as to thereby improve the air quality.

In view of the above, in one aspect, provided herein is a system for monitoring and purifying air quality. For instance, the system may include an intelligent HVAC unit, a smart air quality sensing module, and one or more purification units. Particularly, an intelligent heating, ventilation, and air conditioning (HVAC) unit for efficiently purifying air of a compartmentalized space may be provided so as to purify air in the space in a manner that is effective, efficient and conserves enthalpy. For these purposes, the HVAC unit may include or otherwise be associated with a plurality of air purification units or elements that are configured for one or more of conditioning and/or purifying the air of an environment. In such an instance, the HVAC unit and/or smart air purification unit may include one or more high efficiency particulate filters that are configured for trapping and removing small particulate matter from the air.

Hence, in another aspect, an air purification unit may be provided, wherein the air purification unit may include a light-based activator, such as a UVC Germicidal Lamps, that is configured for creating a plurality of germicidal treatment zones, such as within or otherwise associated with an HVAC unit, whereby the UVC lamps are configured for neutralizing airborne microbes by interacting with a photocatalytic oxidation cell panel, including a plurality of PCO cells, whereby when the UVC light contacts a PCO matrix, such as of titanium dioxide or zinc oxide, a photocatalytic oxidation reaction is generated that clears the air of volatile organic compounds. Additionally, the air purification unit may include one or more filter units, such as a pre- and/or post-filter, such as a potassium permanganate filter, that is configured for removing particulate matter from the air. In this manner, the air purification unit is configured for purifying the air, such as from harmful airborne toxins, viruses, bacteria, mold, spores, and other harmful materials and particulate matter.

Likewise, in a further aspect, provided herein is a smart air quality sensing module, which may be coupled to, or otherwise associated with one or more of an HVAC, an air purification unit, and/or one or more computing resources, such as a remote server farm. For instance, in various embodiments, a smart air quality sensing module is coupled to the HVAC unit, the smart air quality module including one or more sensors configured for monitoring one or more air quality conditions within an environment, and/or an associated HVAC unit, so as to produce sensed air quality data. In particular instances, the smart air quality sensing module may be coupled to a server system, such as a remote, e.g., cloud-based, server, and, therefore, includes a communications module for transmitting sensed air quality data via a wired or wireless network connection.

Accordingly, in various embodiments, an air quality cloud processing server system, or server farm, is provided and communicably coupled to one or more of the smart air quality sensing component and the HVAC and/or air purification units, e.g., via the network connection. In such an instance, the air quality cloud processing server system includes one or more processors forming a processing engine, such as a processing engine for receiving sensed air quality data, and a processing engine for parsing, collating, and analyzing the sensed air quality data. For example, a processing engine can be provided so as to compare current operational parameters and results to exemplary, past, or predicted air quality data, operational parameters, and results.

Further, a processing engine may be provided to receive the results of the analysis, and based on the results of the analysis determining one or more changes to the system's operational set points and/or a change to a running configuration of one or more components of the system, such as where the changes are implemented for the purpose of generating cleaner air, with greater efficiency, and less waste. Hence, in this manner, the air quality processing system may be configured for receiving the sensed air quality data, e.g., from the smart air quality sensing component, and for analyzing the received sensed air quality data so as to determine an overall air quality condition, and in response thereto, determining and/or changing a configuration of one or more components of the system so as to change the operations thereof and thereby improve functionality. Specifically, where it is determined that the overall air quality condition and/or operational parameters of a system component are below a defined set point, the air quality cloud processing server may generate and transmit one or more air quality control commands to the HVAC unit, e.g., a control module thereof, whereby the air quality control commands include instructions for dynamically adjusting one or more operational parameters and/or configurations of the HVAC/APS units, and/or their component parts, and or a humidifier unit, so as to thereby improve the air quality and/or to increase efficiency in the system.

Hence, provided herein is a system for monitoring and purifying air quality. In various embodiments, the system may include an intelligent heating, ventilation, and air conditioning (HVAC) unit that includes one or more control modules for setting and controlling the operational settings and parameters of each of the various components of the HVAC and AP systems. Consequently, in such an instance, not only are the overall HVAC and Air Purification units intelligent, but their individual components are also intelligent, such as where one or more, e.g., each, of the components is coupled to a control module for setting and configuring the operations of that component, whereby each component can be individually and independently controlled as well as may be controlled collectively along with the other components of the system. In various embodiments, the various components may be controlled digitally through receipt of electronic control instructions, or may be controlled mechanically, such as by including one or more motors that can physically change the configurations, dimensions, positions, and other operations of the component. In a manner such as this the air traversing through the environment and the system may be efficiently purified in a manner that conserves or optimizes enthalpy.

Accordingly, for these purposes the HVAC unit may contain a plurality of air purification elements that include one or more high efficiency particulate filters that are configured for trapping particulate matter. Such filters can be positioned throughout the HVAC unit and serve as a pre- mid- or post filtration module. For instance, in one embodiment, at least one potassium permanganate filters may be provided, such as positioned as a post figure. Likewise, the HVAC unit may include one, or two, or three, or four, or more UV lamps, such as two or more UVC Germicidal Lamps that are configured for creating a plurality of germicidal treatment zones, e.g., in one, two, three, four or more chambers, where each chamber may be configured for neutralizing airborne microbes. Additionally, a photocatalytic oxidation panel may also be included and be positioned proximate to the UVC lamps such that when the UV light hits the PCO panel, a photocatalytic oxidation (PCO) reaction occurs so as to thereby purify the air. In various embodiments, the PCO-cell panel may include a plurality of PCO cells that may include an activating agent, such as titanium dioxide or zinc oxide, such as for producing a photocatalytic oxidation reaction, to clear the air of volatile organic compounds, bacteria, mold, spores, viruses, and the like.

Additionally, the HVAC unit may include or otherwise be associated with a smart air quality sensing module that may be coupled to the HVAC unit, such as where the smart air quality module includes one or more sensors that are configured for monitoring one or more air quality conditions within the HVAC unit, and/or an environment serviced thereby, so as to produce sensed air quality data. In such an instance, the smart air quality sensing component may include a communications module for transmitting the sensed air quality data via a network connection, such as to a control module of the HVAC and/or air purifications module and/or to one or more of a remote server and/or client computing device, such as an air quality cloud processing server.

Consequently, an air quality cloud processing server may be provided and be communicably coupled to one or more of the smart air quality sensing component and the HVAC unit, such as via a network connection. In such an instance, the air quality cloud processing server may be configured for receiving the sensed air quality data from the smart air quality sensing component, and for analyzing the received sensed air quality data so as to determine an overall air quality condition. Where it is determined that the overall air quality condition is below a defined set point, the air quality cloud processing server may then generate and transmit air quality control commands to the intelligent HVAC and/or air purification units, such as where the air quality control commands may include instructions for dynamically adjusting one or more operational parameters of the HVAC and/or air purification units so as to thereby improve the air quality.

A further aspect of the disclosure is a method for purifying and maintaining healthy air in a safe environment. For instance, the method may include a first step of providing one or more of an HVAC units, one or more air purification modules, and one or more indoor/outdoor air quality sensors, and associating the air purification unit(s) and IAQ sensors with provided HVAC unit, whereby the sensors 20 are configured for measuring a condition of air in an indoor and/or outdoor space so as to generate sensed data, which may then be employed by an analytics module of the system to reconfigure one or more of the HVAC and Air Purification units so as to better condition and/or purify the air with greater efficiency and less enthalpy.

Particularly, the method may include employing the sensors to collect or receive collected data and then transmit that data one or both of a file storage and/or analytics, e.g., AI, device of the system, which analytics device may then perform one or more analytic operations on the data so as to achieve one or more analytical results thereof. For example, the analytics module may be configured to perform one or more logical operations on the collected data, such as to perform one or more of: comparing sensed and/or collected data to a determined or determinable historic norm and/or generating a prediction or comparing the collected data, e.g., operational data, to data pertaining to a predicted outcome so as to determine if a fault condition is present, and if so, the reasons for why the fault condition may be present. If a fault condition is present then the method may include determining one or more corrective measures that may be taken to account for or correct the fault condition such as by reconfiguring the system and/or its component parts in a manner that purifies air within an environment in an efficient manner. In various instances, the system can autonomously reconfigure itself, or may present the results data to a user, e.g., along with one or more system reconfigurations recommendations, and the user may then decide whether and how to reconfigure the system, such as in accordance with the provided recommendations.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 10 is a representation of a graphical user interface for configuring and monitoring the systems and their components;

DETAILED DESCRIPTION

Figure 1A:
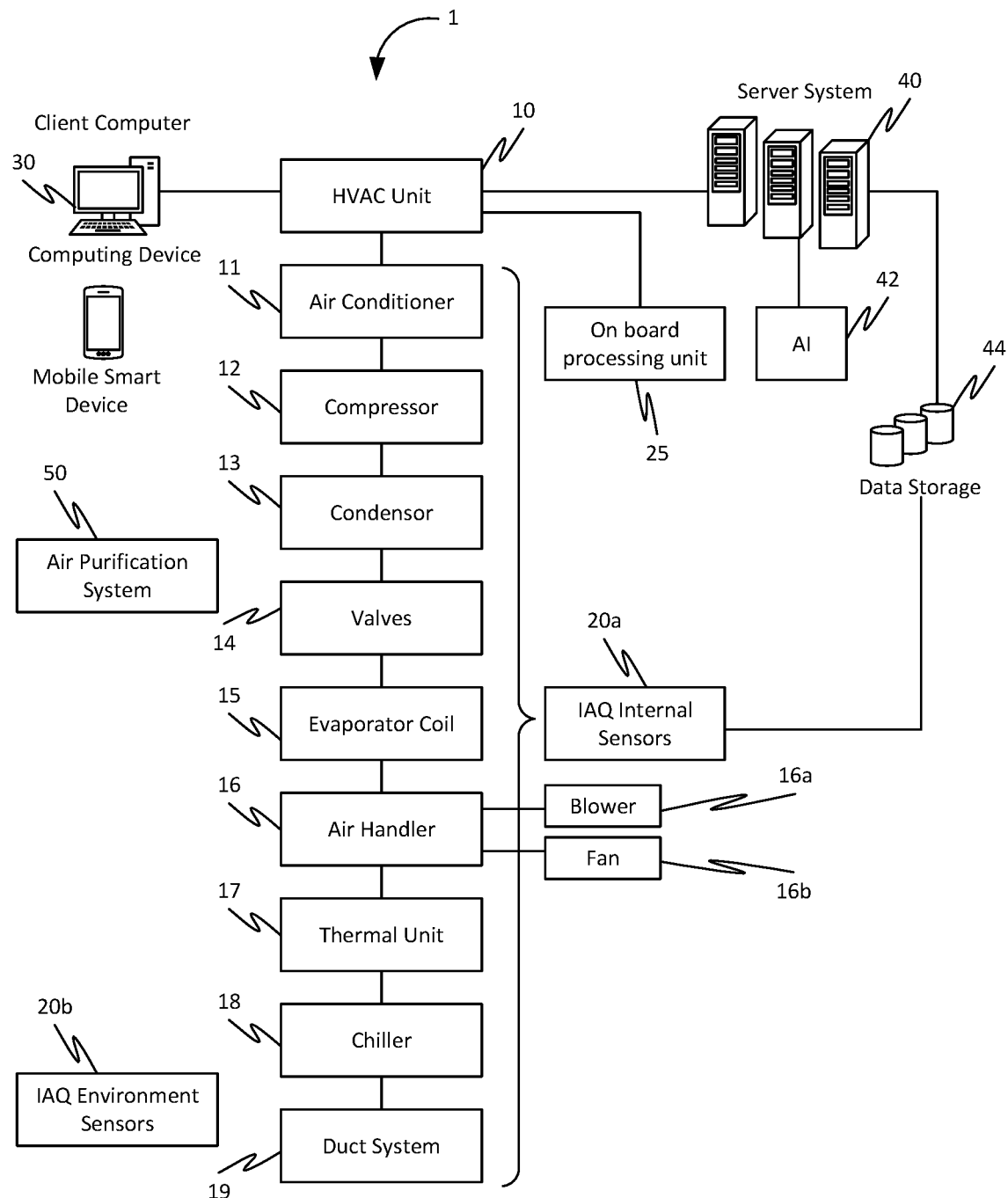
FIG. 1A is an overall system diagram of the present combined HVAC, Air purification, and Indoor Air Quality monitoring systems of the disclosure.

In one aspect, disclosed herein are embodiments of devices, system, and methods for employing the same for the purpose of monitoring, measuring, and reporting a Heating, Ventilation, & Air Conditioning (HVAC) and/or air purification (AP) systems efficiencies as well as for generating corrective configurations of the systems and their components when it is determined optimal efficiency and air quality is not being achieved so as to improve the air quality of the overall system and the environments that the system serves. Generally, the system includes a uniquely designed intelligent HVAC unit that has been configured for not only providing fresh air to, and expelling unhealthy air from, a compartmentalized space, such as of an establishment, but doing so in an efficient manner that also provides critical monitoring and continuous feedback pertaining to the operational competence of the HVAC and/or AP units and their components and the quality of the air.

Particularly, an HVAC unit of the system includes one or more of an air-conditioner, compressor, condenser, one or more expansion valves, an evaporator coil, an air handler, a thermal unit, a chiller, and a duct system, as well as one or more control modules, that are suitably configured for providing air conditioning, heating, de-humidifying, and purification to the environment within which the HVAC unit and its ducting reside. Specifically, the HVAC unit includes an air conditioner that is configured for dehumidifying and removing heat from the air in the environment serviced by the HVAC ducting, such as by transferring captured heat within a stored low pressure liquid refrigerant. For instance, the HVAC unit houses refrigerant in coils, such as copper coils, and as warm air is drawn into the ducting of the HVAC system, heat warms the coils and is absorbed by the low-pressure liquid refrigerant thereby heating it up and converting it into a low-pressure gaseous refrigerant.

The compressor is the motor of the HVAC system and functions to compress and move the refrigerant throughout the coils causing its internal temperature to rise further, thereby trapping heat even more. The compressor applies pressure to the warm gaseous refrigerant, thereby compressing it back to liquid form, and further heating it up. Once compressed, the refrigerant is passed on to a condenser, which functions as a heat exchanger for the HVAC system, removing heat from the interior environment and expelling it to the exterior, while cooling the interior environment. Particularly, as air flows over the condenser it absorbs heat from the refrigerant converting it back into a cooler liquid, which, however, is still under higher pressure. The thermal expansion valve, therefore, serves as a release for the buildup of pressure within the condenser thereby converting the warm liquid into a vapor via the evaporator coil. Thus, the expansion valve allows for precise flow control.

The air handler includes an evaporator coil, blower fan, as well as heating and cooling elements. It is connected to the ducting and serves the function of circulating air through the HVAC system by both blowing heated or cooled air into the environment, via the blower, and then returns it back. For instance, the evaporator coil receives chilled refrigerant from the compressor, and as air is made to flow over the evaporator coil by the blower fan, heat is removed from the air, and thus, it is cooled. In various instances, a chiller may be included wherein the chiller functions to remove heat from liquids flowing through one or more pipes of the system. The HVAC system may also include a variety of terminal units. The terminal units typically include an air filter, a coil, and a blower.

As indicated above, there are several problems with the legacy archaic HVAC systems presently being employed. For instance, present systems are not intelligent. They do not monitor the quality of the air they are delivering. Nor are they equipped with advanced air filtration, and thus, they do not typically purify the air so as to improve its quality. Consequently, they do not perform indoor air quality measurement, and do not have any live comprehensive combination of system measurements, such as measurements of key components including refrigerant levels, static pressure, altitude, temperature, and humidity on both the supply as well as return sides. Specifically, there is simply no feedback as to the operational efficiency of the HVAC unit. Instead, archaic HVAC systems and devices rely solely on disparate, individual measurements, which by themselves are not sufficient to measure and/or maintain the health and performance of the whole system.

The present intelligent system provided herein is designed to solve these problems by providing advanced singular and combinatorial sensing, measuring, and control of component condition and function. Additionally, the present intelligent system is further configured for performing real time analyzing of the sensed data, determining system faults and inefficiencies, and for dynamically adjusting the operating parameters and/or the configurations of the various referenced HVAC and Air purification components. Specifically, in particular embodiments, the HVAC and/or air purification units include one or more control modules having one or more processing engines that are adapted for receiving sensed data and/or command instructions, and in response thereto dynamically configuring the various HVAC components as well as for dynamically adjusting their respective operational parameters.

More specifically, the present intelligent HVAC systems provided herein include three major platforms. The first platform, as discussed above, is the HVAC system itself, which in this instance is an intelligent system that is configured for not only performing heating and cooling, but for also performing air purification. Additionally, the intelligent HVAC system includes an Indoor Air Quality monitoring system that includes a multiplicity of sensor units that may be positioned within and outside of the HVAC unit, and are configured for collecting data on how the separate components are functioning individually as well as how all the components are functioning collectively so as to determine, in real time, how the overall system is functioning altogether. More particularly, for these purposes, the intelligent HVAC system includes an artificial intelligence platform that is configured for receiving the data generated by the various sensor units, analyzing the data, determining how well the components are functioning, how efficiently the system is performing, and how the overall enthalpy is trending. Further, the overall HVAC system includes an air purification system, including an air purification unit configured for purifying air is it traverses through the HVAC unit.

Accordingly, in one aspect, presented herein is an intelligent HVAC system that includes three highly integrated platforms, including an air purification, Indoor Air Quality monitoring (IAQ), and an Artificial Intelligence (AI) platform. Particularly, with respect to air purification, there are many different types of air purification technologies and methodologies to clean air. In evaluating various of these technologies, it was determined that none provided a wholistic approach to environmental purification while simultaneously monitoring the whole HVAC system and measuring the quality of the air. Specifically, in providing a comprehensive methodology for managing environmental clarification, a key refinement may be to include a variety of monitors for monitoring various of the components of the intelligent HVAC system, as well as other implementations that include one or more, e.g., all, of the following, such as neutralizing VOC's (volatile organic compounds), capturing and reducing harmful particulates, neutralizing viruses, bacteria, and other organic matter, and the like.

Such monitoring and the data collected thereby is an impactful advancement over the archaic, legacy HVAC systems, which do not perform such monitoring and measuring. For instance, legacy HVAC systems do not take such comprehensive measurements, e.g., over long periods of time, and thus, they do not correspond such measurements with the detection and the means for optimizing the HVAC system, alerting stakeholders as to issues with the HVAC system or reducing harmful agents in the air, such as VOC reduction. Particularly, most HVAC systems do not particularly perform air purification, and where air purification systems are provided they are not intelligent, do not sense or take measurements of pertinent air flow and/or air quality data, and do not correlate that data to the efficiency and performance of the air purification system and/or do not use that data to reconfigure the systems and do not use that data to alert customers, employees, building owners or other stakeholders as to the long-term and immediate quality of a buildings air quality.

Hence, with respect to the legacy systems, they are installed with no accountability as to their performance, nor are they provided with any means for making automatic and/or autonomous adjustments, and lack controls that can be tuned based on the performance of the system. Additionally, often times when legacy systems are installed, due to their technologies and processes, they produce harmful byproduct gases, such as ozone and formaldehyde, while not being able to sense or monitor them. Such systems, therefore, do not account for a wide variety of data that can be pertinent to ensuring proper functioning and air purification, such as data pertaining to interior or exterior conditions, time of day, altitude, and the like.

For example, legacy air purification systems can run at higher fan speeds, such as if a large amount of VOC's are present, while yet remaining undetected. Particularly, such systems can operate at higher levels during certain hours of the day, such as when there are known occupants in a building, or at specific hours when it is known that there will be higher VOC's and particulates in an environment, but without proper sensing modalities even though the system is working harder, this excessive work is not internally sensed, and therefore is not monitored and the system is not autonomously reconfigurable. Likewise, when employing an air purification system (APS) in addition to an HVAC system, existing air purification systems operate by using additional energy beyond the base HVAC system.

The present combined HVAC and air purification systems solve the aforementioned problems, by providing a plurality of sensor units for taking continual measurements to make sure there are no harmful gases and VOC's being generated from its HVAC and air purification processes. Particularly, the present air purification technologies combine a variety of sub-systems for implementing a variety of methodologies that are improved over the above referenced legacy systems. For instance, in various embodiments, the present systems increase power and effectiveness such as by use of photocatalytic oxidation (PCO), and may include a multi-stage, e.g., two to five stages or more, filtration process that employs a high-performance pre-filter. Embodiments include three, four, or more PCO Modules in order to further improve air purification performance in a shorter amount of time and/or increase viral, bacteria, and mold deactivation and disinfection. More particularly, embodiments with four, five, or more PCO Modules include plug and play modules that can easily be added to a more basic three PCO module unit. Additionally, the present air purification modules have been designed to have a much slimmer design than archaic single chamber units, because they don't need the initial pre-filter, since only one such filter is needed at the beginning and is located in the single, double, or triple chamber unit.

Accordingly, in one aspect, presented herein is an intelligent HVAC system that includes a highly integrated platform that includes both an HVAC and an air purification system that is further made intelligent by including an Indoor Air Quality monitoring (IAQ) platform and/or an Artificial Intelligence (AI) platform. Particularly, the provided HVAC units are not only configured for providing warmed and cooled air to an environment, but also for purifying that air, such as by subjecting the air of an environment to one or more of the above referenced filtering processes, chemical and/or non-chemical treatments, and/or physical operations so as to purify the air. More particularly, the air purification platform functions to purify the air utilizing photocatalytic oxidation and other filtration technologies to cleanse and decontaminate the air of particulates, volatile organic compounds, viruses, bacteria, pollen, dust, dust mites, mold, dander, cooking oil smoke, smoke and smog.

Specifically, photocatalytic oxidation (PCO) is a process where UV light is interacted with a reactive substrate, such as $TiO_2$, for the purpose of killing viruses and bacteria as well as neutralizing VOCs. In providing a PCO filtering unit within the overall HVAC system, the present HVAC systems not only provide warm and cooled air, they also provide purified air, in a manner that is heretofore more efficient than previously achievable. For instance, in the past PCO was primarily built with UVC lamps that were designed to be left on all the time, which would result in greater energy use and potentially energy wasted when the PCO system is not needed.

Additionally, a related problem with such archaic systems is that the lamps degrade steadily in performance and lose effectiveness over time. Further, previous UVC lamps used in these processes contain mercury that is harmful when released, in such instances, where lamps burnout and/or the bulbs break down. While it is necessary to run the fan and/or blower for the air purification to work, another inefficient aspect of past systems is that the blower fans are constantly being run every hour for 10-30 minutes or more. This wastes energy during times, e.g., night-time hours, when no occupants are in the environment. Further, inefficient aspects of previous PCO systems are that the lamps employed are typically oriented such that a shield or ballast protects the lamps from having direct air contact. However, this means that only 180 degrees of the lamps direct light hits the titanium dioxide grid or air directly. In the present systems, the elements may be motorized and automatically controllable so that their configurations can be modulated as desired in 180 degrees from a positive to a negative orientation relative to the UV lamps. Further still, the UVC light is typically only emitted at one side of a titanium dioxide grid, therefore, not fully utilizing the other side of the coated mesh or grid, which is corrected for by the present system.

The present HVAC and air purification systems is further more effective as well as more efficient because they are configured to solve these problems, in part, by being combined within the HVAC unit, as well as being combined with the presently disclosed IAQ and AI platforms. For example, while typical air purification systems require additional power beyond the HVAC system to work, the present combined HVAC and air purification systems do not. Specifically, through the IAQ monitoring and AI implementations disclosed herein, the present platforms run on the same power, and save energy by regulating when various components are deployed, controlling their orientations and configurations, as well as generating intelligent use models that more closely align with occupancy levels.

For instance, the present platforms function together to improve efficiency by providing the ability to autonomously and/or remotely configure the system components, such as by allowing the remote configuring and/or turning on and off of the various air purification and HVAC components, such as the UVC lamps, HVAC blowers, fans, compressors, valves, and the like. Additionally, the present systems provide for scheduling their usage to coincide with specific times of the day, occupancy levels, e.g., by sensing movements and/or $CO_2$ and other gas levels, and the like, and further by accounting for environmental conditions. Furthermore, efficiency can be increased by employing UVC LED lights in substitution of mercury containing bulbs within the UVC system that can more efficiently be controlled and do not have the same risks of breakage. One embodiment of the system allows for automatic and autonomous orienting of the lamps parallel to the air-flow so that 360° of the lamp light can be utilized and emitted at a cone shaped titanium dioxide mesh grid that allows for the complete front and back us.

Accordingly, in one aspect, provided herein is an efficient, intelligent air purification platform that employs photocatalytic oxidation in combination with air heating, cooling, and ventilation. Specifically, the present air purification systems may be combined with and/or be implemented within an HVAC unit, whereby UVC lamps and a metal mesh active matrix are used to produce a PCO reaction that functions to purify air as it traverses through the HVAC unit. In such an instance, the photocatalytic oxidation processes may primarily be accomplished by shining UVC light, for instance, in the 254-nanometer wavelength, on a Titanium Dioxide or zinc oxide coated mesh or matrix of metal. Also, UVC light produced by LED lamps may be used to create the catalyst, such in the 260-275 nm wavelengths, and filtration may also be achieved through use of a pre-filter, such as of MERV 11 to MERV 16 or higher HEPA filters. Post filter options may also be included, such as with one or more carbon and/or potassium permanganate filters.

The HVAC system may also include an advanced monitoring platform. For instance, the system may include an Indoor Air Quality (IAQ) monitoring platform for measuring air quality of the air in the environments in which the HVAC system resides and services. Air purification by itself may not prove out the quality of the air or that the filtration improved or maintained air quality. Therefore, the present system measures air quality for particulates, volatile organic compounds (VOC)'s, CO, $CO_2$, ozone, and other gases. The system may also measure viruses, bacteria or mold compositions and concentrations in the air. Particularly, the present IAQ platform is configured not only for measuring air quality in real-time, but for transmitting the sensed data to the system's analytics platform, which analytics' system may include an onboard and/or remote, e.g., cloud based, AI architecture.

For instance, the present IAQ platform may include a variety of data collectors, such as sensors, which are configured for collecting data pertaining to the operations of the system as well as the quality of the air of which it is tasked with purifying, and for sending that data to an associated analytics platform of the system to which it may be coupled via a network connection, such as via a wireless internet connection. In a manner such as this, the various platforms of the overall system allow for real-time feedback as to air quality, system operations, and efficiencies that can be transmitted to a system operator, such as an occupant of the environment, which may be employees, customers, residents and potential occupants that are considering entering a building but would like to know what the air quality has been historically as well as the current air quality, which in this post-COVID world is important and valuable to know.

Therefore, the system, may include a plurality of specific sensors that are used to collect and transmit data, and may be configured so as to calculate component and overall system efficiencies, such as on a continual basis. For instance, the system includes a multitude of sensors to provide data and feedback, analyze efficiencies when applied to equations, calculations and artificial intelligence, and to control the various platforms of the system. The primary sensors used for monitoring the system performance may include one or more of the following. For example, the IAQ module may include one or more dry and/or wet bulb temperature sensors that may be located on both return and supply ducts.

In addition to the dry and/or wet bulb sensors, the system may include one or more static pressure sensors that can also be located on both the return and supply ducts. For instance, in various instances, clusters of static pressure sensors may be formed and used for measuring the pressure within an environment, such as a house, building, or facility, and also outside of the HVAC system and ducts. Additional static pressure sensor clusters may be positioned within the building envelope, such as within spaces meant for occupation, and further static pressure sensors may be positioned exteriorly. The exterior sensors may be configured to reach outside, to measure the ambient static pressure of the outside air, and/or to calculate the differential pressure between the two environments. Pressure and other sensors can further be deployed on either side of the filtration module as well as either side of the coil, such as for measuring both filter and coil drop performance. Specifically, these sensors can be located before filtration and after the coil such as for measuring static pressure drop across both filtration and the coil collectively or individually. Additional static pressure sensors may be added to measure different static pressure areas of the HVAC system.

Refrigerant and compressor sensors may be presented and connected to both the refrigerant high side/liquid line and low side/suction line service ports. Additional connection options include a t-bar adapter that may be connected to the service port, which allows the sensor to connect while leaving a service port connection open, or an inline sensor, which can directly be positioned into the refrigerant lines. Further, power metering sensors with current transformers may be placed at incoming electrical lines, such as for package units that have all components of the HVAC system in one place, or may be placed on incoming electrical lines both at the condenser, as well as the air handler components, such as for split systems. Another configuration option includes CT's included at the electrical panel on the breakers that feed the HVAC units.

Barometric Pressure Sensors may be located at the HVAC unit with the sensor configured to measure the ambient air. In such an instance, the barometric pressure sensor may be used to determine altitude without which can affect various calculations and algorithms employed by the analytics platform of the system. In the event of a split HVAC system, the barometric pressure sensor can be positioned at both the condenser and the air handler unit, which is typically positioned in an attic space or on the roof. However, if the sensor is in an attic or roof space, it may either have a wire or wireless sensor that is capable of reaching and measuring ambient air outside of the roof and building envelope.

Other air quality detection sensors for the system may be positioned within the HVAC system, and can be configured for measuring ambient air temperature. The IAQ sensors may be positioned exteriorly or interiorly to the HVAC system. For example, various IAQ sensors may be positioned inside of the ducting and can be configured so as to determine inside air temperature, outside air temperature, ambient humidity, inside humidity, and duct humidity. Such sensors may also be configured for sensing particulates and organic matter, for instance, the sensors may be bio-sensors adapted for sensing molds, including black mold, spores, bacteria, viruses, and the like. The sensors may be gas sensors such as for sensing various gases including VOC, CO, $CO_2$, $NO_2$, Ozone, Sulfur Dioxide, formaldehyde, and the like. Additional gas, temperature, and humidity sensors may also be provided, such as for detecting particles and gases deleterious to human inhalation.

For instance, additional particulate and gas sensors can be positioned throughout the HVAC system components, and can be configured for measuring temperature, pressure within the system, pressure outside of the system, e.g., ambient pressure, gaseous sensors, flow sensors, force sensors, velocity sensors, accelerometers, and the like. These various sensors of the system may be positioned throughout the HVAC unit, such as within the ducting anterior and/or posterior to the various components, such as when the package unit has all components in one enclosure. Particularly, in various embodiments, a multiplicity of different sensor types may be provided, e.g., within the ducting and/or external environment, so as to divide the HVAC system into different zones, e.g., 2, 3, 4, or more zones, where the same or different elements can be the focus of various sensor clusters within each zone.

For example, in particular embodiments, a series of sensors can be employed within defined zones of the ducting, such as proximate the components they function to monitor and measure, while similar corresponding sensors can be positioned throughout a building in a manner so that the interior ducting sensors parallel, model or otherwise mirror the exterior sensors, such that up to date, real time exterior and interior conditions can be detected. In the event that multiple HVAC units service a common zone due to a large common area or space, single sensors of each type can be used if desired if the air quality is the same across the larger space. The system AI may be applied to analyze a multitude of sensors in the interior space where more than one HVAC unit services the same air zone, such as to average indoor air quality across all sensors measuring the same air zone or apply or advanced analysis of the combined sensors' data. The various sensors of the disclosure can be configured for transmitting their data in either a wired or wireless format.

As discussed above, in various instances, a variety of sensors may be provided within the ducting, such as for detecting particulate and/or biological matter as well as component functioning. For instance, it may be useful for one or more system controllers to take measurements at 1 CFM or less due to limitations in sensors ability to measure in high air velocities. This is unique because legacy HVAC systems ventilate air at much higher rates, such as about CFM's of 1,000-2,000 CFM's or even higher. Accordingly, in order for accurate sensor measurement, the system may be configured to include proprietary shrouded sample tubes that slow down the velocity for sampling so the sensors can more accurately take their respective measurements. Particularly, the system may include proprietary shrouded sample tubes for any sensor measurement that may need a lower air velocity so as to take its respective measurements. One such example is particulate measurement and another is virus/bacteria/mold collection and measurement.

As indicated, in various embodiments, the HVAC unit and/or corresponding environments it services may be divided into zones. In various instances, each zone may be attended by one or more sensors. In such instances, the individual sensors for each HVAC system and corresponding zone may be collected locally and can be sent wirelessly to a centralized sensor and data collection hub, such as for local or remote based server processing. Hence, in various instances, data may be collected at the local level and stored in a database on a local server as well as being simultaneously sent up to the cloud system via a network, e.g., internet, connection. For instance, the data may be collected and transferred to a remote server, such as up to the cloud, by a wired wireless network connection, such as ethernet or fiber, an on-premise wireless connection, such as WIFI, Zigbee, Z-Wave, LoRa or other similar ranged product, or over a longer-range, via a wireless connection, such as a wireless metropolitan area network (WMAN), or over a cellular network, e.g., LTE, 5G or future cellular protocol, or over a satellite-based network.

Particularly, sensors of the present system may include their own on-board memory buffers so that if the communication between the sensors and the hub/local server is lost for a short period, they will not lose data, but will retransmit that data when communication network connectivity may be restored. This is useful as other systems in an environment can temporarily turn on and off and create interference such as a microwave, transformer, or other system. This helps with data integrity between the sensors and the hub as well as the local or remote server.

The hub and/or local server may also include on board data storage so that the data may be stored locally as well as in the cloud. Hence, in the event that there is a temporary or even extended connectivity outage, no data is lost. The system's local computing facility, e.g., server, will synchronize with the cloud servers when the connectivity is restored. This helps with data integrity between the hub and/or local server and/or cloud server. It also provides a local backup of data in the event that something should ever happen to the cloud servers or cloud service provider.

Once collected and/or analyzed, e.g., by an internal HVAC processing unit, the data may be sent and uploaded to an associated server, such as a cloud-based server system, so as to allow for centralized analysis and/or reporting from one or more HVAC systems. For instance, as indicated, the HVAC system may further include an analytics platform, which may include an AI module. Specifically, in various embodiments, an AI module may be provided whereby the AI component receives the data collected by the system, analyzes, detects, and measures it, so as to determine the HVAC system status and performance.

More specifically, the HVAC sensors and data collectors take their measurements, and send them to the system servers, which then apply logical intelligence to the data so as to analyze and determine the HVAC system's performance. For example, various data that can be collected by respective sensors of the system may include one or more of: temperature, humidity, static pressure, refrigerant pressure, refrigerant temperature, power, vibration, barometric/altitude data, VOC's, gas and particulate data, and the like, all of which may be collected and sent up to the cloud. In various instances, altitude can be calculated from the international barometric formula and the collected barometric data.

Particularly, the analytics system receives and employs the collected data so as to identify efficiency issues with the overall HVAC and/or AP systems and their components. The analytics platform further operates to determine functional problems within the system and its component parts that may hinder their performance and/or operation. The analyzed data and the faults determined thereby may then be communicated to relevant parties that manage and are responsible for the HVAC/AP systems, and may function to recommend and/or implement new configurations for improving functionalities of the systems components. If the system employs batteries, the battery levels may also be communicated up to the analytics system.

More particularly, the system may include one or more servers, such as a server cluster which may include two, three, four, or more servers. For instance, in various embodiments, the server system may include a first, e.g., a local computing resource or server, such as for immediate processing of data, diagnostics, and real-time monitoring, and may further include a second, e.g., a remote or cloud based, server, such as for analyzing data over time and determining trends, such as short-term and long-term trends. For example, in one embodiment, once the various sensor data has been collected, e.g., on the local server, and/or processed, the data, e.g., locally processed data, can then be sent up to one or more remote, e.g., cloud based, servers. In such an instance, the data may be aggregated and analyzed locally or up at the cloud servers.

Accordingly, the system, e.g., the computing facilities of the system, collects and aggregates the data from multiple sensors and may be used for performing calculations pertaining to determining one or more short or long-term trends and/or for making predictions about the same. In certain instances, the collected data may be processed for use in comparison to one or more data structures, such as in a systems manufacture, government table, prefix or suffix tree, or a suitably configured knowledge graph. In particular instances, the data may pertain to one or more of thresholds, set limits, novel or historic data, trends, and the like, such as with respect to enthalpy, efficiency, functionality, usage, and the like. Once such data has been collected and analyzed, as described herein, the results thereof can then be reported out.

For example, the data collection, analysis, and reporting may include analyzing, evaluating, scoring, and/or weighting one or more of the components of the system and/or the system as a whole based on efficiency, adherence to required operating hours, and/or air quality. Particularly, in this instance, efficiency may be measured in system enthalpy, such as where the present, e.g., measured, enthalpy is compared the intended enthalpy, such as measured by the manufacture and/or government body standards. More particularly, enthalpy can be measured as the delta between energy actually consumed in the performance of a purification operation as compared to one or more standards setting forth what the expected energy consumption should be. Accordingly, enthalpy may be a thermodynamic quantity equivalent to the total energy expenditure and/or heat content of a system. Specifically, it may be equal to the internal energy of the system plus the product of pressure and volume.

For instance, with respect to the present devices and systems, air flow efficiency may be determined by a combination of static air pressure and air velocity. Charge of the system may be determined by refrigerant pressures and/or refrigerant temperatures. The quality of the air may be determined by measuring CO, $CO_2$, particulate matter, VOC levels, and the like, as compared to allowed levels by local/state/federal government regulations and building type and or an air quality score determined by the system using a multitude of different air quality measurements of conditions such as $CO_2$, particulate matter, VOC levels, biological levels and other specific gas compositions and concentrations. All of the data for determining these variables may be collected by the system, and be employed by the analytics platform, for determining actual results and predicting past and forward moving trends. Particularly, the analytics platform, e.g., an artificial intelligence module thereof, may be configured for receiving and factoring the incoming data to prior use models, manufacture specs, standards, and based on one or more of those comparison scoring how the system components and the overall system is performing such as for determining the health and efficiency of the system as well as determining one or more potential defaults along with its severity.

Accordingly, in various embodiments, the system may utilize an Artificial Intelligence (AI) module to analyze HVAC components and their operations, system operating efficiencies, and air quality data, such as on an aggregate basis. In certain instances, the analytics of the system may be performed based on categories of data classifications. Some analytic operations employ singular data that can stand on its own, such as in its raw form, for instance, power data (kw or kwh), along with temperature, humidity, and the like. However, some analytic operations combine sensor data such as temperature and humidity in the return, which data can then be compared to the supply and factor in altitude when relevant to the calculations for the most accurate results. Other factors such as climate zone can also factor into the calculations. These analyses function to find anomalies, to improve efficiencies or lack of efficiencies in manufacturer models, system sizes, performance, and longevity. The system additionally utilizes Artificial Intelligence to analyze air quality trends across geographic regions, building types, and business types.

Particularly, the system, e.g., the IAQ monitoring component of the system, may be configured for detecting faults and/or problems with the evaluated HVAC platform systems and their respective components. Once the system has determined one or more faults and/or potential problems, the system may readjust, reset, or otherwise change the system parameters and/or configurations, such as to change the operations of one or more components of the HVAC unit so as to bring the overall system back into conformance with one or more specified performance factors. For instance, the system may be configured for determining, communicating, and re-organizing the system and its components in response to one or more faults and/or problems. Further, the system may be configured to communicate this information to the appropriate owners or managers of the HVAC systems being evaluated, such as via electronic communications, such as texts, emails, mobile and wearable applications but also with visual and audible alerts via local monitors and or voice assistants.

The referenced alerts may be configurable per HVAC company and/or client preference, and can be grouped into three major categories to determine the actional steps needed for correction. For instance, these alerts and/or communications may outline the severity of the information reported from a mild (green), cautionary (yellow), and or critical (red) status, such as where mild may indicate a simple warning of a potential for a fault, a caution may indicate a more severe warning that something is going wrong and service may be needed, and a critical warning may indicate that a tech needs to be immediately dispatched to fix a problem. In such instances, the faults can range from the HVAC system not performing properly or efficiently or signal air quality issues. Particularly, system level efficiency level monitoring and/or faults may include: enthalpy non-efficiency, refrigerant/charge level issues static pressure/air flow issues, power issues, vibration/motor, e.g., compressor, issues, cooling/heating issues, excessive humidity/temperature issues, and the like. Likewise, air quality monitoring and/or fault alerts may include excessive $CO_2$, VOC, particulate, humidity, temperature issues, as well as issues with other gases, such as CO, Ozone, Formaldehyde, smoke, smog, etc. The monitoring and/or faults may also include the detection of problematic biologics, such as mold, spores, bacteria, viruses, and the like.

In view of the forgoing, the system may be configured for monitoring system component and air quality conditions, determining and/or predicting one or more problems therewith, giving a warning of the issues, and implementing one or more corrective measures so as to resolve the issues, such as automatically and/or autonomously, such as by changing one or more component configurations and/or operational parameters. Accordingly, in various embodiments, the system may be configured for monitoring and/or maintaining air temperature and quality, such as by raising or lowering temperature and/or air flow in accordance with a determined set point and/or removing or adding humidity to the air, as well as purifying the air from CO, $CO_2$, Ozone, VOCs, particulates, mold, spores, bacteria, viruses, formaldehyde, smoke, smog, other harmful gases, and the like, such as on a regular basis.

In performing this process, as described above, the system intakes fresh air from outside, purifies it if it detects contaminants, VOC's, or harmful biologicals, and provides this purified air to the protected environment. During this process, various of the sensors disclosed herein can monitor the environment throughout this process and collect data amongst one or more purification units. The collected data can then be used by the system to reconfigure and/or reorientate the system and its components and/or may communicate one or more system warnings or faults to one or more system administrators that can then perform necessary corrective measures to manually reconfigure the system components. Particularly, the system may be configured to continually monitor air quality and system efficiency so as to certify the air quality that the system provides over long periods of time. The present system may measure the actual BTU output of the HVAC systems, configure, and reconfigure their operational parameters, so as to make sure the HVAC system is delivering the heating, cooling, and air purification that the HVAC unit is rated for.

For example, the IAQ monitoring platform of the system may be configured for monitoring, purifying, and/or certifying air quality. Specifically, the system may certify one or more of the following. The system may certify the quantity and quality of the air, such as based on the HVAC system, and may certify the CO, CO2, ozone, VOC, and other gas levels, such as in one or more zones of the HVAC unit and/or outer environment. Such certifications may have a score and/or a grade, and may be based on the air quality data collected by the system sensors and by averaging the data over different time periods. The purpose of such certifications is to provide both immediate as well as historical data regarding the health of the building.

Particularly, the system may detect and determine that CO, $CO_2$, ozone, VOC, or other gas levels are outside of the determined system parameters, such as determined by governmental or manufacturer standards. Such detection results in an indication that the system set points and/or parameters have become mis-aligned. This then leads to a component structural and/or functional analysis being performed so as to determine and isolate the cause for the fault detection if it determines the problem is a system issue. The system might also detect that other environmental conditions are causing the air quality issue. Further to detecting a system and/or component fault, the IAQ platform may further determine the level of the problem, categorize the level, and determine one or more corrective measures to implement or suggest for implementation. In various instances, the system may generate and communicate the warning to one or more system administrators or environment occupants, such as by flagging the environment as potentially unhealthy dependent on how far off the detected levels are to a standardized and/or system generated model. In particular instances, historical data can be used to determine deviations from a standard or norm, can be used to determine if a component is outside of operational parameters, and can send a warning to those inhabiting or about to inhabit the environment serviced by the HVAC system. Also, data can be accumulated regarding manufacture system performance.

With respect to employing historic data for determining one or more trends of operational inefficiencies, the historic data may be collected and averaged over time. For instance, historic collection and averaging over time may be performed so as to determine trends over seconds, minutes, hours, days, months, and years. The data can be aggregated and correlated so that the results are more easily understood. As discussed above, the HVAC unit and the environment it services may be broken down in to zones, and data may be collected and averaged over time for each zone and the system as a whole. In various instances, each zone may be measured and controlled collectively or separately and can be scored. Likewise, the whole building can be averaged by averaging all zones together, e.g., based on square feet.

Exclusions may be made and noted for areas that are not common and/or have special circumstances to have different air quality levels. For example, a kitchen in a restaurant may be individually rated and not be averaged with a common eating area. In various instances, the system may be configured so as to certify the air quality of the environments serviced, and may provide public feedback of the certification via an on-site display, an online display such as a public accessible web page or mobile application or QR Code that links to a public accessible web page. Specifically, the system may provide a certification of HVAC energy efficiency based on sensor data collected over time and provide one or more certifications over different time periods. The system may also combine air quality scoring with HVAC and or building efficiency data to provide an aggregate sustainability and efficiency score for the building in addition to the air quality score and certification.

Figure 1B:
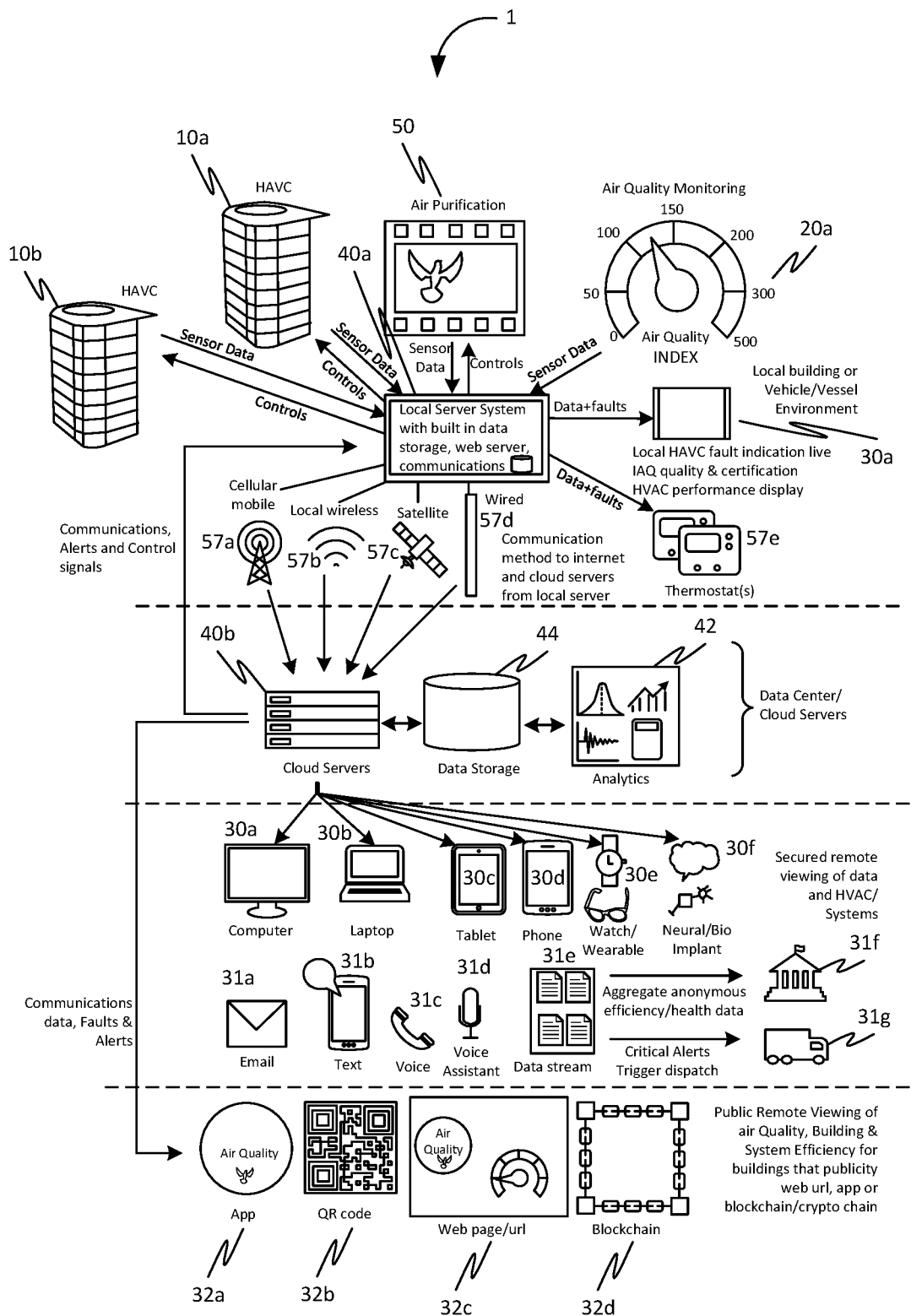
FIG. 1B is another iteration of the system diagram of FIG. 1A.

Accordingly, in view of the above, and as can be seen with respect to FIG. 1A and FIG. 1B, the present intelligent HVAC system 1 may include one or more HVAC units 10*a* and 10*b*, which may have on board processing 25 along with intelligently controlled components including air-conditioning 11, compressor 12, condenser 13, valves, 14, evaporator coil 15, air handler 16, thermal unit 17, chiller 18, and a ducting system 19 for directing flow in and out of an environment serviced by the HVAC unit. As indicated, one or more of these components may be intelligent, such as by including on-board processing, control, sensing, and communications units, such that the system 1 is capable of receiving and processing data to generate measurements of system performance, and when that performance drops between determined set points, the system intelligence may generate a set of reconfiguration instructions by which the various components of the HVAC unit 10 can be reconfigured so as to achieve the efficiency parameters of the overall system.

More particularly, for these purposes, the system 1 may be configured for including the following elements and/or performing one or more of the following tasks. For instance, in one aspect, provided herein is a system that includes a plurality of elements that are configured for performing remote HVAC measurements and diagnostics, continual data collection, monitoring, and reporting, as well as continual IAQ (indoor air quality) data collection. Particularly, the system may include an air purification sub-system 50 that may be configured for performing air purifications, such as utilizing photocatalytic oxidation, to purify the air collectively, and may further include an Indoor Air Quality (AIQ) monitoring system 20 that is configured for collecting and monitoring and system condition data, and additionally, the system may also include an analytics system 40 for analyzing operative data so as to create a unique purification system that is capable of managing the efficiency of one or more HVAC units simultaneously with the quality of the air that is ventilated within the system.

Specifically, in one aspect, the system 1 may include IAQ 20 and analytics 40 sub-systems that are configured to determine system operations and determine faults in the HVAC units and/or other system components, such as by taking regular and accurate measurement readings and communicating directly or through a cloud and/or Internet based application to a central server system 40. More specifically, the system 1 factors additional key elements such as employing sensors and collecting data that accounts for information pertaining to the location, elevation/altitude, climate zone, time, and day of the year the various measurements are taken, which measurements may include local environmental 20b and system sensor 20a measurement data to optimize efficiency. Particularly, the system can collect data in a live or offline mode, such as by sampling and storing data up to every second or any number of seconds or minutes or hours or days based on desired frequency.

One particular set of useful data is altitude and/or barometric pressure data that may be pertinent for determining accurate measurements of system settings and operation efficiencies. For instance, many HVAC calculations are based on sea level altitudes. Due to lack of altitude information, calculations have often been left or calculated at the default sea level. In actuality, it has been determined herein that altitude can greatly affect these calculations, and if ignored can yield results with 5-50% inaccuracies, or even greater in extreme altitudes. The present system, therefore, provides for sensor level detailed altitude data collection that is automatically factored into all relevant calculations. This system may further allow for the altitude to be manually entered along with location data either from a web/internet interface and/or downloadable smart phone application.

Further, the system 1 may additionally factor in the operational status of the conditioner 11, compressor 12, condenser 13, air handler 16, thermal unit 17, chiller 18, blower and fan, so as to determine if data collection is necessary at the time, or not, in which case data collection can be limited. Furthermore, the system can determine if there are, or need to be, changes to the sub system components, e.g., like the compressor, 12, and can determine when to collect data and when not to not collect data, such as if it's redundant. This can be useful for saving storage space. Particularly, if the data is the same every hour, the more detailed second level data is not necessary to keep since there has been no change.

Likewise, the system may measure refrigerant line pressure and temperature, including from multiple compressors 12, for purpose of fault detection, efficiency, and refrigerant leaks. For example, incorrect refrigerant levels lead to a poorly charged system that wastes energy. Therefore, including sensors for measuring the refrigerant levels and temperatures are useful for accurately measuring the HVAC system's performance. Such monitoring can also help detect leaks in real-time, and warn before they become critical, which leads to energy waste, system malfunction, lack of efficient cooling/heating, and environmental damage. Particularly, due to the system's modular design, including one or more zones, with separate wireless capable cluster sensors 20a and 20b, the system 1 has the ability to measure and record the air conditioner/condenser/compressor's refrigerant lines even in split systems where the condenser/compressor are separated (usually on the side of the building) from the heater and air handler which are usually in or on the roof, all of which can be monitored and configured by the system, such as in response to collected data.

Accordingly, the system 1 can scale up and includes sensors to measure conditioning/condenser/compressors regardless of how many of such components the system has. In such an instance, each additional conditioner/condenser/compressor may have a plurality, e.g., 4, additional sensors to measure their functioning and their refrigerant temperatures and pressures, hi side and low/suction line, etc. Furthermore, the system can be configured to determine the presence of one or more faults by analyzing measurement readings and comparing the results to predictive models, generated by the analytics platform 40 or as compared to a database of manufacturer specifications. In a manner such as this, the system 1 can quickly identify problems compared to known constants and provide immediate feedback to system configuration controllers and/or building owners or facility managers so they can address the issues before the systems become critical. This further provides risk mitigation across a portfolio of HVAC systems.

For sensing and communication purposes, the system 1 may include wireless inter-sensor clusters 20a that may be coupled to hub wireless communications 57 with buffering for the purpose of not losing data in the event of an external or internal interference in the communication. Such communications modalities may include cellular, e.g., mobile 57a and/or local 57b, communication assets, and may further include global communication assets, such as via a satellite 57c connection. The collected data, e.g., sensor data, may be collected, aggregated, and communicated, such as to one or more of a local computing resource, such as an onboard computing unit 25 and/or associated client computing device 30 and/or to one or more remote computing center, such as a cloud-based server system 40b.

One or more sensor clusters 20a and 20b can be configured for determining one or more characteristics of a person or occupant in an environment being monitored. For instance, an in-HVAC sensor cluster 20a and/or an outside, environmental sensor cluster 20b. In such instances, the system can operate independent of the building's Internet/cloud access 57b for the purposes of security via cellular 57a or satellite connection 57c. Particularly, the system can operate and send data to the cloud based sever system platform 40 via a wired or wireless network connection. For instance, the system can use a multitude of different on-premise wireless options including a long range 1200 meter/0.75-mile wireless transceiver that operates in the 900 MHz range, providing for easier installation and range in large commercial buildings. This benefits installation because it requires fewer wireless hubs and repeaters than traditional WIFI networks resulting in less cost and less labor and greater network range. Besides the dramatic increase in range, it also benefits from operating on a less crowded wireless band than the crowded 2.4 Ghz and 5 Ghz WIFI communication bands and channels, which can be used if desired.

Particularly, as depicted in FIG. 1B, the system 1 may be configured for managing a plurality of HVAC units 10a and 10b. In doing so, a plurality of air quality data collectors and monitoring sensors 20 may be provided, such as including both interior 20a and exterior 20b sensors, which sensors can be employed to sense one or more conditions of the HVAC system 1, the HVAC units 10, and the environments they service. The collected data may then be transmitted via a network connection 57, such as via a cellular mobile device 57a, a local wireless connection 57b, satellite 57c connection, and the like, such as to one or more analytics modules 42, such as for cloud based processing 40b, whereby one or more analytics processes may be performed on the data, and the results of the analysis can then be acted upon by the system and/or can be presented to one or more displays of the system, such as of a computing device 30, e.g., a client computing device 30a, a laptop computer 30b, a mobile tablet 30c and phone 30d or smart device 30e or neural net 30f. In such an instance, a detailed report of system and component functioning can be generated and sent to a user or monitor of the system, such as via email 31a, text 31b, voice call 31c, voice assistant 31d, and the like. In particular embodiments, a data stream 31e may be transmitted such as on continual and/or regular basis to a government monitoring service 31f and/or to a repair monitoring service 31g, whereby when a malfunction or default is detected a repair person can be dispatched. Additionally, the reports can be provided to consumers who may be interested in entering a facility serviced by the system, such as where the report details an air quality condition and/or score, which may be presented via a score or grade placard 32a, a QR code 32b, a webpage 32c, a block chain recordation 32d, e.g., a non-fungible token, and the like.

In various embodiments, the system 1 is capable of operating from batteries separate from the HVAC unit's power, or other power sources, for the purposes of increasing installation efficiency. Batteries, including long lasting 10 year+ batteries can provide a quicker installation due to not having to hard wire the sensors off of the system power. Hard wiring sensors not only takes additional time, but also potentially requires voltage step-down reduction and or electrical wave conversions from AC to DC or vice versa, which can be employed if desired. Therefore, battery options can save in both labor and reduction of transformer hardware. Additionally, other battery options include having an auxiliary solar cell system to recharge the batteries during daylight hours.

The system can measure and track the HVAC unit's power via a power sensor and current transformers. The system can also track power from an averaged basis by sampling voltage and amps of the system's total power, e.g., fan only use and compressor power utilization, via an in-unit or remote hand-held multi-meter and transmitting that data into the online cloud platform. Accordingly, the system can monitor and track power usage for the purposes of determining approximate power usage such as when juxtaposed against collected run-time data. The system can also track power from an averaged basis inputting values into the online cloud platform for the system's total power, fan only use and/or compressor power utilization from the system determined and/or the manufacturer's specifications or documentation, and juxtaposing those values against collected run-time data.

In one aspect, in addition to providing an intelligent HVAC unit 10, the system 1 may further provide an air purification system (APS) 50 for purifying the air as it is translated through the HVAC unit 10. Particularly, as can be seen with respect to FIG. 3, in various embodiments, provided herein is an air purification subsystem 50. In certain embodiments, as disclosed herein, the air purification system 50 includes a photocatalytic oxidation (PCO) module 51, for purifying the air. In this instance, the APS module 50 includes four PCO modules 50, with one fully inserted into the housing, and three partially inserted into the housing. However, more or less PCO modules can be included, such as 1, 2, 3, 4, or more.

Figure 2A:
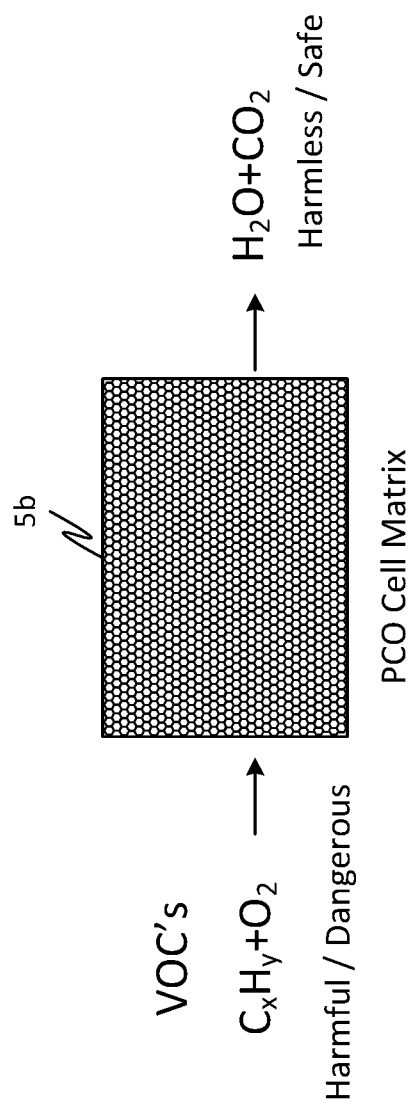
FIG. 2A is a diagrammatic representation of a photocatalytic oxidization (PCO) reaction of the disclosure including an exemplary PCO cell matrix.
Figure 2B:
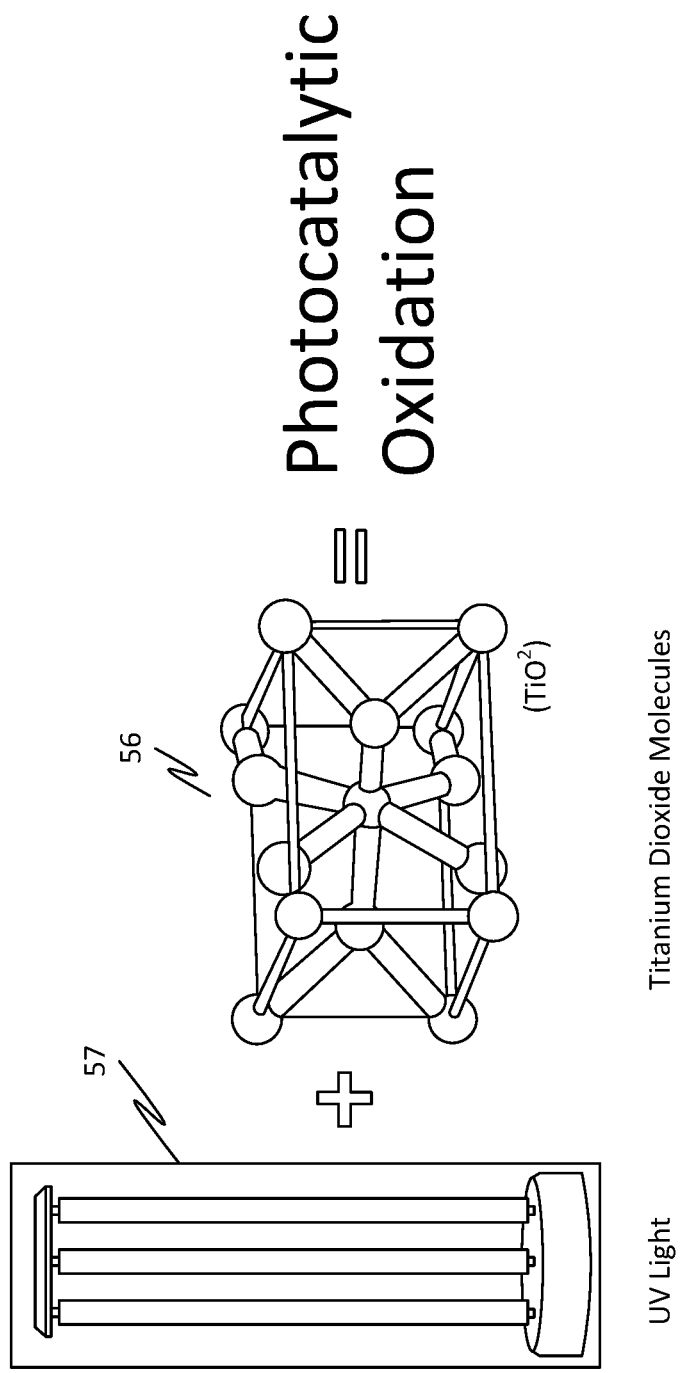
FIG. 2B is another iteration of photocatalytic oxidization reaction of the disclosure including an exemplary UVC/LED lamp.

Particularly, as can be seen with respect to FIGS. 2A and 2B, the air purification system 50 may include a PCO filter module 51, such as including an active PCO cell matrix 56 that is configured for removing harmful and/or dangerous volatile organic compounds from the air by rendering them harmless and safe, such as by generating a photocatalytic oxidization reaction, whereby volatile organic compounds to harmless water and $CO_2$.

More particularly, as can be seen with respect to FIG. 2B, the PCO filter module 51 may include, in addition to the PCO cell matrix 56 having a reactive mesh, e.g., a metal, such as a titanium dioxide or zinc oxide mesh matrix, one or more, e.g., a plurality, of lamps 57, such as UV lamps or UVC LED's. Together, these elements function collectively to remove harmful and dangerous volatile organic compounds (VOCs) from air traversing through an HVAC unit.

Specifically, VOCs are emitted gases from solids or liquids and have adverse health effects on humans. VOCs have higher concentrations indoors where they are trapped in the spaces they are emitting into. In various situations, these concentrations can be as much as 10 times higher inside than outdoors. This is very problematic since humans spend 90% plus of their time indoors. In fact, the EPA's Total Exposure Assessment Methodology (TEAM) studies have found VOC levels including about a dozen common organic pollutants to be 2 to 5 times higher inside homes than outside, regardless of whether the homes were located in rural or highly industrial areas. Additional TEAM studies indicate that while people are using products containing organic chemicals, they can expose themselves and others to very high pollutant levels, and elevated concentrations can persist in the air long after the activity is completed.

Previously, methods for treating air for VOCs have included the use of basic media filtration units, such as including MERV or HEPA filters that in and of themselves are not effective for removing VOCs. Hence, while media filters are a staple of filtration, and in various instances, effective against some particulates, they do not stop VOCs and/or gases, which easily pass right through such filters. The present PCO module 51, however, has been configured for efficiently and effectively purifying air of VOCs and harmful gases. Particularly, as determined herein, the PCO filter module 51 is effective for deactivating biologicals, including bacteria, fungi, viruses, as well as eliminating volatile organic compounds (VOCs), such as paints, solvents, chemicals, and pesticides, and reduces odors, such as cigarette smoke and ash, garbage, animal odors, and the like. For instance, the present PCO filter module 51 evidences high level and broad-spectrum biocide efficacy, and is very effective at removing different types of VOC gases that are harmful to humans. For example, photocatalysis has broad-spectrum microbicidal activity that is effective for deactivating both enveloped and non-enveloped viruses.

In performing such PCO operations, the PCO module 51 may use a mesh screen 56, such as a metal oxide, e.g., a $TiO_2$ or zinc oxide mesh, in addition to UV lamps or UVC LEDs 57, as reactants. Particularly, reactive $TiO_2$ has been found to be beneficial for use in treating air contaminated with VOCs. Specifically, a $TiO_2$ mesh framework 56 can be employed in the PCO module 51 as an environmentally friendly microbicidal agent for providing high level and broad-spectrum biocide efficacy during photocatalysis, which can be achieved without producing ozone.

Ozone, a lung irritant, is produced indirectly by ion generators, and other electronic air cleaners, and directly by ozone generators. While indirect ozone production is of concern, there is even greater concern with the direct, and purposeful introduction of a lung irritant into indoor air during a purification process. There is no difference between ozone outdoors, such as in smog, and ozone produced by ozone generation devices. Under certain use conditions ion generators and other ozone generating air cleaners can produce harmful levels of lung irritants.

Accordingly, because the present air purification system 50 does not perform ionization reactions, ozone and other harmful gases, such as formaldehyde, are not produced. Likewise, because the present system 50 is configured for purifying air without ozone production, it has several advantages over currently available indoor air purifiers. Particularly, typical air purification systems, e.g., ionization systems, are configured for performing ionization reactions during the purification process, which in turn generate ozone, which is known to cause health issues. More particularly, ionization-based air purification creates ozone as a byproduct of their air purification process. Although it is suggested that these devices provide a benefit by rectifying a hypothesized ion imbalance, no controlled studies have confirmed this effect. Consequently, such ozone generators, and other mechanisms that produce activated oxygen, energized oxygen, and/or super oxygenation, are not ideal mechanisms for air purification.

Such ionization-based air purification methods, e.g., employed by Ozone or Vaporized Hydrogen Peroxide (VHP) generators, involve putting chemicals and/or harmful gases into the air to disinfect it. For instance, ozone generators are sold as air purifiers that intentionally produce ozone. This leads the public to believe that these devices are safe and effective in controlling indoor air pollution. However, for almost a century, health professionals have refuted such claims. Likewise, VHP is considered a sterilant that destroys all types of microbial life, and so VHP generators are configured to produce VHP from a solution of liquid $H_2O_2$ and water. However, in its use, rooms are normally sealed when VHP is produced, and exhausted prior to human occupants resuming entry into the rooms. While both ozone and VHP are effective for disinfection, they can be very harmful to human health.

The present devices and systems, as well as their methods of use, focus on air purification without introducing such harmful chemicals into to the air, as do ozone and VHP generators. In fact, the harmful chemicals produced by such generators negate the effectiveness and purpose of air purification by adding additional health risk to human occupants. In some cases, disinfection-based chemicals and VOC's that are produced from archaic air purifiers, and their effects, might not be known for many years. Further, such old devices proffer no central control point to ensure that harmful particulates can be captured.

The present air purification system 50 not only mitigates these health risks, but avoids them all together. Particularly, the present AP system 50 aims to purify air without emitting other gases, and actually monitors the air for the presence of harmful gases, so as to more effectively and efficiently improve the air quality. Installing a traditional air purification device has no certainty as to whether it actually purifies the air or whether it emits other byproduct gases from its process. The present novel overall system 1 addresses this by providing an indoor air quality monitoring platform 20, in addition to an air purification system 50, which continually monitors the indoor air quality, and generates useful data for system analytics 40 to analyze and adaptively reconfigure the system components in response thereto. The data related to the quality of the air and the results of the sensing and reconfiguring operations may also be reported to stakeholders.

Another problem with archaic air purification systems is that they process air through local individual units. This is acceptable to treat one room, but for purifying the air for a whole building, it is not sufficient to treat all of the air in a building. Even with multiple portable units there would be gaps of service in hallways or in large rooms.

A further issue also exists for ionization-based products in that all of the ions do not saturate all of the air in a room, especially if there is either insufficient ventilation or dead or dropped air zones in a room. Standard ionization-based air purifiers also suffer from the fact that the ions they produce are short lived, lasting only 30 to 60 seconds. Thus, such ions have very little time to treat a significant portion of the environments into which such instruments are positioned. Accordingly, such systems are inefficient and unreliable. The present HVAC system 1, however, may be configured to include an in-duct air purification system 50, which may be adapted to solve this issue by creating a single control point in which to service all of the air in the zone(s) that the HVAC system 10 services. In such a configuration, all air in an environment may be sucked into the return registers, may be processed through the centralized air purification system 50, and the ben pumped back out through the supply registers.

As indicated, in various instances, the present air purification systems 50 and devices 51 may include an ultra-violet light 57 for use in purifying air. UV effectiveness against microbials is based on several factors such as UV irradiance, distance from microbial targets, exposure time, air-flow velocity, UV light wave-length, UV band, reflectivity of surrounding ducts and light angles from UV source. However, although ultra-violet light can be effective against viruses and bacteria, there are significant challenges to deploying the technology without the light exposing humans in a detrimental manner. Particularly, when used in the past as a means of purification, implementations either needed to be operated with humans out of the room, or in a manner so as to prevent direct exposure of harmful UV light to humans.

For instance, while UV light may be used in ducting 19 of an HVAC unit 10, typical HVAC air velocities provide a short time for exposure as a pathogen or microbial passes by them. This limits the effectiveness of UV's employed in ducts versus their direct use for air decontamination. Further, UV technology, employed by itself, does not protect against other forms of air pollution and contaminants such as particulates, VOCs, or CO. UV lights have also been known under some implementations to produce ozone and to also produce VOC's. Additionally, UV lamps based typically with mercury vapor, generally operating in the 253-254 nm range, also lose effectiveness over time. Notwithstanding, UV may be effective for decontamination of HVAC coils because of constant exposure to the coil. However, UV lamps based typically with mercury vapor, generally operating in the 253-254 nm range, lose effectiveness over time. Particularly, due to long start up times necessary to reach peak operating levels, they are often left on, and therefore will diminish even more quickly. Consequently, there are several problems with using UV light for the purpose of disinfection.

As discussed herein, the present air purification system 50 overcomes these difficulties by employing UV lamps or UVC LEDs 57 in combination with a reactive, e.g., metal, matrix 56, such as composed of $TiO_2$, which together reduce volatile organic compounds that could otherwise populate the air flowing through HVAC ducting 19. Specifically, UV light 57 is directed to the titanium dioxide or zinc oxide mesh grid and/or matrix 56 in order to create a catalyst that reduces VOCs so as to maximize the VOC reduction and virus deactivation. More specifically, the titanium dioxide or zinc oxide grid presents a surface through which air in the ducting 19 flows, and upon contacting the surface, a photocatalytic oxidation reaction occurs in a manner such that organic compounds present in the air become reduced, and thus, VOC reduction is maximized.

Figure 3:
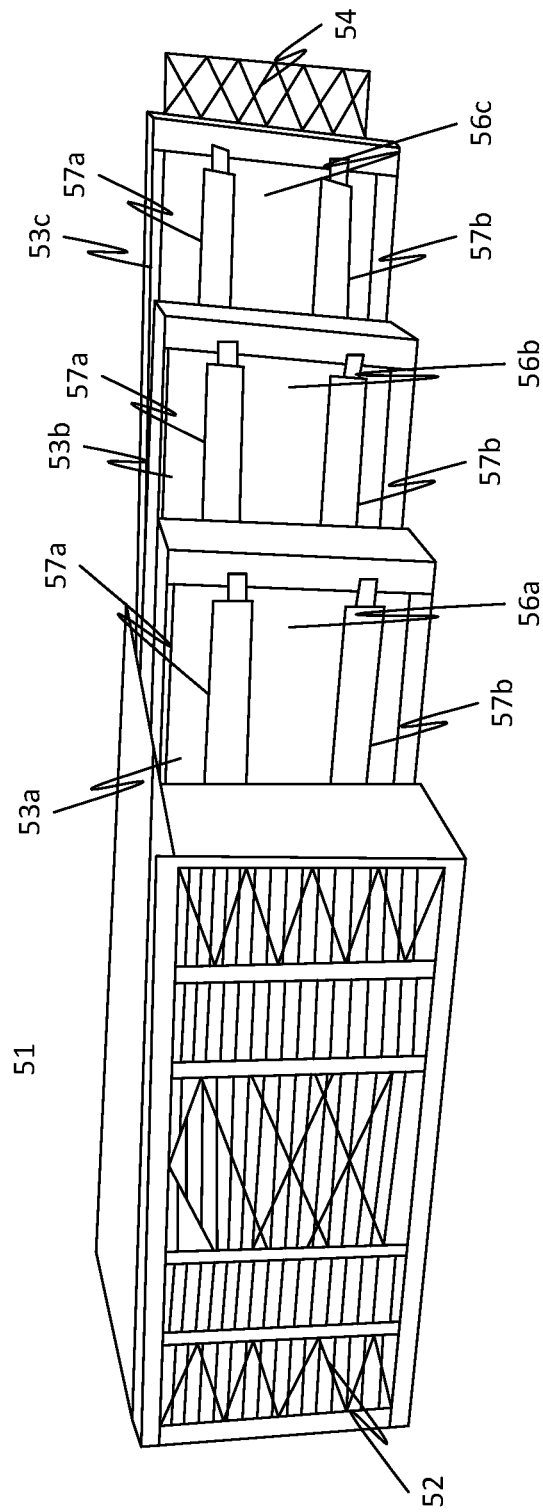
FIG. 3 is a representative embodiment of an air purification unit of the disclosure.

Accordingly, in one aspect, as can be seen with respect to FIG. 3, provided herein is an air purification system 50 that includes one or more photocatalytic oxidation (PCO) filtering modules 51. Particularly, the PCO module 51 may include a plurality of filtering elements. For instance, the air purification module 51 may include pre-filter 52, filtering 53, and post-filtration 54 chambers. For example, in various embodiments, the purification system 50 may include a pre-media based filter 52 chamber, such as for stopping particulates and keeping the other PCO chambers clean of larger particles and debris, followed by one or more, e.g., 4, photocatalytic oxidation chambers (PCO) 53, followed by a post filter chamber 54, all of which can house different types of media filters.

Particularly, in a particular embodiment, provided herein is a commercial and/or residential air purifier 51 that is designed for use at work and home environments where superior air quality is essential. More particularly, in various instances, the present high efficiency particle filtration system 50 may include, one or more, such as two, three, or four or more stages of PCO chambers and/or modules 53 that are configured for purifying the air from VOCs, viruses, bacteria, and the like. Accordingly, as depicted, the air purification system 50 may include a housing in which the various PCO chambers 53 are retained and operated. In this embodiment, the air purification module 52 includes a pre-filter 52, which can be a high efficiency filter, three PCO chambers, 53*a*, 53*b*, and 53*c*, and a post filter 54, which may be a potassium permanganate filter. In this instance, each PCO chamber may include a plurality of UVC germicidal lamps or UVC LED's 57*a* and 57*b*, and an active metal matrix 56*a*, 56*b*, 56*c*, e.g., composed of silicon dioxide. Additionally, each UVC lamp or UVC LEDs 57 may be at least partially covered by a translatable screen or flap 58 that is capable of rotating in a manner so as to direct the reflection and/or refraction of the light emitted by the lamps 57. For instance, a plurality of angled flaps 58 may be included, such as positioned before, in between, and/or after the UVC lamps 57 and/or the titanium dioxide grid 56. In particular embodiments, the housing enclosure may be formed of a metal structure that includes a grating that allows air flow to pass through the unit from one side to the other in and through each of the different modules. Each filtration chamber may be configured as a module that can be removably coupled together and insertable and removable from the housing. These controllable flaps or ballasts can also be used to control direct to face and focus on particular areas of the ducts where greater air flow is detected. It's normal that the air flow in ducts will vary across the height and width of the duct. The systems static pressure measurements in versions of the product with full traversal averaging pitot tubes can detect which part of the ducts have greater flow and control the UVC Lamp and or UVC LED's to focus on the areas with greater flow.

The air purification system 50 may be positioned in a variety of different locations in relation to the HVAC unit 10. However, generally, the air purification system 50 may be installed upstream or in a return portion of the HVAC ducts 19, and as air is pulled through the HVAC unit 10 via the forced air unit (FAU), the air is drawn into the grating and through the various filter chambers 53, thereby becoming purified. The air purification unit 51 can also be installed after the FAU, e.g., on the supply side, where the air may be pushed through the unit 51. Accordingly, in certain embodiments, a portion of the air purification system 50 may be installed within the ducting 19 of the HVAC unit 10.

For example, a suitably sized air purification unit 51 may be configured for being coupled to, or otherwise positioned within, the ducting 19 of an HVAC unit 10. In such an instance, the air purification unit 51 may include a housing having a plurality of air purification chambers, wherein each chamber, and the housing itself, may be air sealed so that air cannot escape except for passing through the system from one direction to the other. For example, each of the chambers or modules 53 of the air purification unit 51 may be separated one from the other via one or more enclosed and sealed compartments, such as via a compressible gasket along its bounding edges. Particularly, in some embodiments, the housing of the air purification unit 51 may include three, four, or more chambers, separated by three doors, such as one door for a pre-filter chamber 52, one door for the photocatalytic chambers 53, and one door for the post-filter chamber 54.

Figure 4:
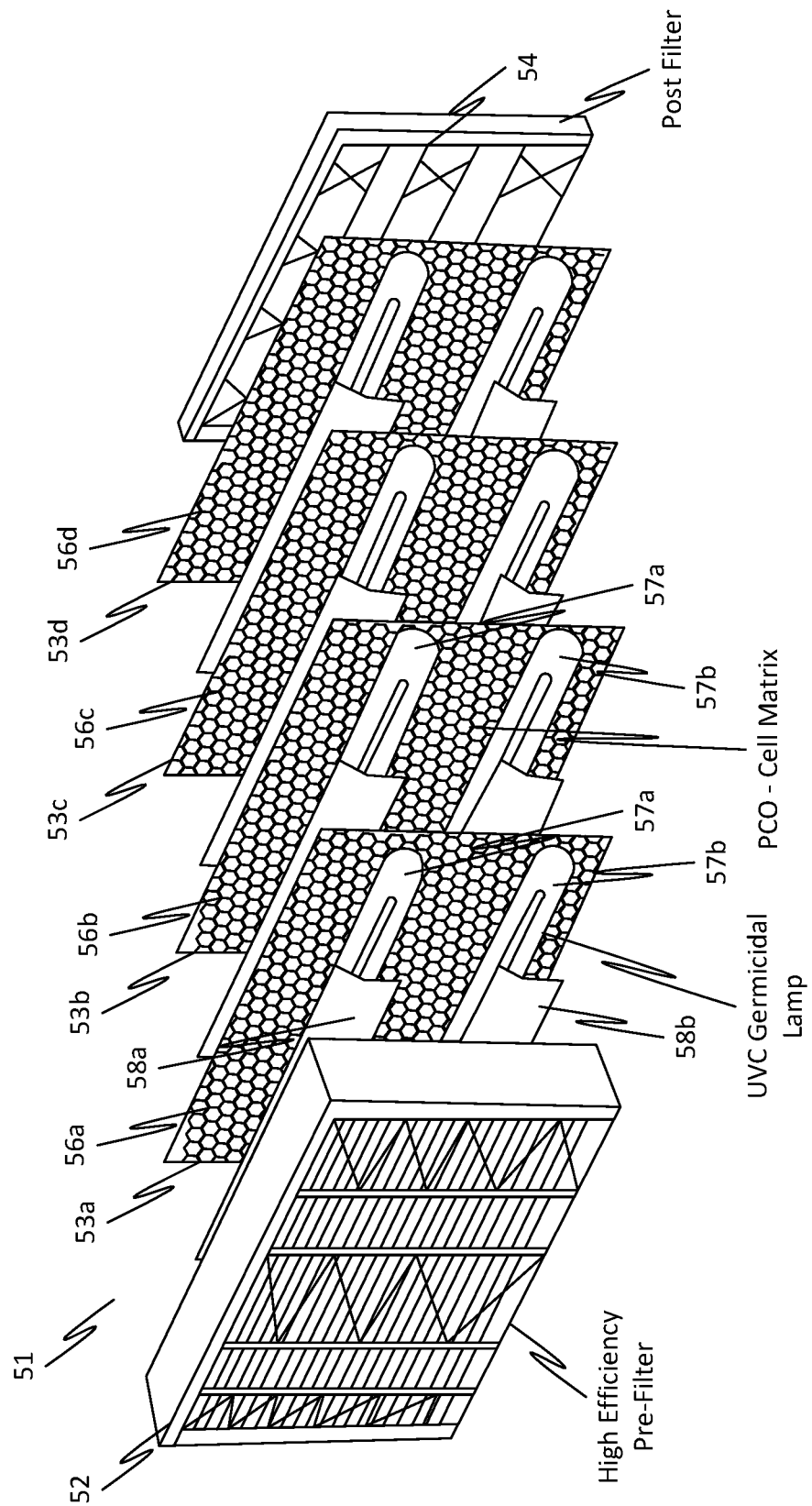
FIG. 4 is another iteration of a representative embodiment of an air purification unit of the disclosure.

As depicted in FIGS. 3 and 4, each of these chambers may all be powered by a single incoming power cable that has wiring daisy chained to power each of the chambers. When the door(s) are opened, each chamber module can be slid in and out of the whole assembly housing so that it can be serviced. Service generally includes replacing the UVC lamps 57 which may degrade over time, or which with use of LED UV generating lights may be long living. A typical timeframe for replacement may be every year to several years, but they can be run longer if desired. Generally, where UVC mercury-based lamps are employed, these lamps will lose their intensity overtime and therefore, be less effective in the photocatalytic oxidation process. Other items, such as light ballasts, can be replaced as well and can easily be reached when the chamber module is pulled out. UVC LED's may alternatively be used to provide different UVC light wave lengths, allow for turning on or off as needed and extending the life of the UVC light aspect of the system by several years more than traditional UVC lamps.

Accordingly, in various embodiments, the air purification unit 51 may include a plurality of chambers. For instance, the air purification unit 51 may include a first chamber that is composed of a pre-filter module 52 having a high efficiency filter. For example, the pre-filter chamber 52 may generally include a pre-filter, such as a 4" wide pleated MERV-11 to MERV-13 filter. Smaller filters may be useful for HVAC systems that are static pressure challenged. On the other hand, a stronger, larger filter, such as a HEPA filter, can be used for HVAC systems with strong fan motors. The prefilter chamber 52 functions to stop particulates and catch as much of particle pollution as possible, prior to the ingress of air into the PCO chamber 53. However, besides cleaning the air of particulates, it also helps keep the rest of the system clean from dust and particle build up. The pre-filter chamber 52 can also include a carbon filter layer infused in or before or after the main filter construction. In various embodiments, the pre-filter element can be made of recyclable material so that the pre-filter may be periodically thrown away and replaced when used up.

A second chamber may also be included, such as where the second chamber 53 may be communicably coupled to the first chamber 52, and may be configured as a photocatalytic oxidation (PCO) chamber 53 that may include two, three, or four or more photocatalytic oxidation modules. In particular instances, the PCO-Cell chamber 53 includes one or more UV lamps 57 and a maintenance free core of coated titanium dioxide mesh 56. The main function of the PCO modules 53 is to breakdown volatile organic compounds, and other harmful gases, as well as to inactivate viruses and kill other microbials present in air flowing through the HVAC unit 10.

In various instances, the PCO chamber 53 may include a plurality of PCO modules, where the more PCO modules there are, the more VOC breakdown will be achieved, and the greater efficacy vs. viruses and microbials per pass through the system. In one embodiment, for example, the PCO chamber 53 may include 1, 2, 3, or even 4 or more PCO modules, which number of PCO modules may be increased or decreased as desired, dependent upon the configuration of the environment to be serviced by the HVAC unit 10. Hence, the present air purification system 50 is readily configurable and reconfigurable such that additional PCO modules can easily be added into the PCO chamber 53, such as at the end of the main unit, so as to provide virtually an unlimited number of additional chambers, e.g., 5, 6, 7, 8, etc., only limited by available space within the HVAC ducting build.

In various instances, the PCO module 53 itself may be configurable, such as with respect to the number of mesh screens 56, UV lamps 57, and positionable flaps 58 present in the module 53, as well as their configurations with respect to one another. For instance, in one embodiment, in relation to the UV lamps 57 and reactive mesh screen 56, e.g., titanium dioxide or zinc oxide grids, one or more angled flaps 58 may be included, such as positioned before, in between, and/or after the titanium dioxide grid 56. In certain instances, the angled flaps may be coated with mirrors, aluminum, and/or other metals that have a high UV light refraction. This configuration allows for the light that passes through the titanium dioxide grid 56 to be shined back at the back side of the grid and back at the incoming air.

However, in certain embodiments, the flaps 58 may or may not be angled back at the titanium grid 56, but may be at opposing sides of the duct chamber to create subsequent refraction back and forth across the duct for the length of the additional refraction flaps. This allows for the light that passes through the titanium dioxide grid 56 to be shined back at the incoming air creating additional exposures to the air. As indicated, in various instances, the reactive matrix grid 56 may be composed of zinc oxide, or other reactive metal, that is capable of creating a photocatalytic oxidation process that may provide different VOC elimination performance and different virus deactivation abilities depending on the virus or bacteria.

Additionally, in various embodiments, the air purification unit 51 may include a further, e.g., a third or more, chamber configured as a post-filter chamber 54. For instance, a post-filter chamber 54 may be provided wherein the post-filter chamber 54 enables a variety of additional filter media options to be utilized and customized for different environments. One example is a carbon filter that may be present and used in environments with a lot of smells. Another example is a potassium permanganate filter that may be provided and configured for effectively removing odors and VOC's so as to further the system's ability to treat such pollutants in a first pass. The post-filter chamber 54 can also be left empty if the HVAC system is static pressure challenged.

Accordingly, in view of the above, the overall air purification process of the system contains multiple stages aimed at purifying air in different ways. For instance, as indicated, a first stage 51 may include a particulate filtration stage. Particularly, in various embodiments, the first stage of filtration 51 may utilize a suitably configured filter that is configured for filtering out large particulates. The EPA classifies such particulate matter as one of the main sources of pollution.

The present system may employ a wide range of particulate filters including up to the best performing MERV and/or HEPA filters to screen out 99.97% of particulates. Particularly, the pre-purifying chamber may include a particulate filter that may have an efficiency of about 95% to about 97% to about 99.9% for particle sizes from about 0.3 to about 5 microns. Likewise, employed filter may be further adapted for allergen reduction, which reduction may be from about 95 to 99.9%, such as for removing dust, such as lung damaging dust, dust mites, dust mite residue, pollen, smoke and ash and the like.

While it may be desirable to use the highest level of particulate filtration possible, the higher the level of filtration, the higher the static pressure that is created in the HVAC system, making it more difficult to push the air through the system. Therefore, particulate filtration needs to be matched to system operational parameters so as to not overburden it. If a system is overburdened in this fashion many problems can arise including no air flow and freezing over the coils and associated refrigerant lines in cooling mode. The present system 1 over comes these problems by including an IAQ module 20 for determining when static pressure is building up, and reconfiguring system components, e.g., blowers 16a, fans 16b, valves 14, automated refraction flaps 58, and the like, so as to modulate air flow to more precisely match filtering needs with air flow and internal pressure or by notifying facility managers or owners that the filter media needs to be replaced.

Further, the overall air purification process of the system may include a second or more, e.g., a photocatalytic oxidation (PCO), stage 53, where in a photocatalytic oxidation reaction occurs by exposing a reactive metal mesh 56, e.g., of titanium dioxide ($TiO_2$), to ultraviolet (UV) light rays 57. Particularly, when VOCs (Volatile Organic Compounds), e.g., gaseous contaminants and odors, in the air come into contact with a photocatalytic oxidation reactive coated surface 56, they are converted to odorless, harmless water vapor and carbon dioxide. Specifically, the metal dioxide, e.g., titanium dioxide, catalyst is activated by UV light which then neutralizes biological contaminants such as bacteria, viruses, mold and fungi. When used properly, photocatalytic oxidation is a powerful air sanitizer ideal for controlling air quality. Another filtration stage may be present, e.g., a post-filtering stage 54, so as to provide a third layer of additional filter medium that can be made with different materials to fit specific building applications. One such example is a potassium permanganate filter or a carbon filter that may be used to screen out smells.

Accordingly, provided herein is a multi-stage treatment unit and process that may be configured for effectively and efficiently cleaning the air of an environment in a single pass, such as for systems of up to 6.0 tons or more. However, there are smaller versions for smaller HVAC units that may be in the 2.5-5 ton range, but the larger multistage units can handle up to 6 tons and more, and can be combined together to handle larger HVAC units. A very typical size in commercial HVAC units may be 5 tons, which can then be scaled up incrementally, e.g., up to ton, 20 ton, 30 ton, etc. A unique aspect of the present systems, therefore, is that the air purification units 51 are configured for being coupled together in a manner to scale up and purify the air of larger spaces having larger HVAC units. Hence, the modular basis of the present air purification system 50 allows for combinations to handle larger spaces and larger HVAC units by increasing the ducts with a transition by the combined units and then reducing the duct down to its normal size after the air purification units.

Particularly, the system's effectiveness may be multiplied in recirculating HVAC systems where the air quality improves with each pass. Particularly, in various embodiments, a recirculating system may be provided, such as where the system can be outfitted with optional pre- and post-filters, so as to trap targeted gases, while optionally or additionally including one or more PCO modules. More particularly, the present system may include a multiplicity, e.g., four or more chambers of photocatalytic oxidation, a pre and post filter of potassium permanganate or other filter options such as carbon, depending on the application. Additionally, in certain instances, an exhausting system may be provided, such as where the system can be outfitted with a number of pre and post filter chambers in addition to one or more optional PCO modules, which have been configured optimize output and completely eliminate odors from being emitted outside of a facility or building. In various instances, an all-purpose charcoal filter may also be provided in one or more of the modules so as to further control odors.

Specifically, these configurations are useful because in typical HVAC systems the exhausting mechanisms are generally geared to remove 'stale' air by simply recirculating it, and in some instances may provide minor CO and $CO_2$ filtering, such as from smoke or fumes, so as to minimally reduce the concentration of CO or $CO_2$, but by expelling it into the ambient environment. However, while in low concentrations CO and $CO_2$ are normally exhausted into the environment without concern, in some buildings these exhausts can be dangerous to humans or the environment or both. Some examples of such facilities include a factory emitting dangerous VOC's, a biosafety lab potentially emitting aerosolized microbials, or a hospital emitting potentially infectious air from patients. Other such facilitates include any number of buildings of various forms, including, for instance, schools, hospitals, medical clinics, veterinarian hospitals, specialty clinics, laboratories, clean rooms, all environments with inks, solvents, and VOC generating chemicals, gyms, health clubs, salons, retail shops, factories, printing companies, furniture and fabric stores, and the like.

Figure 6A:
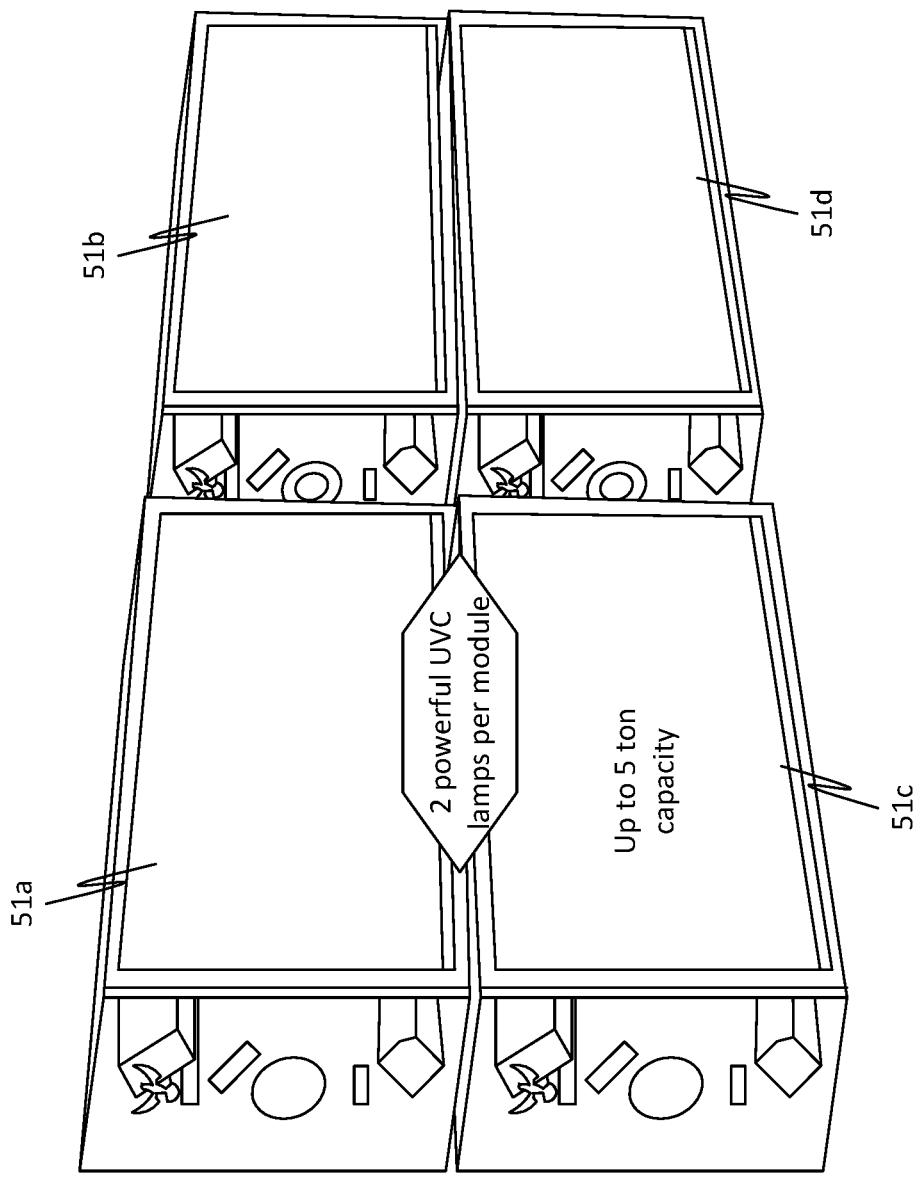
FIG. 6A presents the air purification unit of FIG. 5B, in a stacked configuration including 4 individual units combined together and stacked.
Figure 6B:
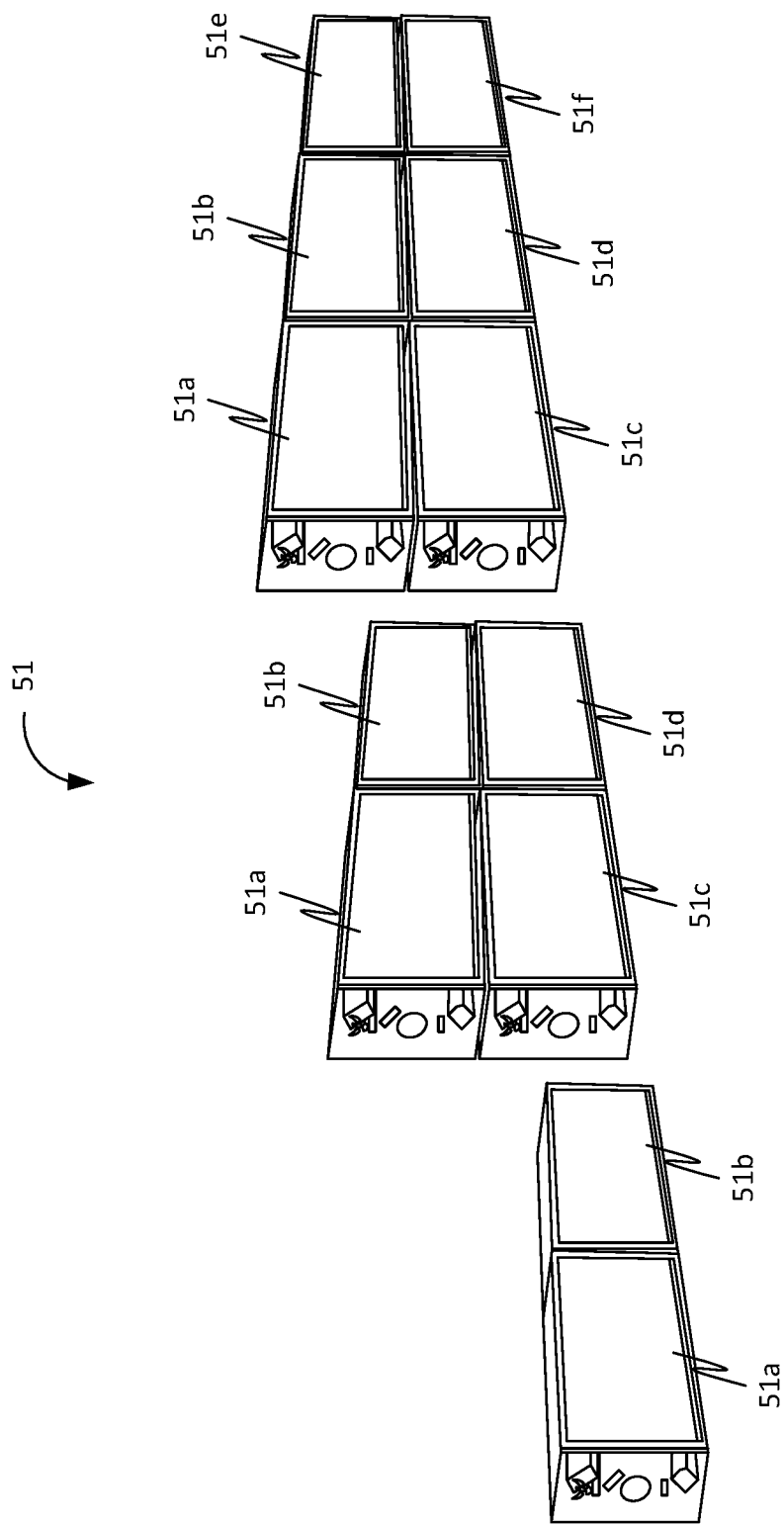
FIG. 6B is a further presentation of the stacked units of FIG. 6A in a two-, four-, and six-unit configurations.

Hence, as can be seen with respect to FIGS. 6A-6B, a unique aspect of the present air purification system 50 is its modular design that allows the various air purification modules 51 to be coupled, combined, and stacked, one on top of the other like LEGOS®, so as to be adaptable for providing sufficient air purification that is configurable based on the needs of the environment to be serviced. For instance, as depicted, several air purification, e.g., PCO, units 51 can be coupled together to form a complex of purification units, for example, where two units 51a and 51b, can be coupled together, and then stacked on top of another set of coupled together units 51c and 51d, in such a manner that each individual unit can be controlled separately or collectively together or in any combination, such as including 6 units, 51a, 51b, 51c, 51d, 51e, and 51f, or more. In such a manner as this, the air purification units can be coupled together, e.g., dependent upon the area of the environment needed to be serviced, so as to ensure the collective air purification units are capable of servicing the amount of air within the serviced environment.

In certain embodiments, various of the air purification modules 51 disclosed herein may be configured so as to be larger or smaller so as to accommodate the HVAC units 10 sized to fit within a variety of environments. Hence, in particular embodiments, versions of the air purification module 51 may generally be configured so as to be of a size, e.g., a normal size, so as to fit within the main HVAC duct system 19, or they may be configured so as to be smaller so as to fit within the air exhaust, which is a much smaller duct and air-stream. However, in very large buildings, where there are large streams of exhaust, the normal or larger sized units can be used. Consequently, the present air purification 51 and/or indoor air quality sensor 20 modules can be configured and positioned so as to purify and measure the air going through the exhaust to ensure that the air admitted is not environmentally dangerous. With newly expressed interest by companies in maintaining their ESG (environmental, social and governance) programs, the present system gives such companies an additional tool and functional area to report on and the ability to actually improve the outgoing air, not just measure it.

Further, similar to the exhaust, air intakes are an important part of the HVAC system, but generally feed into the main trunk of ducting and are always of smaller duct sizes. The purpose of the air intake is to bring in fresh air. Depending on the building jurisdiction, there will be different requirements as to how much fresh air to bring in to reduce the $CO_2$ counts in the internal space. While bringing in outside air in theory is a good thing, in some cities and environments the outside air might be worse that the inside air. Examples of this might be a building close to a freeway or factory that is emitting pollutants.

Additionally, there might be situational times where the air is bad in the case of large-scale forest or other fires. In some areas near volcanoes, e.g., Hawaii, there are not only smoke and ash contaminants, but other dangerous gases such as sulfur dioxide and hydrogen fluoride. In all of these situations, there is the need to purify the air before it enters a building. One embodiment of the system is focused on purifying the air within the air intake module, in which case the air purification 51 and/or sensor 20 modules may be configured, like the modules used in the exhaust, so as to be of a smaller version than the main in-duct unit version employed in the larger HVAC duct. Hence, depending on the application and the need, the system 50 can be configured with a pre-filter 52, PCO chamber 53 or multiple chambers and a post filter 54, and each of these elements can be tailored to the exact need and size of the particular building so as to efficiently and effectively service the building's inside and outside environment.

As indicated above, the overall system 1 may include an Indoor Air Quality monitoring system 20 that is configured to monitor air quality, such as within and through HVAC ducting, and the environments it serves. Thus, the present IAQ system 20 is configured to work synergistically with the air purification portion 50 of the system 1. Accordingly, as described herein, the system may also include the ability to monitor the incoming air being pulled into the ducting 19 as well as the air inside the building. Additionally, the system can detect through it is monitoring, if the outside air is better or worse than the inside air and can adjust and regulate the damper to open, close, or partially open based on whether it's better to take outside air or not. The present system can additionally account for and make decisions based on VOC levels, $CO_2$ levels and particulate levels.

Accordingly, as can be seen with respect to FIG. 4, in various embodiments, the present air purification system 50 may include a plurality of air purification elements or stages including one or more high efficiency filters 52, PCO modules 53, including one or more UVC germicidal lamps or UVC LEDs 57 and PCO-cells 56, as well as one or more post filters 54, which may include a potassium permanganate filters, and/or other optional filters, such as a carbon filter. For instance, as can be seen with respect to FIG. 4, the first module or stage may include a high-performance pre-filter 52. The pre-filter 52 may generally be a 4" wide pleated MERV-13 filter, but can also be a lesser model such as MERV 11, such as for HVAC systems that are static pressure challenged, or a HEPA filter for HVAC systems with strong fan motors. The prefilter function is to stop particulates and catch as much of particle pollution as possible. The pre-filter may be periodically exchanged by a fresh filter. Besides cleaning the air of particulates, it also helps keep the rest of the system clean from dust and particle build up. The pre-filter 52 can also include a carbon filter layer infused in or before or after the main filter construction.

The next stage is the photocatalytic oxidation (PCO) stage 53 and can include two, three, or four or more photocatalytic oxidation chambers. For instance, in this instance, the air purification module includes four PCO chambers 53a, 53b, 53c, and 53d. wherein each PCO chamber includes a mesh metal oxide or dioxide grid 56a, 56b, and 56c, and a plurality of light lamps, such as UVC light lamps or UVC LED's 57a and 57b. Additionally, each PCO module 53 may include a plurality of moveable refractive flaps 58a and 58b, which can be positioned proximate the UVC lamps or UVC LED's 57 and can be moveable so as to direct the incidence by which the UV light engages with the meta mesh 56. For instance, depending on the air flow and its directionality, as well as the positioning of the UVC lamps 57 relative to the mesh 56, more or less light may be made to hit the mesh 56 at a variety of different angles.

As described herein, the main function of the PCO chambers 53 is to breakdown volatile organic compounds, and other harmful gases, and to inactivate viruses and kill other microbials. Each PCO chamber 53 includes a UV light source 57 which is oriented to light up a titanium dioxide or zinc oxide coated mesh grid 56. When the UV light hits the titanium dioxide it creates a catalyst that creates a chemical reaction in the pollutants rendering them into non-toxic gases.

With respect to the UV light source 57, present system allows for multiple different types of UV generated light, such as where UV LED lights and/or mercury vapor lower powered lamps may be used. The low powered mercury lamps operate in the UVC band of light at 253.7 nm. One of the benefits of this particular wavelength is that it does not get absorbed by oxygen molecules and consequently does not create any ozone. The UVC LED's have multiple benefits over the mercury based UVC lamps including the ability to be turned on and off without any warm-up time to full efficacy, whereas UVC lamps generally take 10-15 minutes to stabilize when they are turned on, and therefore are often left on all the time. The ability for UVC LED's to be turned on or off at any time makes the overall system more energy efficient with the ability to turn them off when not needed. Hence, the present system includes control circuitry that allows the onboard control unit 25 to control the turning on and off the UV lamps, and/or to schedule their control to accord with the times when the environment serviced is typically filled with people.

In addition, the system has the option to utilize UVC LEDs at different wavelengths, such as in the 265-280 nm range. For instance, different LED diodes can be selected with their different corresponding nm range, which can be targeted for different environments. For instance, a 265 nm is known as the theoretical maximum deactivation range for viruses. However, some viruses and bacteria and VOC's might deactivate/deconstruct better at one range vs others. Hence, some environments may have a known issue with a specific virus or VOC, and therefore with the different UVC LED diode choices, the system can determine and autonomously select the best option for those environments. Additionally, the PCO-Cell module may include a maintenance free core of coated titanium dioxide or zinc oxide mesh. Like the ability to choose different UVC LED's, the ability to choose a different catalyst medium such as zinc oxide, or other UV initiated reactive metal oxide, allows for different photocatalytic oxidation processes.

The final stage is the post-filter chamber 54. This enables a variety of additional filter media options to be utilized and customized for different environments. One example is a carbon filter for environments with a lot of smells. Another example is a potassium permanganate filter which are effective in removing odors and VOC's and further the system's ability to treat such pollutants in a first pass. The post-filter chamber 54 can also be left empty if there if the HVAC system is static pressure challenged.

Figure 5A:
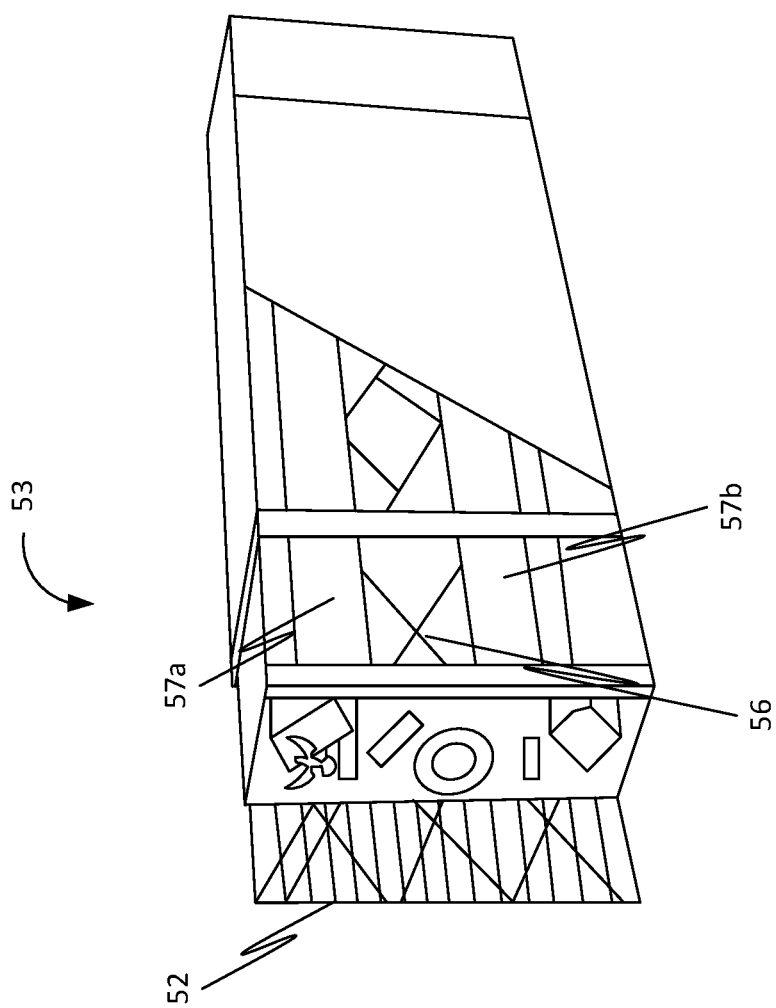
FIG. 5A is a further representation of an air purification unit of the disclosure, in a state of being assembled.
Figure 5B:
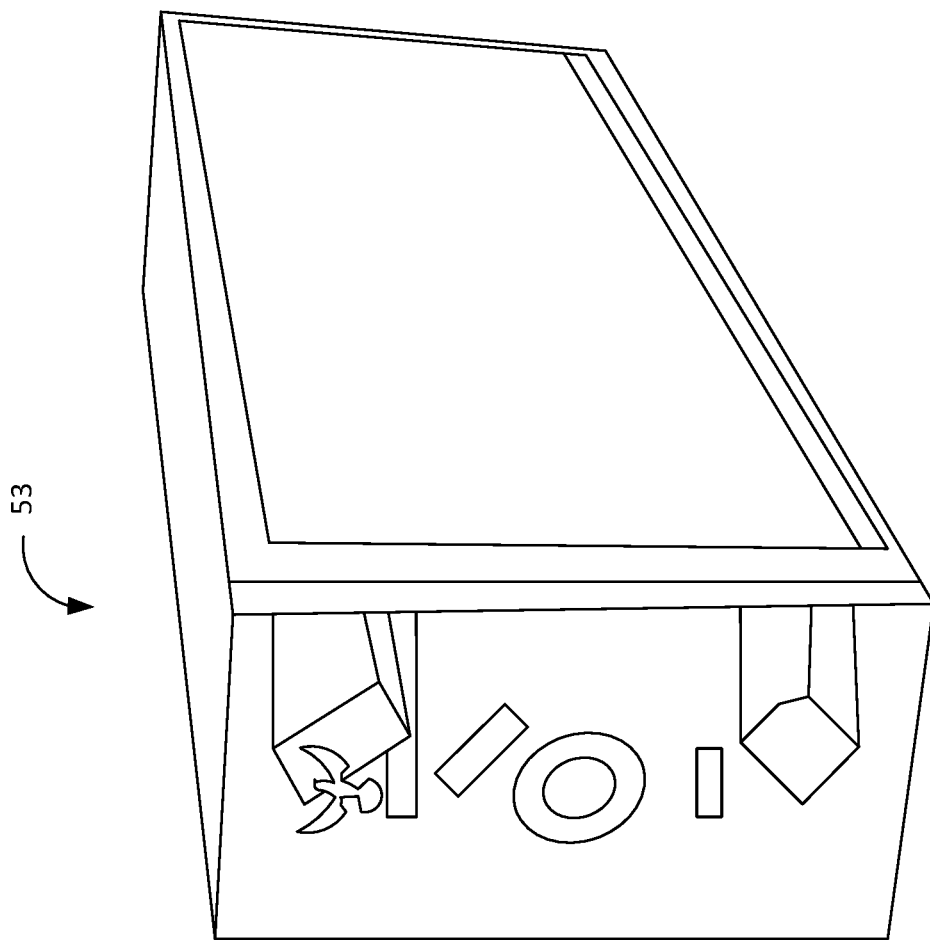
FIG. 5B is the representation of the air purification unit of FIG. 5A as fully assembled.

As can be seen with respect to FIGS. 5A and 5B, in various embodiments, the components within the air purification unit can be customized with respect to a user's use model and/or desired dimensions so as to fit within the user's environment and with regard to the space it is to service. For instance, the unit may be of a relatively small, medium, large, or extra-large size, wherein the size of the unit may be determined based on the number of filters 52/54, UVC lamps 57, and/or PCO-cell panels 56 are to be included, all of which can be included in a single form factor. For example, presented in FIGS. 5A and 5B, is an interior and exterior embodiment of a proprietary, custom built modular air filtration and purification unit. Each customized unit may include a high efficiency filter, such as a four-inch MERV 13 high efficiency filter, e.g., pre-filter 52, one or more, e.g., a plurality of, UVC germicidal lamps 57, and one or more reactive matrices 56, and a post filter 54, which may be sized according to the selected dimensions, such as about 22 inches, which may contain a PCO-Cell honeycomb matrix panel. In particular embodiments, the UVC lamps 57 may include magnifying reflectors, such as for maximal microbial reduction, and together with the PCO-Cell honeycomb panel, they eliminate toxic VOCs. In various instances, the air purification units, and the system they form, may be configured for residential or commercial use, and as indicated, include the PCO and filtration technologies described above. Particularly, the unit may include a 3-in-1 package, as shown in FIGS. 5A and 5B, which is scalable and customizable for either residential and/or commercial applications, and in a single or multi-unit configuration can service up to 50 tons, e.g., in a stacked arrangement.

For instance, as can be seen with respect to FIGS. 6A and 6B, the air purification units 51 are configured for being coupled together and/or stacked so as to be adaptable with regard to the number of units that are employed for servicing a given environment. Particularly, in this embodiment, the customized unit may be sized for a typical 5-6 ton installation, but the units can be paired, coupled together, and bundled so as to increase the air cleaning capacity and power. For example, as can be seen with respect to FIGS. 6A and 6B, the units 51 are configured so as to be stackable and/or bundled together such as to handle a capacity up to about 50 tons, e.g., in a 8-unit bundle. Hence, the units are scalable and customizable, where the filtration ability of each unit is highly efficient, and is largely maintenance free and serviceable, such as from the end panel. In various embodiments, the units may include from about 2, 4, 6, 8, 10, or more powerful UVC lamps in each cube, and may further include one or more PRO-Cell matrices and magnifying reflectors that are configured for magnifying the UV power and purifying the air.

In view of the above, the various dimensions of the air purification units may vary in accordance with the demands of the environment to be serviced and may be sized to handle from 1 to about 6 tons, at a voltage from about 110V to 220V. The UVC lamp may have a wattage of per lamp. Each PCO chamber uses 2 lamps. Light intensity is 70 μW/cm2 at 1 m whereas UVC LED modules may include 60 mW, 70 mW or 80 mW LEDs. Static pressure may be from about 0.30 or about 0.32 in WC at about 1,200 to about 1,600 CFM. The filter may have dimensions such as 16 to 20H×25 W×4D, and may have an efficiency of particulate reduction at 0.30 microns of about 92.3%. The dimensions of the units may range from about 17 to about 21H to about 23 to about 30H; about 25 to 31 W; and about 10 to about 29 or 30D.

Figure 6C:
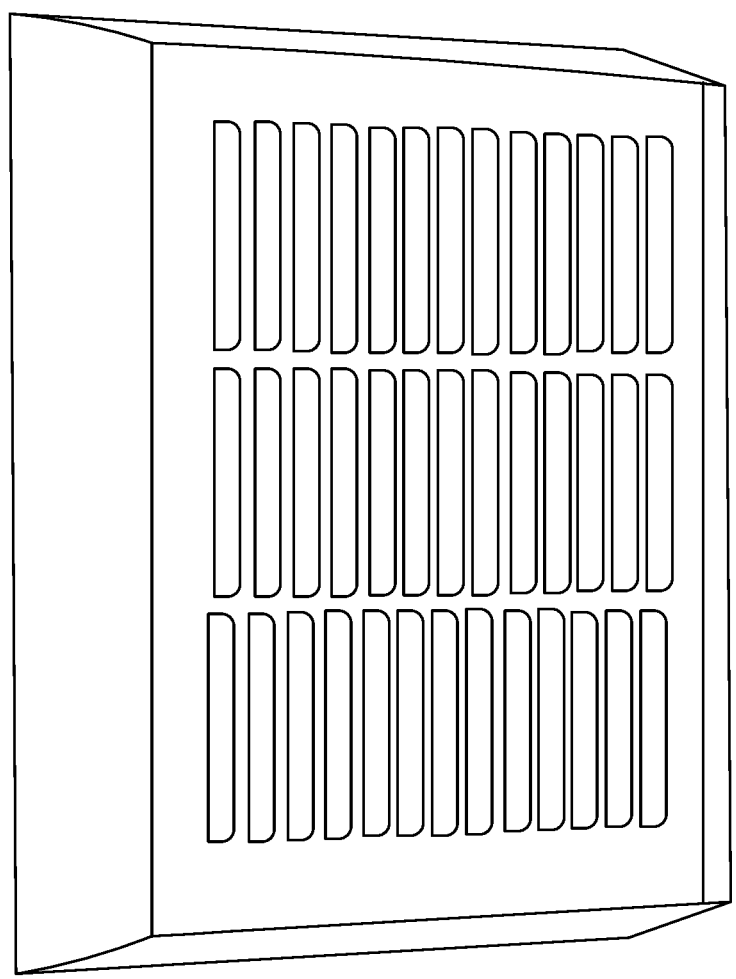
FIG. 6C presents a miniaturized version of the air purification unit of FIG. 5B, for use on confined spaces.

Additionally, in particular embodiments, as can be seen with respect to FIG. 6C, the air-purification unit may be miniaturized, such as to fit within and service much smaller spaces, such as for use in planes, trains, restrooms, automobiles, elevators, and the like. Accordingly, in one embodiment, a localized version of the air purification unit may be provided for servicing, smaller high density air zones (HDAZ). HDAZ zones are areas where there is a high concentration of individuals in an enclosed space, or a space in which individuals occupy the same space directly after someone else was in the space, such as an elevator or bathroom. This type of configuration is especially useful in the case of pandemics, or other widespread infections, where these HIAZ areas become even more dangerous, and even more so if they do not have adequate ventilation. For instance, in the case of elevators and bathrooms, there is a high likelihood of occupants breathing the air from the other occupants. Particularly, in the case of a washroom stall, despite overall bathroom exhaust, the stalls interfere with air flow which can result in the next occupant breathing air from the previous occupant. Furthermore, it is well documented that toilets create aerosolized matter which further contaminates the air. With bathrooms being a high transmission vector of many viruses and infectious diseases, there is a big problem area. The dimensions of the portable unit are 18"h×21.5"w×8"d. The HDAZ engine-based units are: 19.5"h×23"w×8.5"d where they can generally be designed to reverse the height and width measurements for having a taller unit with less width. For automobiles a smaller unit has the dimensions of 8"h×10"w×8"d which can be plugged into the automobiles DC 12V power outlet which includes its own fan motor. A smaller implementation can be built to fit over the car vents which would allow for PCO (photocatalytic oxidation), but rely on the ventilation and air movement from the cars HVAC unit. Custom sized units can also be created for either automobile or plan implementations that fit within the engine or air handling compartments.

Accordingly, the herein presented "High Density Air Zone" air purification units address these issues with immediate air purification and disinfection of the air. In the case of the elevator, the unit may be configured and sized so as to be installed on the back-middle wall of the elevator, and may be adapted to treat the air of the elevator many times per hour. In the case of washrooms, the units are to be installed directly behind the toilet on the back wall. They are able to keep the air in the stall constantly clean and disinfected. The unit may also include a modulator for selecting different air speeds that can be adjusted as necessary. During a pandemic for example they might be set at higher levels. The bathroom units may also include filter media encased in recycled plastics instead of cardboard, due to the higher moister content in the air.

Likewise, during times of a pandemic, labeling kits and tape may be included with labels on the doors to notify potential occupants of the air purification in the elevator, limits on the number of occupants that can enter the elevator, so as to not over stress the purification system's filtration capabilities, and tape lines to allow occupants to stand either on the left or right side of the elevator, but not in the middle which is where the air is sucked back into the centralized unit on the back wall. The HDAZ unit may also include an IAQ monitoring system and/or an analytics module for monitoring, measuring, and/or predicting use parameters and scheduling. Hence, the HDAZ system may be configured for collecting and transmitting data to an associated analytics module and/or to a relevant third party, such as for review. Such data, in various instances, may be transmitted as a QR Code, whereby a user can scan of the QR code, which loads a webpage with air quality data for that specific environment including historical data.

These embodiments may also include a locking stainless-steel case. This is useful as they are intended to be installed in public commercial spaces. The inside unit may include controls, access to the filters, and power. The stainless-steel enclosure allows for protection of the internal motor and unit and also remains easy to clean. The louvers on the front are built to allow the air to be sucked in through the front of the unit, and the air is exhausted out the back or the top. The perimeter of the doors may include one or more gaskets such that when closed, they seal the intake filter in the front so that incoming air is not mixed with the purified air leaving the system.

As indicated, the residential, commercial, industrial, and/or smaller HDAZ units, may include, or otherwise be associated with, an IAQ and/or analytics module, which will allow the system and its users to remotely monitor and track the various HVAC units, the environments they serve, such as for multiple consumers, locations, and HVAC units over time. Such tracking and reporting may be presented in an online cloud platform that is accessible via a downloadable application running on a computer, tablet, mobile phone or other smart computing device. Specifically, provided herein, is a client computing interface for accessing an energy cloud-based server for remote controlling and managing of the heating, cooling, and air quality maintenance operations for serving an environment in a manner so as to achieve superior air quality and equilibrium with less wear and tear of the system equipment.

For instance, for tracking and monitoring system performance over time, the system may include an online accessible HVAC unit commissioning form for entering system, ownership, and location information including: customer, location including zip-code, building number within a location, system name, manufacturer, model, serial number, system age, equipment type, refrigerant type, metering type, tonnage, BTU rated output, efficiency rating, business hours of operation, system hours of operation, utility, contractor, system volts, power phases, power factor, amperage for system off/at rest, cooling or heating mode fan only on, compressor amperage and whether the power related information if collected from actual measurements or whether they are from a specification sheet.

Accordingly, the system may be configured for collecting and analyzing a number of data. This is important because air within an environment should not only be circulated, but it should also be purified. Particularly, poor air quality within an environment leads to the spread of viruses, bacteria, diseases, and other particulate matter that can lead to poor functionality and performance of the HVAC system as well as pose health risks those within the environmental space. Specifically, the sensors set forth herein are specifically designed for monitoring, purifying, and controlling the quality of air within a defined environment, such as by monitoring, detecting, and directing the removal of volatile organic compounds (VOCs), problematic gaseous elements, as well as particulate matter that can adversely affect air purity and quality. More specifically, the system may be configured for performing dynamic and periodic measurement and filtering that may be conducted in a rapid and efficient manner for purifying and ensuring purified air content with minimized volatile organic compounds (VOCs) and other such gases.

Temperature and humidity affect the stability of viruses and their transmissibility among other airborne contaminants. The system may also modify humidity for the purposes of reducing airborne transmission. The optimum zone of maintaining indoor humidity is between 40% and 60% RH (relative humidity). Outside of this range, a myriad of harmful pollutants and biologicals can thrive such as bacteria, fungi, mites, allergic rhinitis and asthma, respiratory infections, chemical interactions and ozone production. The system can use its built-in humidity sensors to control a humidifier that can increase or decrease the humidity to stay within the target humidity range. The humidifier can either be a built-in addition to the system, or be configured to control an external humidifier.

Particularly, the various system components are configured for detecting, filtering out, and purifying environmental air from VOC, Ozone, CO, $CO_2$, and other harmful particulate matter that can adversely affect air quality and human health. For instance, VOC, Ozone, CO, $CO_2$ and particulate matter are key indicators for environmental air quality. The present sensors help ensure the maintenance of good and healthy air quality while adhering to and maintaining local and state air quality codes and standards. Other elements that can be rectified may include bacteria, viruses, uni- and multicellular organisms, and the like.

As indicated, the HVAC system 1 may include an air purification (AP) module 51 that includes high quality, durable, and long-lasting sensors 30 for detecting particulate matter, e.g., PM Sensors. The sensors 30 may be configured for being both extremely accurate and durable over long periods of time. For instance, the system herein provides a variety of data collectors, such as sensors, for collecting, filtering, processing, and communicating data to one or more servers of the system. For example, the collection of sensors may be configured for performing one or more of the following tasks. The system can detect return temperature, return humidity, return wet-bulb temperature, supply temperature, supply humidity, supply wet-bulb temperature, static air pressure, refrigerant suction line pressure and temperature, refrigerant hi side pressure and temperature. Additionally, the collection of sensors can measure barometric pressure and altitude.

Specifically, the system may be configured for collecting and analyzing location and altitude data when determining system operational parameters. Particularly, the system may be configured for performing a variety of HVAC related calculations, which calculations may include standardized measurements based on sea-level elevation. This data is useful because without factoring in altitude changes of the location of the HVAC system, calculations can be off by significant amounts. Accordingly, the present system is capable of factoring altitude into the analyses being performed.

More specifically, a variety of methodologies may be employed by the IAQ 20 and/or analytics 42 platforms of the system for determining and accounting for altitude including through taking one or more barometric measurements from one or more barometric sensors. Likewise, altitude may be determined by location from address and zip-code that is entered into the system. Further, an altitude reading may be taken from a mobile application with altitude capability and entering that data into the commissioning website page. Examples of average altitude above sea level across the United States are California with an average of 2,900 ft, Colorado 6,800 ft, Kansas 2,000 ft, Illinois 600 ft and New York 1,000 ft respectively. These large variations in the average state elevations illustrate why calculating many HVAC equations that use temperature and pressure at sea level, are not accurate without accounting for altitude.

In view of the above, the system may include a plurality of sensor units that are configured to detect and measure CO, $CO_2$, Sulfur Dioxide, Nitrogen Dioxide, Ozone, and other gas concentration levels, and can monitor building pressure. Further, the system can detect viruses, bacteria, and mold spores in the air, such as using a bio-sensor, can detect and measure VOC (volatile organic compounds) and TVOC's (Total volatile organic compounds), and can also detect and measure particulates, such as lead aerosolized particles, from $PM_1$, $PM_{2.5}$, $PM_4$, and $PM_{10}$ particle sizes. Hence, the system may include one or more, e.g., a plurality, of particulate sensors configured for detecting a wide variety of particles.

Particularly, particulate matter (PM) particles are a complex combination of pollutants as dust, pollen, smoke and mist. Clearing air of particulate matter is difficult to achieve. For instance, protective masks such as rated N95 and N99 are rated for blocking 95% and 99% of PM2.5—particulate matter of 2.5 micro-meters (μm) or less in diameter. Such masks are substantially effective for removing dust particle concentration in air, which dust particles may include and/or otherwise increase the incidence of human adenovirus, human coronavirus, human bocavirus, parainfluenza virus, and the like, exposure to which has adverse effects on the lungs and heart. The present particulate sensors may employ a Particulate Laser Diode that has been specifically designed to detect the presence of dust and viral particles as small as 0.3 μm, thus providing a superior air quality within an environment without the need for the wearing of a mask. The system may also include a VOC sensor such as a MOX based, multi-pixel gas sensor that can measure and output TVOCs. The system may further include a $CO_2$ Sensor, such as a sensor based on NDIR $CO_2$ sensing capabilities, with integrated temperature and humidity sensing. The sensors, and other system components, are durable and constructed for lasting multiple years, such as 5-10 years, running 24 hours a day, all the while the internal fans are operating 24/7, so as to keep all measurement chambers clean and operational for purifying the air.

As discussed above, for purifying the air, the IAQ filtration system may employ one or more filtration layers, such as two, three, four, or five layers of filtration. Such filtration layers, as described herein, may include one or more of the filing. For example, an initial primary filter layer may be provided, which layer can include a MERV 13, or higher, filter. Additionally, the IAQ module may include three chambers of photocatalytic oxidation, such as where each chamber includes UV lights that may each be individually or collectively focused on a Titanium Oxide mesh grid. Particularly, the air purification module is configured for performing advanced photocatalytic oxidation, detecting and neutralizing viruses, bacteria, and particulate matter, including allergens, and the like, as well as diminishing and removing harmful gaseous elements, such as VOCs, CO, and $CO_2$, and the like from the air within an environment. A further post filter can be provided that can be easily swapped and changed, based on different air application needs, or may be left out in the event that static pressure loss is too high in the system.

The system may additionally have a variety of other, e.g., added, filtration layers, filters, and/or zones and stages, such as in the event of a highly infectious and/or deadly virus outbreak where the system needs to neutralize the virus in one or more passes of air through the system. For instance, in certain embodiments, a fourth chamber, such as of photocatalytic oxidation chamber, may also be included along with one or more additional air handler/fan units to help circulate air in case of additional static pressure drops. Likewise, the system may include five or six layers of filtration for air purification. In this manner the AP module is configured for capturing and reducing particulate matter within the air of an environment.

Additionally, the IAQ 20 and analytics 40 systems may be configured for allowing the system to categorize, order, and form lists based on performance, whereby faults and/or other performance issues can be determined, analyzed, and presented for viewing. Hence, the system can take measurements, analyze system data, and determine faults so as to evaluate measurements of how a building and its HVAC systems are functioning, and can communicate that data to system and/or building operators. Specifically, the remote analytics portion of the system is capable of communicating to a building management system locally if they are connected on the same local network and provided there is a path for the data to be sent. For instance, in one particular embodiment, data can be sent via a BACNET IP protocol, or via http/https data posts, or sent via standard delimited text files. Additionally, data can be provided to a building management system even if they are not on the same network, via an additional system local data aggregator server that is installed on the same network as the building management system in which the system local server model receives the data from the cloud servers and then communicates with the local building management system.

This is a useful feature in situations where the local system hub is not on the same network as the building management system. An example is, there could be 4 different system hubs, each serving 9 HVAC systems, where the hubs might or might not be on the same network, and where the building management server is on another network. In such an instance, the system local data aggregator server may monitor and collect data from all 4 hubs, e.g., representing 36 HVAC units of data, which it receives from the cloud servers, and then provide one efficient stream of all of the data to the building management system. In this regard, the overall centralized system servers may receive, analyze, and categorize HVAC systems and their functioning, so as to generate one or more faults and/or warnings.

For instance, the system may categorize unit functioning on a 10-point scale or by representing units by green, yellow, and red labels for purposes of easy identification of normal performing units vs. units with moderate problems vs. units with serious problems or energy waste. Additionally, the system may include the ability to remotely receive communications, monitor, and control the HVAC unit either through a controller or by communicating set point and instructions to a thermostat via a thermostat API. Particularly, the system includes an API (application programming interface) that is capable of sending data to authorized external data servers/services. The system can determine energy waste by comparing actual run-time usage to its intended hours of operation and calculating the potential energy waste.

The HVAC system may further include an analytics platform 40 for receiving the sensed data, diagnosing the same, and determining the overall operational efficiency of the system and each of its components. For instance, in various instances, the analytics platform may include, or otherwise be associated with, an advanced AI module that may be configured for constantly monitoring the system and component performances, receiving data and analyzing data pertaining thereto, so as to determine efficient operational parameters and to increase energy consumption efficiencies thereby resulting in energy savings while enhancing system performance and extending equipment life span.

Particularly, most current, commercially available HVAC systems only operate at 65% of their intended efficiency, and most currently available residential systems only operate at 57%. The analytics platform 40, e.g., an AI module, therefore, may be configured to help identify such inefficiencies as soon as they appear, can analyze the root causes of the inefficiencies, determine what operational parameters can be adjusted to overcome these issues. Specifically, the analytics module 40 may be configured so as to make the appropriate changes, or at least make suggestions as to what changes should be made, so that corrective procedures can expeditiously be made to bring the system up to its intended operating efficiency, and in this manner, substantial energy savings can be realized.

Accordingly, data collection and analysis an important aspect of the system. As such, the present system, e.g., the analytics platform, is configured for performing real-time monitoring and data processing of one or more environments in a manner such that when coupled with a suitably configured HVAC unit, or system of units, ensures optimal environmental clarity and control in a highly efficient fashion. The present system, therefore, has been adapted to collect, measure, and monitor the vitals of all of the HVAC unit(s) serving one or more environments, including temperatures, humidity, $O_2$, CO, $CO_2$ levels, air flow, refrigerant charge, and the like. In particular embodiments, the system may include a plurality of HVAC units that serve one or more environments in a building or a facility of buildings.

For instance, the system may be configured to continually check each HVAC system, comparing the present conditions with predicted efficiency data so as to determine if running efficiency is optimal, and if not to either automatically change the system configurations and/or running parameters, so as to assure optimal functioning, and/or to alert the system administrator, e.g., with text or email alerts, when a system is failing to run properly and/or a system parameter has been changed, such as to promote optimization, and thereby saving consumer money, energy usage, and promoting greater operational longevity. Hence, in various embodiments, the system includes the ability to remotely monitor and track multiple consumers, locations and HVAC units in an online cloud platform that is accessible from a computer, tablet, mobile phone or other smart computing device. The system has many benefits, such as enhancing the monitoring and sustainability of an HVAC system as well as allowing for real time detection of HVAC issues, enhanced operational efficiencies leading to both energy and money savings, and the avoidance of down-times due to emergency repairs, as the equipment life will be extended to its full potential.

Such real-time and continuous monitoring provides a full, broad picture of the system conditions, rather than a mere snapshot in time, which can be accessed via a cloud accessible portal, whereby all system parameters can be accessed, viewed, and manipulated. Real-time benchmarking and reporting may also be conducted. Specifically, the system may be configured for collecting or otherwise receiving sensor measurement data, analyzing the same, and in response thereto organizing system parameters so as to control various environmental conditions, such as to maintain a determined air purity criteria as well as to control and maintain temperature and/or humidity based on the received measurement data. More specifically, the system through a user application, or autonomously, may control the HVAC and can shut it off when it is operating outside of defined operating parameters and/or operational hours, and can reorganize operational modes and component configurations, so as to bring system functioning within determined parameters.

Hence, a useful aspect of the system is its interconnectivity with each of its components, whereby one or more of the system components can communicate with one another, as well as with one or more servers of the system. For instance, the system may include a communications platform that allows the various system components to communicate with each other, but also to communicate with, and receive instructions from, a user, such as through a client computing device, such as via a downloadable application running on a mobile smart phone. In such a manner as this, through a desktop or mobile application a user can monitor system functioning, can receive alerts, and can configure system settings, parameters, and/or turn various components on or off or change their configurations. In this way, the system is configured in such a manner as to create a communicative interconnection of the various HVAC units of the system and their components, so as to form an internal "internet of things-like" system.

For instance, in such an instance, an "internet of things" is a collection of components and sensors that collect information and communicate with each other in addition to sending data back and forth, such as over a network connection, e.g., the Internet. Accordingly, the system and its various embodiments can be considered in the realm of the "internet of things" because all of the components collect data, communicate their status to a central controller, which then manages the devices, and provides measurable data and efficiency recordings on the HVAC units and their components. In this way, a central control element of the system, or a system user, e.g., through the client computing device, can monitor the air quality and relay that information to other system components or to other users. Hence, the system is configured to allow control and monitoring of the on-location air purification, HVAC systems, and indoor air quality monitoring. The control may be direct or through accessing one or more cloud servers that allow access and management via a webpage or application running on a client computing device, such as a smart phone or tablet. Therefore, the system provides one or more controls for directing component functionality that can be managed anywhere there is access, e.g., online or Internet access.

Presented, herein, is an HVAC associated IAQ system 20 for collecting and monitoring data as well as for analyzing and reporting on the results thereof, such as with respect to the health and functioning of the system and its components. Particularly, a plurality of sensors, such as forming a cluster of wireless sensors, are provided, which sensors may be short to long range, such as with a range up to 1200 meters or 0.75 miles or more from a main sensor hub. In addition to the long range, the cluster sensors may have the ability to buffer data in the event of a communication issue to the main sensor hub so there is no loss of data.

Once data reaches the hub, there are several options to send the collected and/or generated data over the network connection to the system server, such as internet connectivity, e.g., by ethernet, WIFI, BLUETOOTH, Satellite, or via a cellular gateway. In various instances, the sensor clusters may be battery powered, such as with a standard 1.5V AA form factor, or long-term 10 year plus lithium batteries, so they are easy to replace, a wireless, rechargeable power source may also be provided, based on a monolithic board. For instance, a return sensor cluster may be provided, such as where the cluster can easily be installed down at a return vent and/or ducts by the main HVAC unit.

Due to having multiple wireless sensor clusters, the system is more flexible than a system based on one monolithic sensor board. For instance, the return sensor cluster could easily be installed down at the return vent instead of, or in addition to, being positioned in the ducts, e.g., by the main HVAC unit. Another example of the flexibility of the system of wirelessly connected components is the ability of the system to handle split HVAC systems. Split HVAC systems, are very prevalent in residential installations. These HVAC systems have the condenser separated from air handler where the air handler/furnace is usually on the roof, and the condenser is on the side of the building. In this regard, having components that are configured to communicate wirelessly is advantageous because a 'monolithic' based sensor system, requires running cable to the outside of the building down to the condenser, which cost more time, money, and labor and risks as it requires running a cable out of the roof or out of the side of the building at roof level.

To overcome this problem, the present system includes wireless sensor clusters that allow for easily attaching the sensor cluster at various positions throughout the system, such as at the condenser, which can wirelessly communicate back to the system hub, therefore, avoiding the costly wire runs. The system does, however, allow for using long cable runs if desired. For instance, when an HVAC system is first installed, if it is a split system, wires may be run to the condenser. Extra wires can be installed above those needed to control the HVAC system, and such wires could be used by the present system. This is useful in situations such as a retrofit application where the HVAC is already installed and there are extra wires, our system can utilize those wires as well. This strategy can also be deployed when monitoring the condenser and battery driven sensors are not wanted. Hence, in the event of a split HVAC system, the present system provides flexibility to manage and monitor system and component functioning via wireless or wired configurations.

Since the system relies on sending data, e.g., in a wired or wireless configuration, such as over the Internet in the various gateways or routers, it is useful that communicative interconnectivity, e.g., network communications, are maintained. One common problem causing Internet down-time is a gateway or router locking up or operating with diminishing bandwidth. A restart of the gateway or router is usually required in such instances to restore its operation and Internet connectivity. The present system, however, improves on communication resiliency by periodically sending IP ping requests to the cloud servers and if they detect the internet communications are down, they can restart the gateway, router, hubs or other communication devices through a wireless or wired power relay that the system controls.

Hence, the present system platforms may be enabled to function with both existing systems as well as the new system configurations disclosed herein. For these purposes, the system may be configured for sensing and collecting data, analyzing and reporting on the data, and/or generating alerts when an operational inefficiency is determined. Particularly, the system provides specific industry reports for super-heat and sub-cool in real-time as opposed to periodic reports or one-time commissioning. In this manner, the system can report on the health/efficiency of the HVAC system and its components based on collected data, such as based on the combined efficiency score and air quality score. The system includes an internal Indoor Air Quality rating and/or scoring and/or grading system and can also incorporate and report on published government bodies such as the German Air Authority's table of TVOC's with ppb ranges.

Based on the system analysis, the system may generate one or more reports on running proficiencies, and can then transmit those reports. For instance, the system, may sample and track system operations and provide an email and/or text of the results of the tracking and measurement sampling. For these purposes, the system may include a built-in web server that can serve as an analysis and communications hub that allows the local data for each HVAC system to be read locally via a localized client computing device, such as a computer, tablet, or mobile phone connected to the same local network, provided the system is connected to a local network, as opposed to reporting through the cellular gateway. This is useful because it provides local access in the event that there was ever a problem with the cloud service.

In such a situation, where the cloud service is not available, there is still value in the system which is capable of continuing to collect and report data and not become a 'stranded asset'. The system, therefore, provides for inter sensor/hub data buffering in the event that there are conditions that disrupt wireless data communications. In such an instance, the buffered data automatically resyncs with the hub when communications are restored. This provides data consistency and reliability at the system location site. The system also includes an on-board database and data storage.

If there is an internet connectivity issue between the local location and the cloud service, there is no loss of data due to the on-board database, which is capable of storing years of data. When the Internet communications are restored the system automatically resyncs the previously un-synced data with the cloud service, therefore ensuring there is a local copy of the data in addition to the cloud service servers. This is a useful for ensuring the systems data collection, integrity, and resilience. Hence, the buffered data may periodically and automatically resync with the hub, such as when communications are restored.

Particularly, the system may include a wireless communications hub that is capable of communicating from the hub to various, remote sensor clusters, which may have a range of 1200 meters or approximately ¾ of a mile. The wireless protocol can run over the universally accepted 2.4 GHz radio frequency utilizing a proprietary blend of the 802.15 protocol, for example, and can switch between the various wireless protocols dependent on their signal strength and transmission rates. The importance of this extended range is that one communications hub can easily cover the whole area of either a residential or average commercial building without needing a repeater.

However, in certain instances, one or more repeaters may be provided. In particular instances, a plurality of communication hubs may be provided, where each communication hub can handle up to 9, 10, or more whole HVAC systems, and thus, may be capable of monitoring each system as a whole, as well as their individual components, and their corresponding ducts, and the air flow there through. In various instances, the communications hub can be expanded with additional CPU and data storage to scale to larger configuration of 18 to 72 to 100 or more units. In addition to the proprietary wireless protocol, additional wireless protocols can be used such as Wi-Fi, ZigBee, Z-Wave, LoRa, Thread, Bluetooth, BLE, MiWi, 6LoWPAN, WiFi-ah, WirelessHART, cellular, including 3G, 4G, and 5G, and the like. Additionally, direct cellular connection cab provided to each cluster. A hard-wired option is also available, such as by utilizing ethernet and/or 1-wire protocol.

In view of the above, the present system is configured for controlling one or more HVAC units serving one or more environments, via a wired or wireless connection, with a central processing hub, so as to efficiently and effectively control temperature and air quality within one or more environments. For instance, the system can increase or decrease air flow, as desired by the user or determined by the system, such as by sending a control signal to a device, such as an electronic or mechanical motor, controlling dampers and/or blowers and/or compressor units. For example, the system can monitor and configure the system components based on measuring inside and outside gas levels, such as CO, $CO_2$, Ozone, and humidity levels, and the like, simultaneously. For these purposes, the system provides a unique logic for factoring energy efficiency, and accounting for ramifications of increasing or decreasing air intake beyond only gas, e.g., $CO_2$, considerations.

Hence, the system can increase or decrease inside and outside air based on several different factors, including immediate environmental conditions, governmental data, codes, and standards, such as based on particulate matter sensor measurement, and/or based on detected gas levels, e.g., CO, $CO_2$, ozone, and other gas levels determined sensor measurements. Accordingly, the system may be configured to completely replace inside air with external air for a nightly or daily purge of air and certifying that a complete replacement of air has been achieved. Likewise, the system may be configured for monitoring and maintaining building pressure. In this manner, the system can control heating and cooling as well as the air purification and fan and blower, such as when the system determines harmful levels of VOC's, particulates, or other pollutants exceed a determined value.

Figure 7:
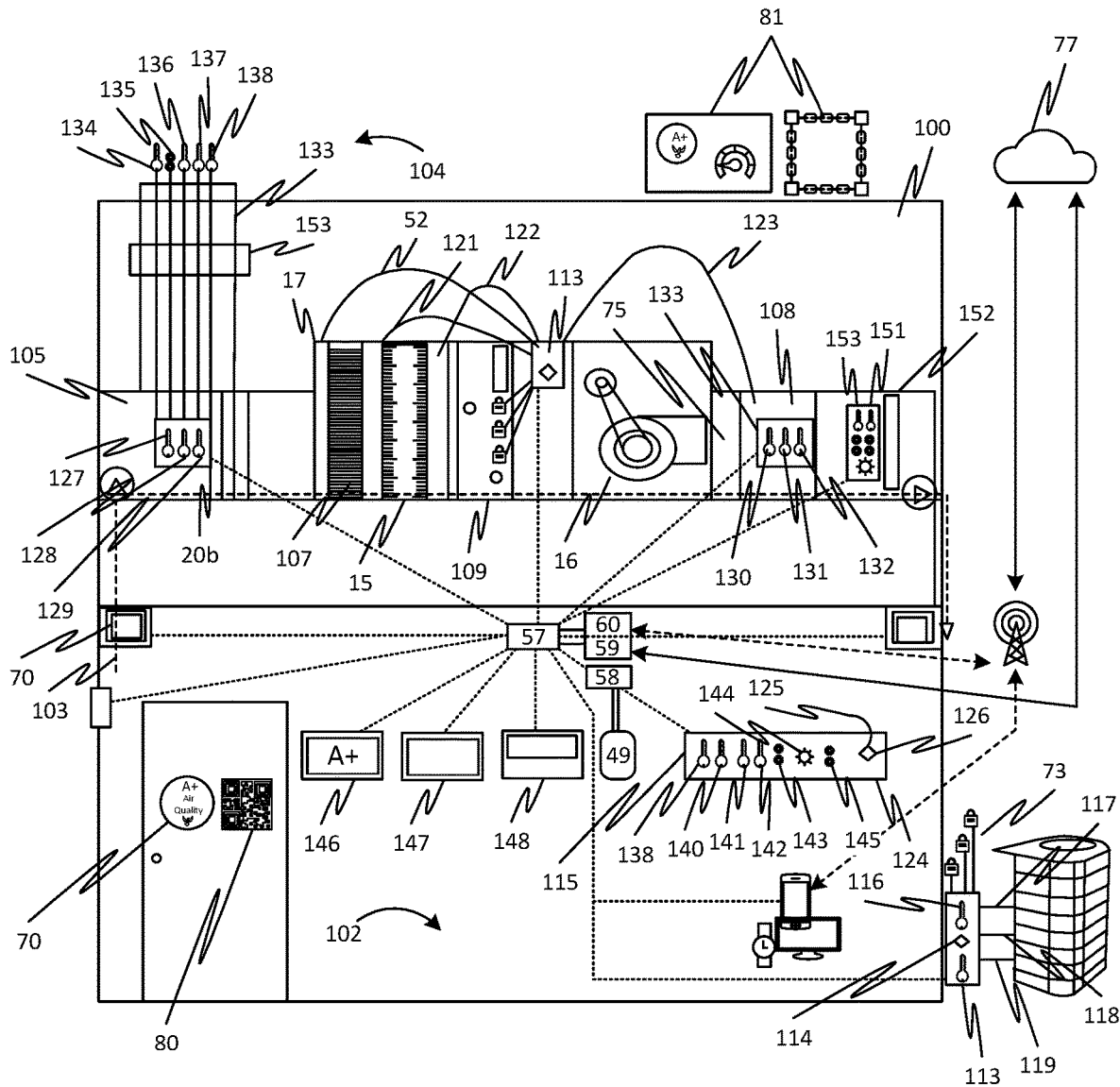
FIG. 7 presents an implementation of the overall combined HVAC, Air Purification, and Indoor Air Quality systems of the disclosure.

Accordingly, with respect to FIG. 7, provided herein is a system for purifying and maintaining the purified quality of air in one or more environments. Particularly, as depicted, there are two environments, there is an installation space, such as an attic air space 100, where the air purification device and HVAC furnace 71 and air handler 16 are located, and indoor air space 102, where one or more inhabitants may reside and function. As can be seen, air flow 103 flows from the operation environment, e.g., the occupied indoor air space, in a circular fashion through the return air vents 70, into the return ducts 69, into the return air plenum 105, through the air purification unit 50 (as described with respect to FIG. 4), which is connected to the Force Air Unit (FAU) 16/Furnace 17, and then back out the air supply ducts 67, out the air supply vents 68, and back into the indoor air space 102. Alternatively, the air purification device 50, may be located on the supply side at air purification alternate location 75. The air is primarily moved through these environments and the HVAC system from the Air Handler/Fan 16 in the attic space 101 to the inhabitant environment 102, which inhabitant environment is filled with ambient air 104, such as prior to and somewhat during the purification process.

As air is cycled and/or recycled within one or more of these environments, one or more air ducts may be provided, such as a supply air duct 67 and return air duct 69, where air from an outside environment is supplied and passed through to the air purifier unit 50 at one central point that purifies the air one or more times as it passes through the HVAC system. The amount of times the total air is processed is typically measured in ACH, or air changes per hour, where air that is to be, or has been recycled one or more times, is supplied. To ensure air quality, one or more filters may be supplied, such as air filter 107.

As described above, the HVAC unit may include a variety of components for use in purifying and/or otherwise conditioning inside air. For instance, the HVAC unit may include an HVAC coil 15 for cooling the air, furnace 17 for heating the air, and heating and/or cooling controls 109. An air handler and/or fan 16 may be provided for circulating and ventilating the air. The HVAC unit may typically include a fresh air intake duct 133 which may include an outside/fresh air intake damper 153 and return air bypass 154.

A variety of sensor units containing sensors may also be provided, such as in one or more clusters. For instance, a first and second sensor cluster, e.g., supply air quality sensor clusters, may be provided where the first sensor cluster includes a supply air sensor cluster 20a, and the second sensor cluster includes a return air sensor cluster 20b. The return air sensor cluster 20b may include a multitude of sensors to measure the return air, such as: return-air temperature (dry-bulb) sensor 127, return-air temperature (wet-bulb) sensor 128, and return-air humidity sensor 129. Chained off of this cluster and/or built into a separate cluster may be sensors for measuring the outside ambient air, such as: ambient air temperature & humidity sensor 134, ambient air particulate sensor 135, ambient barometric pressure sensor 136, ambient air $CO_2$ sensor 137, ambient air VOC sensor & gas sensors 138.

The second supply air sensor cluster 20a may include sensors such as supply-air temperature (dry-bulb) sensor 130, supply-air temperature (wet-bulb) sensor 131, supply-air humidity sensor 132. A third static pressure, refrigerant pressure, and power sensor cluster 113 may also be provided and may include: sensors for measuring static pressure, refrigerant pressure (when the compressor is in the same unit, such as HVAC Package Units), and for measuring power of the air handler/furnace 17. In various embodiments, the sensor units may include sensors, tubes, and current transformers, which may include various probes and filters, such as: static pressure air tube & pitot probe—return/pre-filter 52, static pressure air tube & pitot probe-return/post-filter/pre-coil 121, static pressure air tube & pitot probe—post-coil 122, static pressure air tube & pitot probe supply 123, and current transformers (CT's) 72. A fourth supply air quality sensor cluster—post air purification 61 cluster may also be provided and may include a multitude of sensors such as: indoor air VOC/TVOC—post air purification 62, indoor air $CO_2$ sensor—post air purification 63, indoor air particulate sensor—post air purification 64, indoor air virus bio-sensor 65, indoor air mold & bacteria sensors—post air purification 66.

A fifth indoor air quality & static pressure sensor cluster 115 may further be provided, and may include a variety of sensors such as: indoor air temperature sensor 139, indoor air humidity sensor 140, indoor air VOC/TVOC (volatile organic compounds) & gas sensors 141, indoor air $CO_2$ sensor 142, indoor air particulate sensor 143, indoor air virus bio-sensor 144, indoor air mold & bacteria sensors 145. Further, a sixth static pressure sensor cluster may be provided and used to measure the static pressure of the building. This cluster may include a variety of sensors and probes, such as static pressure air tube & pitot probe for indoor air 125, which measures the differential static pressure of the indoor air 102, to the outside/ambient air 104, such as with static pressure air tube & pitot probe—outside air 126.

A seventh refrigerant pressure and temp sensor cluster 114 may be provided to measure and monitor the HVAC Condenser/Compressor 13. For example, in split systems the HVAC Condenser/Compressor 13 is separate from the FAU/Furnace 17 and often installed on the side of a building. In commercial HVAC Package Units, they are usually built all within the same enclosure and are installed on the roof. In either instance, they may contain sensor clusters that include sensors such as: refrigerant hi-side temperature sensor 116, refrigerant hi-side static pressure sensor 117, refrigerant low side/suction line static pressure sensor 118, refrigerant low side/suction line temperature sensor 119, current transformers (condenser) 73, such as for measuring condenser power, and may further include, in the case of heat pump HVAC units, an extra heat pump/extra refrigerant line pressure & temperature sensor(s) 74.

In various embodiments, these sensor clusters may be configured to communicate one with each other and/or with a centralized system hub, such as wirelessly to a central system wireless communications hub 57. This system wireless communications hub 57 may include data storage and computer processing configurations for processing analytics locally prior to sending up to the cloud, as depicted. A web server for viewing the data locally and managing the system and its components may also be provided. In particular embodiments, the HVAC system and/or its components may be configured to communicate, e.g., with other HVAC units, hubs, and/or sensor clusters in a variety of different wireless protocols including, but not limited to, WiFi and various 802.11 variations, Zigbee®, 802.15 protocols without Zigbee®, BlueTooth®, Z-wave, Lo-Ra, radio, NFC, cellular protocols such as LTE, 5G. The design is flexible to take other future communication protocol boards as developed. The system may also communicate in a wired configuration, if desired, e.g., over ethernet for internet connectivity and 1-Wire cables chaining directly, or daisy chaining, the sensor clusters.

Hence, the system wireless communications hub 57 has the ability to not lose data if the Internet communications are down because it can store years of data locally in its local database, and may be configured for automatically healing/resynchronizing data with the Internet/Cloud Service 77, when Internet communications are restored. Likewise, the system wireless communications hub 57 may communicate to the Internet/Cloud Service 77 over wired connections such ethernet, cable modem, fiber, POE, or other physical network communication protocol via a Wired Internet connected Router 59. Additionally, the System wireless communications hub 57 may communicate to the Internet/Cloud Service 77 over wireless communications via cellular communications such as 5G, 6G either through an onboard communications chip or a cellular/mobile internet connected router 60 which communicates to a cellular tower or Wi-Fi hub/router 78 which then connects over a physical connection to the internet. The system wireless communications hub 57 may also communicate to the Internet/Cloud Service 77 over a satellite connection with a Wi-Fi Hub/Router 158 that is outfitted with a satellite communications board instead of or in additional to ethernet physical connections.

The system wireless communications hub 57, and the different sensor clusters 111, 112, 113, 114, 115, 124, and 161 have the ability to not lose data if there is temporary wireless communication issues between the hub and the sensor clusters because the sensor clusters may include onboard data buffering storage. Hence, when wireless communications are restored the sensors upload stored collected data to the system wireless communications hub 57, which then sends that data up to the Internet/Cloud Service 77. The system, therefore, has the ability to send and receive communications between the Internet/Cloud Service 77, the system wireless communications hub 57, and the sensor clusters 111, 112, 113, 114, 115, 124 and 161, mobile phone, mobile wearable device, computer, neural link 176 and voice assistant 149.

The Internet/Cloud Service 77, the system wireless communications hub 57, mobile phone, mobile wearable device, computer, and/or neural link 76 can be configured to control different elements of the HVAC system, such as: FAU/Furnace 71, HVAC Condenser/Compressor 13/12, Outside/Fresh Air Intake Damper 153, Return Air Bypass 154, Pressure Relieve Window/Valve/Damper 156, Humidifier 152, Thermostat 148 and Air Purification System 50 for the purposes of providing the best healthy and optimized air quality to the indoor space 102. One such control application is to turn the FAU/Furnace 17, on or off to provide heating or air ventilation to the indoor space 2. These control signals can be sent either through a temperature set point trigger, humidity trigger, time/calendar schedule, or set time schedule per hour, such air 5, 10, 20 30 or more minutes of air ventilation per hour.

For instance, one such control application is to turn the Condenser/Compressor 13/12 and FAU/Furnace 17 on or off to provide cooling to the indoor space 102. These control signals can be sent through a temperature set point trigger, humidity trigger, time/calendar schedule, and the like. Heating, cooling, or ventilation may be controlled by sending control signals to a thermostat, e.g., through one or more API interfaces. These control signals can either be sent wirelessly directly to the thermostat which then controls the Condenser/Compressor 13/12 and FAU/Furnace 71, or via a Cloud service API where the Internet/Cloud Service 77 communicates to a third-party thermostat cloud service which then controls the thermostat, which controls the Condenser/Compressor 13/12 and FAU/Furnace 71.

In such a manner as this, the air purification system 50, humidifier 152, condenser/compressor 13/12, FAU/Furnace 17, and other system components can be turned on or off, can be monitored, regulated, scheduled, or otherwise be configured to operate within one or more selectable or determined operational parameters. Likewise, in this manner the outside/fresh air intake damper 153, and the return air bypass 154, can be controlled so as to determine how much outside ambient air 104 is brought into the indoor air space 102. Additionally, further control applications include partially or fully opening or closing the pressure relieve window/valve/damper 156 and/or the supply and return vents 68 and 70, e.g., via a wireless connection, so as to control the air ventilation to different rooms or zones in the indoor air space 102.

They system has the ability to provide information, feedback, data and alerts to building occupants and building/facility managers, e.g., via a multitude of different devices such as via an Indoor Air Quality Live Certification Display 146, HVAC Fault Indicator/IAQ quality/HVAC Performance Display 147, Thermostat 148, Voice Assistant 149, Mobile Phone, Mobile Wearable Device, Computer, Neural Link 76, and Internet/Cloud Service 77. This information may include, but is not limited to air quality including C02, VOC, particulate levels, gas presence and concentrations, viral, bacteria and/or mold presence and concentrations; temperature, humidity, pressure and altitude. This information, feedback, data, and/or generated alerts may come in the form of visual or structured data visible on displays such as the Indoor Air Quality Live Certification Display 146, HVAC Fault Indicator/IAQ quality/HVAC Performance Display 147, Thermostat 148, or Mobile Phone, Mobile Wearable Device, Computer, Neural Link 76. Additionally, visual or structured data may be provided and made visible on External Air purification Indicator Display or Sticker 79, Indoor Air Quality QR Code 80, Web Page url/Blockchain 81.

Likewise, the External Air purification Indicator Display or Sticker 79 and/or Indoor Air Quality QR Code 80, provide customers, employees, residents, or other parties interested in potentially entering a building, with the ability to read and understand the air quality of the building prior to entering. The External Air Purification Indicator Display or Sticker 79, may visually display the air quality based on data over any period of time desired from previous continual measurement of the air quality of the building, such as last 30 days, 3 months, 6 months, last year, etc. The Indoor Air Quality QR Code 80, provides the ability to link to a publicly available Web Page url/Blockchain 81, which can show the air quality based on data over any period of time similar to the External Air purification Indicator Display or Sticker 79. The Web Page url/Blockchain 81 is provided the data from the Internet/Cloud Service 77. The External Air Purification Indicator Display or Sticker 79, and Indoor Air Quality QR Code 80, may be configured to be shown on the outside windows or doors leading into a building. They may also be additionally provided inside the building, e.g., a restaurant may display them on their menus, or a theatre might show them on a screen prior to screening a movie.

Other mechanisms for communication include: text or email message to mobile phone, mobile wearable device, computer, neural link 76. The messages can be sent to occupants, building and facility managers, approved HVAC or health contractors, and the like. For instance, if one or more sensed conditions produces an alert and message that indicates a critical alert or HVAC system failure, then the system can generate a further message that can be sent in order to dispatch an HVAC contractor technician, whereby the technician can be contacted prior to a critical fault occurring. Such messages and pertinent data can be sent via raw data or structured data in xml, j son, spreadsheet, pdf, word document, or other open-source data format, such as via email, SMS, Airdrop, Bluetooth®, NFC, or other wireless transfer protocols to Mobile Phone, Mobile Wearable Device, Computer, Neural Link 76, or HVAC Fault Indicator/IAQ quality/HVAC Performance Display 47. The data, messages, and/or alerts may be communicated audibly via a Voice Assistant 49, or Mobile Phone, Mobile Wearable Device, Computer, Neural Link 76 or HVAC Fault Indicator/IAQ quality/HVAC Performance Display 47. Likewise, the data can be sent via raw data or structured data in xml, j son, spreadsheet, pdf, word document or other open-source data format via email, API, or direct web service to relevant government entities. One or more of these elements may or may not be included depending on the system configurations and uses.

Figure 8:
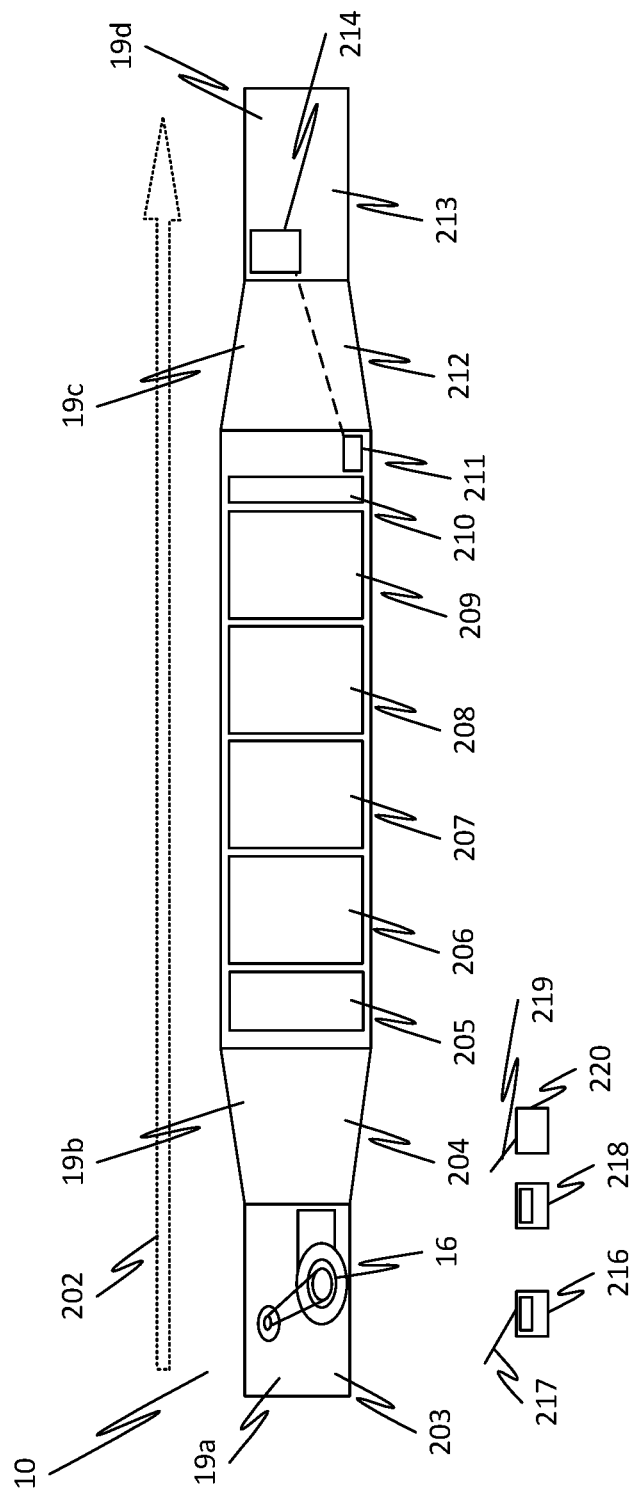
FIG. 8 presents an exemplary HVAC unit of the disclosure setting forth optional configurations wherein an air purification unit may be positioned within the HVAC unit.

FIG. 8 illustrates an exemplary HVAC unit 10 that is configured for performing air purification as disclosed herein. Depicted in FIG. 8 is a combined HVAC and Air Purification System 1, whereby an air purification unit 50 may generally be installed in-line, such as in the return ducts of an overall HVAC unit 10, e.g., prior to an air-handler 16, but may alternatively be installed in the supply ducts after the air-handler 16. As illustrated, the combined HVAC and air purification system 1 receives air flow in direction 202, whereby air flows in through an incoming air vent and out through a clean air duct 213 and air vent, which can be either on the return or supply side. Particularly, in the HVAC unit 10, air 202 enters into the incoming air vent, which can either be in the return or supply side 203, through the transition fitting 204, passes through the air purification system 50, which may include one or more photocatalytic oxidation units, out the transition fitting (exit) 212, and exits out the clean air duct (output of clean air) 213 all in the air-flow direction 202.

Generally, the HVAC unit 10 includes one or more, e.g., two, transition fittings 204 and 212, such as including an entry transition fitting 204 and an exit transition fitting 212. The unit 10 will typically include one or more filter regions, such a first pre-filter region 203, 204, or 205, e.g., including a MERV 11 or greater pre-filter, and may optionally include a post filter area 210, 212, or 213, such as including a post MERV 13 or greater filter. In a combined HVAC and air purification system, as depicted, one or more Photocatalytic Oxidation Chambers may be provided, such as at regions 206, 207, 208, and/or 209, for instance, where each region may include one or more photocatalytic oxidation units. The HVAC unit 10 may further include a power sensor/relay 211 as well as one or more IAQ sensor clusters 214 that may be positioned at areas 204-210, but will typically be included at area 212 or 214. The HVAC unit 10 may also include a control wire to power relay 211 as well as a thermostat 216 with a thermostat wire 217. The HVAC unit 10 may additionally include alternate air blower controller—thermostats 218, 219, and 220, which may include a wireless fan controller and an additional system air handler/fan.

There are several options for configuring a combined HVAC and air purification system 1, such as with regard to where various of the components disclosed herein may be positioned within an HVAC unit housing. For instance, the HVAC unit 10 may or may not have transition ducts, which may be omitted or may be utilized, for example, when the duct size that the air purification unit 50 is to be installed within is smaller than the air purification unit 50. Particularly, if the air purification unit 50 is installed directly next to the air-handler 216 of the HVAC system, one or more transition ducts might not be needed.

However, in various embodiments, the combined HVAC and purification system 1 can have several air purification units 50 that can be combined, or stacked, together, such as described herein with regard to FIGS. 6A and 6B, to handle greater air flows. In the cases where multiple air purification units 50 are included within the HVAC unit 10, transition ducts 204 and/or 212 may be provided and can be configured to be much larger so as to accommodate one or more of the air purification units 50. Additionally, the units may include one or more filter units, such as a Pre- or Post-Filter, e.g., MERV filter 11 or greater, which may be positioned at 204 or 205 or 207 and may contain a media filter. The general filter media may be a MERV 11 or MERV 13, but may be a lesser or higher density filter, and may include HEPA filters. The purpose of such media filters is to stop the bulk of the physical particulates in the air.

As indicated with respect to FIG. 2B, the air purification system 50, may contain one or more photocatalytic oxidation (PCO) chambers that may be positioned at different locations within the HVAC unit, such as at 203 and 206, or 204 and 207, or 206 and 208, or even 209 or 210 and 211 or 212, or any positions there between. The purpose of the PCO chambers is to deactivate viruses, bacteria, and mold as well as to break down volatile organic compounds (VOC's) in the air-stream. The post filter may typically be positioned at 209 or 210, and may include a chamber that can have different types of post filter media such as a potassium permanganate filter, carbon filter, or other specialty filter to provide additional filtration options for the air purification system.

A power sensor/relay 211 may also be provided and can both detect power from the unit and turn the unit on or off as desired including from instructions from system wireless communications hub 57 and/or Internet/Cloud Service and/or from detecting poor air quality from IAQ sensor cluster 214 via a control signal sent through control wire to power relay 215. It may also be controlled and turned on or off from the thermostat 216, via thermostat wire 217. It may also be controlled with an air blower controller/wireless fan controller 220, which may be located between the alternate air blower controller and thermostat 216 and the air purification system 50, e.g., by a signal sent down to the system over an alternate air blower controller— thermostat wire 219. This alternate control scenario allows for an alternate air blower controller scenario—wireless fan controller 220 to supersede commands from the thermostat and allow for on and off control based on energy efficiency, e.g., determined real-time by the system AI, such as based on data collected by the sensor clusters in the system that might detect poor air quality triggering the air purification system 50 to turn on/off. The additional system air handler/fan 216 is an optional booster fan to provide additional air flow and ventilation if the main air handler needs assistance to blow air through the air purification system 50.

For example, in one embodiment of the system, the ability to collect and measure viruses in an HVAC system with normal HVAC operating air velocities and CFM (cubic feet per minute) airflows was tested. For purposes of this embodiment, it was assumed that the collection and measurement was a standard air flow found within a traditional HVAC system such as 280-400 CFM per ton, as opposed to normal ambient room conditions. The tonnage was not as important as it can be scaled to any sized HVAC system on a 280-400 cfm per ton basis. 400 cfm/ton is a common standard for determining 'standard air conditions and air volumes' whereas 280 cfm is a typical level found reflecting less than ideal ventilation air flow. The primary purpose of this embodiment was to collect and measure the viruses for airborne transmission research.

Traditionally, collecting viruses and measuring them has been extremely challenging from both a bio-safety and measurement perspective. With respect to measuring the viruses and particulate data, the challenge is that most particulate metering devices can only measure at 1 to 3.5 cfm or 100 liters/minute or less. This embodiment overcomes these challenges with deploying custom shrouded isokinetic tubes that allows the air aerosolized with viruses or bacteria to pass through but at substantially slower air velocities.

The Custom shrouded tubes slow the captured air down to under 3.5 cfm so that the particulate sensors can measure the air and with a separate shrouded tube for virus capture, can capture any aerosolized virus for determining pfu's (plaque forming units), qPCR (Quantitative polymerase chain reaction detection, $TCID_{50}$ or other virus measurement assay.) The shrouded tubes are used in conjunction with a collection chamber that allows the air to pass through the collection chamber and feeds back into the duct system. If the infectious virus is dangerous, it is required to be tested and measured in a biosafety lab of either level 2, 3, or 4. The more dangerous the virus to humans, the higher the level of lab required to contain and conduct research on it. The novel Coronovirus SARS-CoV2 (COVID-19) currently requires a Level 3 bio-safety lab. If the virus or other biological is dangerous, it will also require the system to be air-tight and contain the aerosolized virus becoming the primary container.

In this instance, a special closed system embodiment of the system was used to collect and measure SARS-CoV2 while proving the air purification of the system was capable of deactivating the virus. Two shrouded sample tubes were used to measure particulates at the point of nebulizing and at the point of virus collection. The particulate measurement sensors are capable of measuring down to 0.3 microns and collected statistics which were binned and collected together in 0.3-0.5 micron, 1.0 micron, 2.5 micron, 4 micron and 10 micron size categories. Additional particulate mass numbers and average sizes are also collected. All particulate data is collected in 1 second increments and measured over the multi-pass or single pass duration term. A third shrouded tube was used at the point of virus collection for sampling the virus for qPCR analysis. The shrouded tube was connected to a 47 mm filter chamber with a PTFE 47 mm hydrophobic 0.2 micron filter for collection.

A different sized filter may also be utilized. Also different mediums besides the PTFE were tested and can also be used including Polycarbonate, Polyester and Polyethersulfone of both hydrophobic and hydrophilic properties and different micron sizes. Two PTFE filters for duplicate testing were also used directly within the HVAC ducting system post filtration to collect virus sampling for CPE analysis. An internal reducing transition duct was used to focus the air for capture. Different sized transition ducts can be used depending on conditions desired.

The special closed system embodiment allows for testing all of the various embodiments of air purification including single, double, triple and quadruple PCO chamber configurations with and without MERV filter media as well as the portable and HDAZ engine-based product versions all in a multi-pass configuration. A single pass version of the system allows for breaking the system loop and allowing air intake from the lab and exhaust either through a direct connection to lab exhaust or through exhausting through a HEPA filter into the negative pressure BSL Level-3 lab room which is then exhausted through the lab room's additional HEPA filter.

The special closed system may include a triple nozzle nebulizing system with separate compressors and pressures for both the liquid and air line along with controllable solenoid valves to control the release of viral material. Simulated saliva with mucin is utilized along with the viral solution for simulating human aspiration. The triple nozzles were used to simulate a large gathering of humans within an indoor environment. The system can be used to test and measure a multitude of biologicals and different aerosolized conditions.

Accordingly, in various embodiments, the HVAC system and unit may include one or more particulate probes, such as positioned at the beginning, e.g., opening, of the HVAC unit and/or positioned at the egress or exit of the HVAC unit. The unit may also include a virus collection and sample location and/or filter. A plurality of filtration units may also be provided, such as in line with the air flow. One or more nebulizers may also be included.

Figure 9:
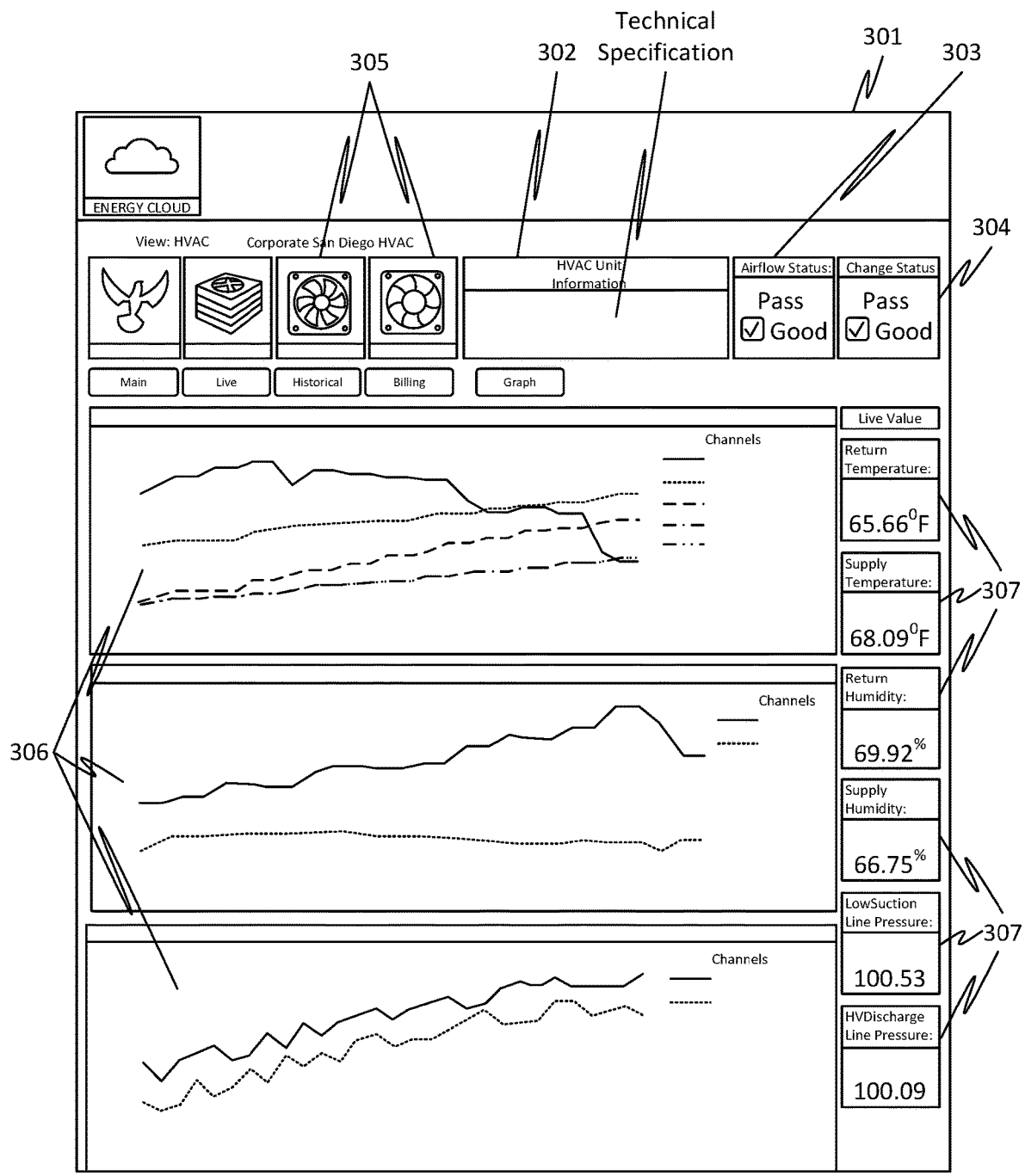
FIG. 9 is a representation of a graphical user interface presenting a status of the system functioning.

As can be seen with respect to FIG. 9, a web page and/or display generated by a downloadable application running on a mobile computing device, e.g., smart phone, for configuring and/or controlling an HVAC and/or air purification system of the disclosure is presented, whereby live data of the operations of the HVAC and/or air purification systems may be viewed and monitored. For instance, as depicted the web page 301 presents an HVAC Live Data View that displays operational data for the HVAC 302. Particularly, the webpage displays the air flow status 303, charge status 304, presents the fan status in visual indicators 305, including live graphs 306 and sensor values 307.

More particularly, the HVAC/air purification webpage 301 presents a live data view 301 from a single or multiple HVAC/air purification systems being monitored. The web page, or other data screen, may be generated by an application or associated processing unit running on a computing device coupled therewith, whereby the display presents HVAC/purification information 302, which may list specific details of the HVAC and/or air purification systems including model #, serial #, manufacture, manufacture date, tonnage, metering type, refrigerant type, voltage, watt usage, altitude, among other details. The webpage shows the health of the HVAC and/or air purification systems along with live data the characterizes the same. For instance, the air flow status 303 shows and ranks the air flow, such as characterizing whether the air flow is in good condition, or has potential issues, or is not operating well. The charge status 304 may also be presented and shows whether the HVAC charge is in good condition, or has potential issues, or is not operating well. Further, the fan status visual indicators 307 may be presented and show whether the air handler fan and/or the compressor fans are running or not, such as by an animated graphic of each fan.

Likewise, the live graphs 5, shows live data from different aspects of the HVAC and/or air purification systems, which may include return and supply temperature, wet bulb temperature, return and supply humidity, refrigerant temperatures, refrigerant pressures, and the like. Particularly, these graphs show data measurements over a selected time period, such as 5, 15, 30, 60, 120 minutes, and may update based on the frequency measurement chosen for the HVAC/air purification unit, e.g., every 15 seconds, 30 seconds, 1 minute, and the like. These graphs can also be viewed to see last hour, last 24 hours, as well as weekly, monthly, and yearly views. Live IAQ sensor values 206, may also be presented and configured to show the exact current measurement for each sensor and may be updated based on the frequency measurement selected, e.g., every 15 seconds, 30 seconds, 1 minute, and the like.

FIG. 10 shows another display, such as at a dashboard interface, which can be presented on a client computing device and/or via an application running on a mobile computing device, such as a smart phone. In this instance, the interface presents a set up and configuration page 300, having a plurality of sections. For instance, at section 401, the customer's name and location can be assigned. At sections 402 and 403, a summary of the operations of the HVAC and/or air purification system (APS) may be presented, such as where the HVAC and/or APS operating hours and essential identification and type information may be displayed. Section 404 presents the power information, and sections 405 and 306 presents a commission and page header screen.

For example, the commission webpage 400 includes an HVAC/APS commission screen 305, which is useful for setting up the systems and is completed for each HVAC and/or APS unit. The webpage 400 includes a page header and commission screen 306, identifying the page. Information can be entered from any Internet accessible client computer, tablet, or mobile computing device. Each section may be filled out by the user and may additionally present a user interview so as to walk a user though the setup process for configuring the system apparatuses and determining their operational parameters. Hence, each interface has prompts whereby useful information related that particular HVAC and/or APS unit may be entered, and when the HVAC/APS systems are monitored, e.g., by the system and/or a second party, some of this specific data will be auto entered into calculations and will affect tables of information that can be used in calculations, e.g., by one or more users of the system and/or by the system AI.

As depicted, there are 4 main sections of the HVAC/APS commissioning screens. For instance, section 401 presents prompts for entering a customer name and location, this is useful for assigning a particular HVAC/APS system to a customer and location. This is relevant to online security by which users can access the HVAC/APS system in the online cloud platform. For example, besides the customer identification information, the user might grant additionally access capabilities, such as to their systems to their HVAC Maintenance company.

Section 402 presents prompts for determining and/or displaying the operating hours, conditions, and/or efficiencies achieved or not achieved during operations. Particularly, section 402 the HVAC/APS Operating Hours Web Page sets the operating hours that the user and/or manufacturer says the system should operate within. This is useful in scheduling when a system should operate, when the system is given control of operating the HVAC and/or APS units, and or sending control information to a thermostat associated with controlling the unit. It is also useful in finding HVAC units that waste energy due to being on when they shouldn't when the system is just monitoring the HVAC units.

Likewise, section 403 provides a display section whereby the HVAC/APS type and identification information may be displayed, which information may include a multitude of data including HVAC/APS make model and serial no. may be presented and/or entered into the system, and is important to program and link the local smart hardware to a specific HVAC/APS unit. It also has aspects that change which reports and calculations are applicable to the determined type of system. For example, TXV or Fixed Orifice metering types can affect which reports are applied to the system. Additionally, the refrigerant type is very important data to have and is useful for applying the correct tables of data and calculations that are applicable to optimally running the HVAC/APS systems, and for determining optimal usage parameters and efficiencies. Further, tonnage and BTU output data may be presented, and may be used to compare to actual measured enthalpy to see how well the system is doing from an efficiency perspective compared to its manufactured specifications. Manufacture, make and model can also be useful in aggregating and measuring the performance of similar units as well as comparing similar sized models of different manufacturers. The manufacture data is useful for indicating to relevant parties when the end of life might be approaching for a particular unit and in measuring system performance over time.

At section 404 the power consumption and efficiency information may be determined and provided for review by the user. For instance, the HVAC/APS power information provides for determining and/or entering power related information for models where power sensors may not be included. While direct measurement with sensors is useful, this allows for another methodology by which power may be measured in an approximate aspect, such as by comparing the measured values the technician takes when commissioning the system and calculating power usage by applying these measured values to measured run-time that the system tracks through data collection. The fields may include taking measurements separately for the Fan and Compressor and/or other components, and for multiple modes of operation including fan only, cooling, and heating, and the like. Volts may be entered for the whole system and what type of phase power it uses such as either in amps or watt measurements. A power factor may also be entered which may apply to the power calculations for systems that use these measurements, and are not direct measuring from current transformers. In this instance, it may be noted whether direct measurements were taken or whether the data was entered from a specification sheet.

Figure 11:
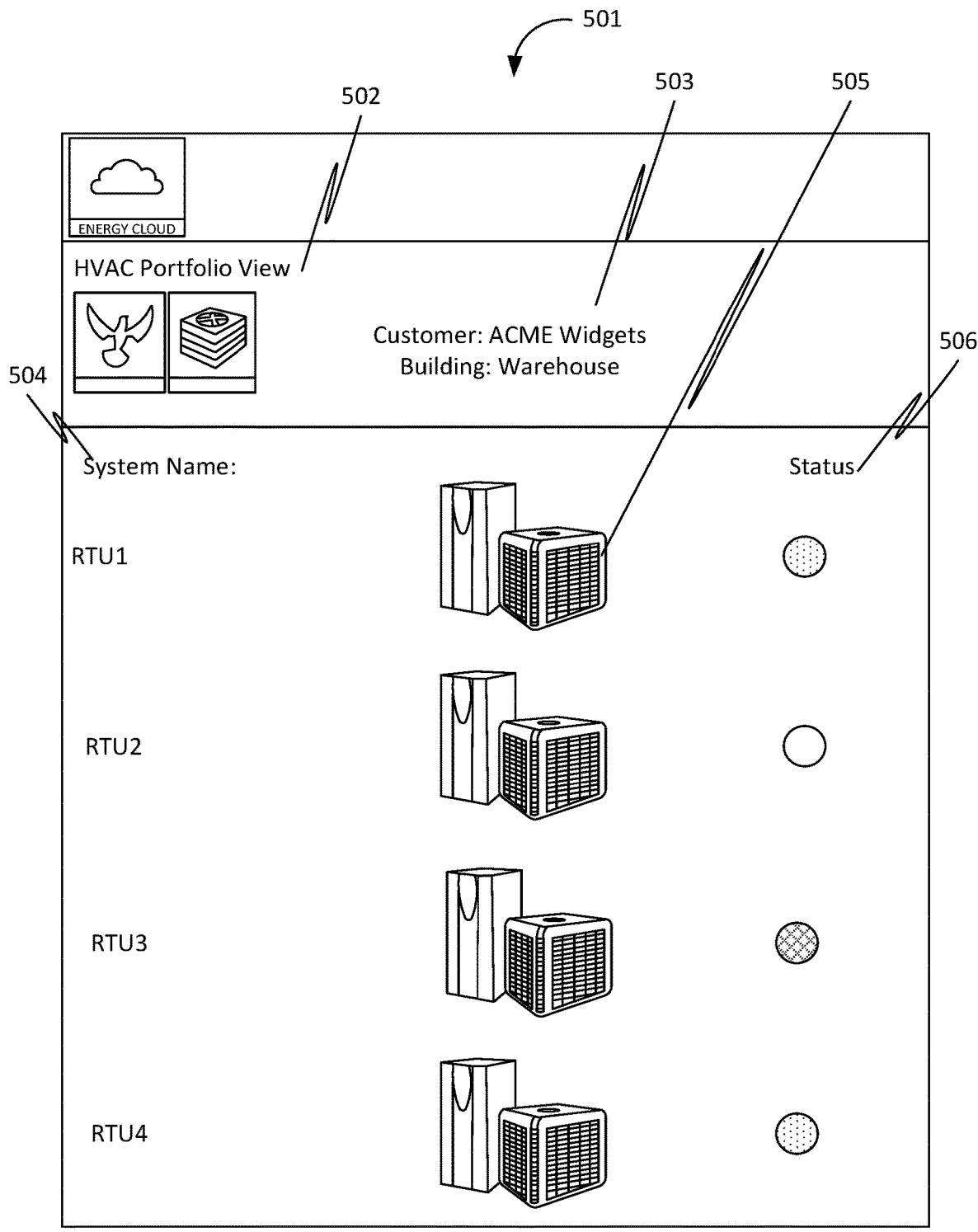
FIG. 11 is a graphical user interface showing a status of a plurality of units of the system.

FIG. 11 presents another screen generated and/or accessible via a webpage or application running on a client computing device and/or mobile smart phone. For instance, as depicted, an interface screen for configuring, monitoring, and controlling one or more HVAC and/or APS units is provided. In this instance, several, e.g., 4, units are grouped into a cluster and are being configured, monitored, and controlled collectively together, although, in certain instances, each individual unit can be controlled individually and separately. Accordingly, presented at FIG. 11 is a screen, e.g., a webpage, for an overview of multiple systems that are being monitored and controlled from the single interface. Section 502 provides a page header, section 503 provides the customer information, section 504 and 505 provide each particular HVAC/APS system name and type, and at section 505, the status, e.g., green, yellow, red is provided.

Particularly, FIG. 11 represents a web page displaying a portfolio of HVAC/APS units and their overall health with easy to identify HVAC Statuses: Green/Good, Yellow/Warning, Red/Problem indicators. The units are grouped by customer name and building identifier 403. The HVAC system name or identifier may be listed prior or subsequent to each HVAC/APS unit. The HVAC/APS type 405 may be listed after the name with a visual picture of the system. The page may also have a page header 402 that changes based on the screen display. In the FIG. 11a portfolio view is presented.

In various embodiments, the system is configured for not only performing data analysis, but also for deriving one or more conclusions based on those analyses, and for generating a report with respect thereto. Specifically, the present system has the ability to report on many facets of the various sub-stems of the present intelligent HVAC and air purification systems, such as one or more associated HVAC/APS sub-systems, including temperature, humidity, temperature splits, super heating/sub-cooling, static pressure, CFM, filter status, and BTU's of delivered performance, such as depending on the model. In such instances, the generated reports and live data can be viewed from any Internet accessible computer, smart phone, or tablet.

Figure 12:
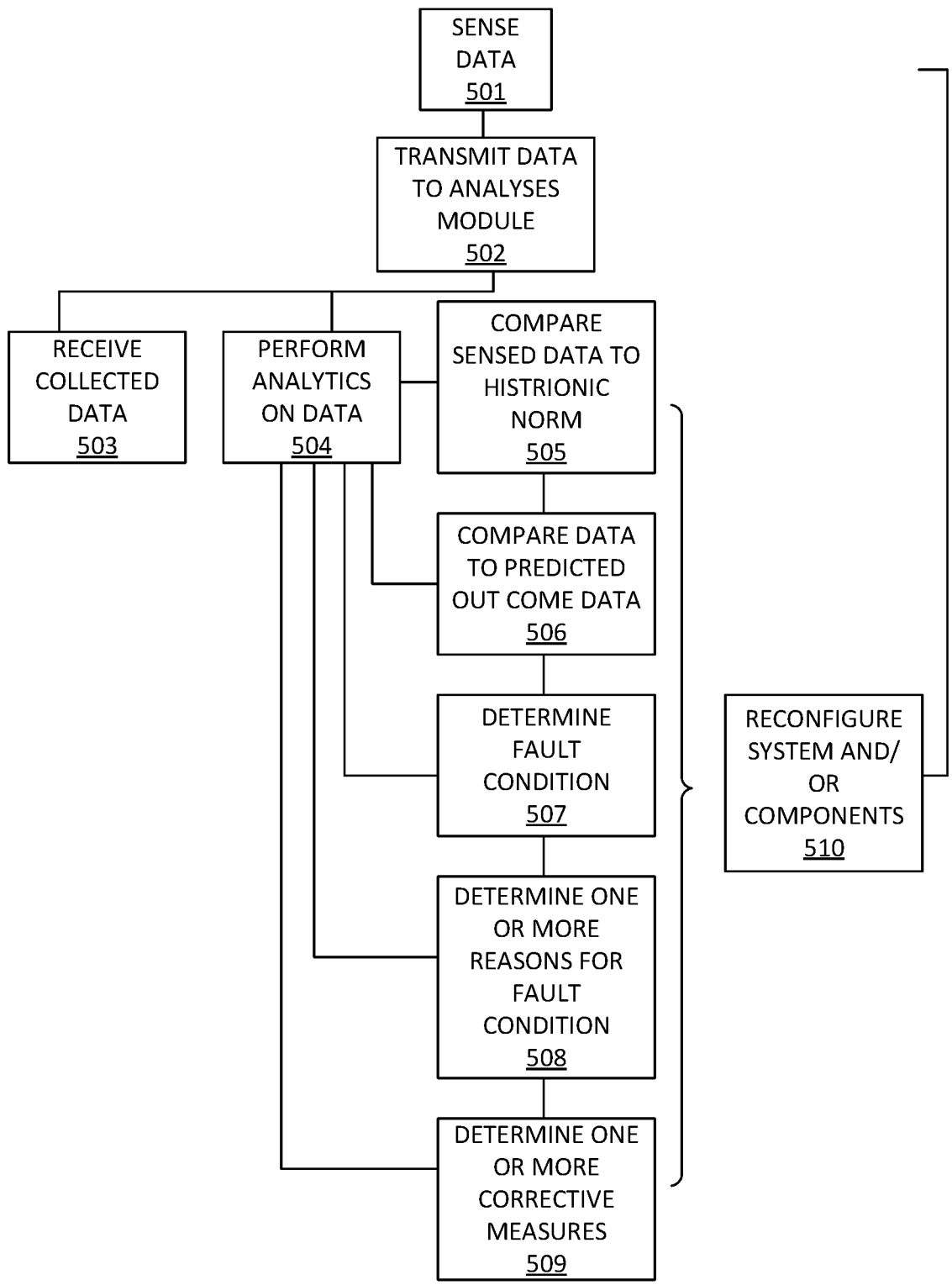
FIG. 12 is a schematic representation of an exemplary method of the disclosure.

As indicated above, an aspect of the disclosure is a method of employing one or more of indoor air quality systems 20, an HVAC system 10, an air purification system 50, as well as an analytics module 42 for the purpose of conditioning and/or purifying the air in an environment. For instance, as depicted in FIG. 12, various methods of the disclosure may include performing a number of steps in pursuit of one or more of the objectives set forth herein, such as for purifying and maintaining healthy air in a safe environment. For instance, the method may include a first step of providing one or more of an HVAC unit 10, indoor/outdoor air quality sensors, and associating the IAQ sensors 20 with the HVAC unit 10, whereby the sensors 20 are configured for measuring a condition of air in an indoor and/or outdoor space so as to generate sensed data 501.

Further, the method may include employing the sensors to collect or receive collected data 503 and then transmit that data 502 to a file storage 44 and/or analytics device 42 of the system 1, which analytics device 42 may then perform one or more analytic operations on the data 504 so as to achieve one or more analytical results thereof. For example, the analytics module 42 may be configured to perform one or more logical operations on the collected data, such as to perform one or more of: comparing sensed and/or collected data to a determined or determinable historic norm 505 and/or generating a prediction or comparing the collected data, e.g., operational data, to data pertaining to a predicted outcome 506 so as to determine if a fault condition is present 507, and if so, the reasons for why the fault condition may be present 508. If a fault condition is present then the method may include determining one or more corrective measures that may be taken to account for or correct the fault condition 509 such as by reconfiguring the system and/or its component parts 510 in a manner that purifies air within an environment in an efficient manner.

One or more of the aforementioned method steps may be performed autonomously by the system itself, or one or more component parts thereof, or by a system administrator charged with overseeing the conditions of one or more environments in a building or facility of buildings. For instance, in various embodiments, provided herein are method steps for generating a purified environment that may be personalized to one or more selected characteristics of individuals inhabiting that environment whereby one or more of the following steps are configured for being implemented by one or more computers, such as where the computer implemented method includes one or more of the following steps.

First, the method may include generating, at a first client computer device, an ideal environment builder, the environment builder is configured for providing a first graphical user interface to the first client computing device via a network connection for display by the first client computing device, whereby a user of the client computing device can use the environmental builder module for configuring one or more conditions of an environment in which they or others are to inhabit. Second, the method may include generating, at the first graphical user interface, an intuitive client interview including one or more questions or interrogatories that are configured for eliciting one or more responses from the individual using the client computing device, such as where the one or more responses are to be used, e.g., by the computer and/or a server associated therewith, to determine one or more environmental and/or personal characteristics to be maintained within the environment they are to inhabit.

Next, the method may include receiving at the client computing device and/or an associated server, e.g., via a network, hardwired or wireless connection, the responses from the individual entered at the interactive dashboard, so as to then employ, e.g., by the client computing device or associated remote server, the received responses in order to create a personalized environmental characteristic profile for the individual and/or the one or more environments they inhabit. This environmental characteristic profile for the first environment, which may be generated by the AI of the system, may then be used to generate an optimal environmental condition system profile that is designed to set various parameters of the particular environmental equipment that are to be employed in generating and/or otherwise configuring the optimal conditions of the first environment.

Specifically, the environmental profile condition may then be used to access one or more searchable libraries, such as of a structured database, so as to identify and retrieve data pertaining to one or more identified characteristic of the various apparatuses of the system as well as their optimal operational conditions that may be pertinent to configuring the various set points of the apparatuses for providing the conditional parameters selected by the first individual. Accordingly, once identified the environmental characteristic conditions can be implemented, and the current ambient conditions can be determined and analyzed, and an environmental condition profile for the first environment can then be generated and employed so as to access one or more searchable libraries in order to identify one or more system components that can be brought online and/or the functioning of which can be manipulated so as to generate the identified characteristic conditions that are pertinent to the first environment.

As indicated, in various embodiments, the system itself may be configured for implementing one or more of the aforementioned method steps, or one or more individuals, such as a first and/or a second individual, may employ an accessible client computing device to perform various of the described method steps. For instance, the computer implemented methods disclosed herein may include a first and/or second individual, such as where the second individual may be a third-party monitor, accessing, e.g., at a client computer device, the environment of the first individual, the HVAC and air purification systems servicing that environment, their component parts, and their conditions. In such an instance, the first and second individual may access the system and configure it via a dashboard interface of a client or mobile computing device, such as where the system walks the user through an environment building process for the purpose of building a desired environment.

For example, in building an environment having desired characteristics and conditions, an environment builder interface may be generated by a server of the system, and may be presented at a display of a user's client or mobile computing device, such as via an application running thereon. The project builder may be configured for providing a first graphical user interface to a first individual, e.g., user, occupying the space, and further for providing a second graphical user interface to the second client computing device, e.g., via a network connection, for display thereby, a second dashboard for presentation via the second display to the second user who is monitoring that environment as well as the present systems that are functioning to regulate the air in that environment.

In such an instance, the first and second dashboard interfaces may be configured for presenting one or more controls to the individuals for the purpose of allowing each individual to participate in performing one or more tasks in generating the personalized environmental conditions. Particularly, in this instance, the method may include the first and/or second individual utilizing the controls of the dashboard so as to monitor one or more environments and/or select one or more questions or interrogatories that are to be included in an interactive and intuitive client interview to be presented to individuals with respect to selecting the parameters of the conditions to be implemented in the environment they are to occupy.

Next, the method may include evaluating, e.g., by the second individual, e.g., using the client computing device, or by the AI of the system, the received responses from the first individual in response to the client interview so as to produce evaluated responses for the first individual with respect to the selected environmental and/or personal conditions and which may be used to determine one or more of their wellness goals and/or one or more of their conditions that may be significant in determining the environmental conditions in which they are to inhabit. Accordingly, the second individual may then use the dashboard interface to employ the one or more characteristics of the first individual so as to define and produce an individualistic characteristic profile for the individual as well as a characteristic environmental condition profile that may be used to determine the optimal environmental conditions for that individual, and with this information, the AI of the system may determine appropriate configurations for the systems components and when and how and where they are to be configured for producing an environment having the desired characteristics.

Accordingly, in view of the above, in one aspect the present disclosure is directed to a system for generating an optimized environmental condition, which in various embodiments, may be personalized to one or more personal characteristics of one or more individuals inhabiting that environment. In various embodiments, the system may include one or more of a structured database, one or more client computing devices, and one or more server systems. For instance, the system for generating the personalized environmental condition may include a structured database, such as a structured database that includes one or more searchable libraries, for example, a database wherein at least one library contains data files pertaining to one or more, e.g., a plurality, of optimal operational parameters of the devices of the system for producing the desired environmental conditions, and another library that includes a description for one or more, e.g., a plurality of environmental and/or user health conditions.

Further, in various embodiments, the system may include a client computing device having a display coupled therewith, such as for displaying a graphical user interface that is generated by one or more of the client computing device and/or a server associated therewith. For example, in a particular embodiment, an environment in need of monitoring, conditioning, and/or maintenance may be defined, its conditions determined, and an ideal environmental condition for one or more inhabitants thereof may be determined. Accordingly, a user, such as a system administrator, may engage the user interface of the client computing device for the purpose of defining one or more environmental objectives and/or conditions that may be useful for achieving one or more wellness goals of one or more individuals that are to inhabit that environment.

Particularly, an individual, e.g., system administrator, may access one or more controls of an interactive dashboard presented at the graphical user interface so as to participate in an environmental and/or personal condition interview, whereby the individual's response to one or more intuitive interview questions may be collected by the system and analyzed thereby so as to determine an optimal condition for an environment, such as with respect to the personal characteristics of one or more persons to inhabit that environment. For instance, the GUI presented at the display of the client computing device may be configured for displaying a list of interview questions and/or environmental condition characteristics to the user, for receiving, such as via one or more controls of a dashboard interface, the individual's responses, selections, and/or instructions to the interview questions, which once received the responses may then be transmitted, such as by a suitably configured communications module to an associated server system.

The system, therefore, may include a server system, such as a server that is connected to one or both of the database and the client computing device via a network connection. Particularly, in various implementations, the server system may be configured for generating an environment builder module, which environment builder may be adapted for providing the referenced graphical user interface to the client computing device for local display thereby. More particularly, in certain instances, the client computing device may be used by a system administrator for generating and/or selecting operational parameters for configuring the various environment conditioning apparatuses of the system. However, in particular instances, the server system may be employed, or otherwise configured to autonomously generate the conditions, such as in an intuitive manner.

Embodiments of the disclosure and all of the functional operations described in this specification can be implemented in digital electronic circuitry, or in computer software, firmware, or hardware, including the structures disclosed in this specification and their structural equivalents, or in combinations of them. Embodiments of the disclosure can be implemented as one or more computer program products, e.g., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processor" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a mobile application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer.

Generally, a processor will receive instructions and data from a read only memory or a random-access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks. Moreover, a computer can be embedded in another device, e.g., a mobile telephone, a personal digital assistant (PDA), a mobile audio player, a Global Positioning System (GPS) receiver, to name just a few.

Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the disclosure can be implemented on a computer having a display device, e.g., a capacitive sensing touch screen device, including a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back end, middleware, or front-end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object-oriented databases, and for databases having records with complex attribute structures, e.g., object oriented programming objects or markup language documents. The processes described may be implemented by applications specifically performing archiving and retrieval functions or embedded within other applications.

Although a few embodiments have been described in detail above, other modifications are possible. Other embodiments may be within the scope of the following claims.

The invention claimed is:

1. A system for monitoring and purifying air quality of the air traversing an air purification module, the system comprising:
 an intelligent heating, ventilation, and air conditioning (HVAC) unit for efficiently purifying air of a compartmentalized environment in a manner that conserves enthalpy, the HVAC unit comprising:
  ducting for receiving a first amount of air from the compartmentalized environment, and for directing a second amount of air to the compartmentalized environment, where the second amount of air differs from the first amount of air by being either warmed or cooled with respect thereto;
  an air conditioner having refrigerant contained within tubing of one or more copper coils, the air conditioner being coupled to the ducting and for removing heat from air traversing through the ducting by transferring the heat into the refrigerant converting it from a cooled refrigerant to a warmed refrigerant;
  a compressor, coupled to the copper coils of the air conditioner, and configured for compressing the warmed refrigerant into a warm pressurized refrigerant, the compressor further configured for moving the warmed pressurized refrigerant throughout the copper coils;

a condenser, coupled to one or more of the copper coils and the compressor, the condenser for removing heat from the warm pressurized refrigerant to produce a cooled pressurized refrigerant;

a thermal expansion valve, coupled to the compressor, and configured for opening and closing so as to thereby release pressure from within the copper coils and thereby convert the cooled pressurized refrigerant into a cooled refrigerant, and an air handler coupled to the ducting, the air handler for withdrawing the first amount of air from the compartmentalized environment, and for supplying the second amount of air to the compartmentalized environment;

an air purification module for clarifying the air traversing through the air purification module of at least 99.9% of viruses, the air purification module being positioned proximate the ducting of the HVAC and having at least three photocatalytic oxidization chambers, each photocatalytic oxidization chamber including a plurality of air purification elements configured for generating a photocatalytic oxidation reaction, the air purification elements comprising:

two or more UVC LED light sources, each UVC LED light source being linearly spaced apart from one another so as to create each photocatalytic oxidation chamber therebetween within the air purification module, and configured for generating a UVC light; and a plurality of (photocatalytic oxidation cell panels, each photocatalytic oxidation cell panel being formed of a mesh grid and including a plurality of photocatalytic oxidation cells and being positioned within each photocatalytic oxidation chamber so as to be proximate at least one UVC LED light source such that the generated UVC light shines on the plurality of PCO photocatalytic oxidation cells thereby producing a photocatalytic oxidation reaction that results in the production of activating agents that function for clarifying air of viruses as the air passes through the photocatalytic oxidation cell panel;

a plurality of high efficiency particulate filters for trapping small particulate matter including a pre- and a post filter, the prefilter being positioned linearly prior to the at least three photocatalytic oxidation chambers, and the post filter being positioned linearly post the at least three photocatalytic oxidation chambers; and a virus sensor positioned linearly after the post filter, the virus sensor for determining sensed virus data and measuring a reduction in virus levels in the air.

2. The system in accordance with claim 1, further comprising a smart air quality sensing module coupled to the HVAC unit, the smart air quality module including one or more other non-virus sensors configured for monitoring one or more air quality conditions within the HVAC unit so as to produce sensed air quality data, the smart air quality sensing module including a communications module for transmitting the sensed air quality data via a network connection.

3. The system in accordance with claim 2, wherein the one or more other non-virus sensors comprise a plurality of sensors including an interior HVAC sensor positioned within the HVAC ducting and configured for determining a condition of air traversing within the HVAC unit, and an exterior sensor configured for measuring one or more conditions on the environment exterior to the HVAC unit.

4. The system in accordance with claim 3, further comprising an air quality cloud processing server communicably coupled to one or more of the smart air quality sensing module and the HVAC unit via the network connection, the air quality cloud processing server comprising:

a first processing engine for receiving the sensed virus data and sensed air quality data;

a second processing engine for analyzing the sensed virus data and sensed air quality data so as to determine a level of air clarification;

a third processing engine for employing the level of air clarification so as to generate a certification of air quality, the certification corresponding to the level of air clarification.

5. The system in accordance with claim 4, further comprising a fourth processing engine for generating a QR Code, the QR Code indicating the air quality certification.

6. The system in accordance with claim 5, wherein the QR code, when engaged with by a client computing device pulls up a website on a display of the client computing device, the website setting forth the air quality data and the air quality certification.

7. The system in accordance with claim 6, further comprising an analytics module, wherein the analytics module is configured for receiving the air quality data from the air quality cloud processing server, and for analyzing the received air quality data so as to determine an overall air quality condition, and in response to the determined overall air quality condition generating instructions for reconfiguring one or more system components.

8. A system for monitoring and purifying air quality, the system comprising:

an intelligent heating, ventilation, and air conditioning (HVAC) unit for efficiently purifying air of a compartmentalized space in a manner that conserves enthalpy, the HVAC unit including one or more air purification modules having a plurality of treatment zones, each air purification module being configured for clarifying the air traversing through the air purification module of at least 99.9% of viruses, each treatment zone of each air purification module comprising:

one or more high efficiency particulate filters for trapping small particulate matter;

two or more UVC LEDs light sources, each UVC LED light source being positioned within the air purification module and spaced apart from one another so as to form each treatment zone therebetween, each UVC LED light source being configured for generating a UV light for neutralizing airborne viruses and microbes;

a plurality of photocatalytic oxidation cell panels including a plurality of (photocatalytic oxidation cells and being positioned proximate at least one UVC LED light source such that the generated UVC light shines on the plurality of photocatalytic oxidation cells thereby producing a photocatalytic oxidation reaction that results in the production of activating agents that function for clarifying air of airborne viruses, microbes, and volatile organic compounds as the air passes through each of the photocatalytic oxidation cell panels; and at least one pre or post filters for removing particulate matter from the air;

a smart air quality sensing module coupled to the air purification module, the smart air quality module including one or more sensors configured for monitoring one or more air quality conditions within the HVAC unit so as to produce sensed air quality data, at least one of the one or more sensors including a virus sensor positioned linearly posterior to the photocatalytic oxidation cell panel of a last treatment zone, the virus sensor for measuring a reduction in virus levels in the air thereby producing virus data; and a communications module for transmitting the sensed air quality data via a network connection.

9. The system in accordance with claim 8, further comprising an air quality cloud processing server communicably coupled to the smart air quality sensing module via the network connection, the air quality cloud processing server comprising:
a first processing engine for receiving the sensed air quality data, the air quality data including virus data, the air quality data including one or more air quality conditions;
a second processing engine for analyzing the sensed air quality data so as to determine a level of air clarification; and
a third processing engine for employing the level of air clarification so as to generate a certification of air quality, the certification corresponding to the level of air clarification.

10. The system in accordance with claim 9, further comprising an analytics module, coupled to one or more of the air quality cloud processing server and the smart air quality sensing module, the analytics module being configured for receiving the sensed air quality data from the smart air quality sensing module, and for analyzing the received sensed air quality data so as to determine an efficiency of reduction of one or more viruses within the air traversing through the air purification module.

11. The system in accordance with claim 9, further comprising a fourth processing engine for generating a QR Code, the QR Code indicating the air quality certification.

12. The system in accordance with claim 11, wherein the QR code, when engaged with pulls up a website on a user device, the website setting forth the air quality data and the air quality certification.

13. The system in accordance with claim 12, wherein the level of air clarification is determined based on one or more government air quality codes or standards.

14. The system in accordance with claim 13, wherein each treatment zone further includes a refractive flap positioned proximate each UVC LED light source, and configured for modulating air flow through the treatment zone.

15. A system for monitoring and purifying air quality, the system comprising:
an intelligent heating, ventilation, and air conditioning (HVAC) unit for efficiently purifying air of a compartmentalized space in a manner that conserves enthalpy;
one or more air purification modules coupled to the HVAC unit and configured for clarifying the air traversing through the air purification module of at least 99.9% of viruses, each air purification module having a plurality of photocatalytic chambers, each photocatalytic oxidization chamber forming a viral clarification treatment zone, each photocatalytic oxidization chamber comprising:
one or more high efficiency particulate pre-filters for trapping small particulate matter;
two or more UVC LED light sources being linearly spaced apart from one another to form the viral clarification treatment zones configured for neutralizing the viruses;
a plurality of photocatalytic oxidation cell panels, each photocatalytic oxidation cell panel being formed of a mesh grid of photocatalytic oxidation cells and being positioned within each photocatalytic chamber so as to be proximate at least one UVC LED light source such that the generated UVC light shines on the plurality of photocatalytic oxidation cells thereby producing a photocatalytic oxidation reaction that results in the production of activating agents that function for clarifying air of viruses, microbes, and volatile organic compounds as the air passes through the photocatalytic oxidation cell panel; and
at least one post filter for further removing particulate matter from the air;
a smart air quality sensing module coupled to at least one of the one or more air purification modules, the smart air quality sensing module including one or more sensors configured for monitoring one or more air quality conditions within the HVAC unit so as to produce sensed air quality data, at least one of the one or more sensors including a virus sensor positioned linearly after the post filter of a last air purification module, the virus sensor for measuring a different in virus levels in the air as it passes through the air purification module, the sensed air quality data including virus level data;
a communications module for transmitting the sensed air quality data via a network connection; and
an air quality cloud processing server communicably coupled to one or more of the air purification module and the smart air quality sensing module via the network connection, the air quality cloud processing server for receiving the sensed air quality data from the smart air quality sensing module, and for analyzing the received sensed air quality data so as to determine an overall air quality.

16. The system in accordance with claim 15, wherein the air quality cloud processing server further comprises:
a first processing engine for receiving the sensed air quality data;
a second processing engine for analyzing the sensed air quality data so as to determine a level of air clarification;
a third processing engine for employing the level of air clarification so as to generate a certification of overall air quality, the certification corresponding to the level of air clarification.

17. The system in accordance with claim 16, further comprising an analytics module, coupled to one or more of the air quality cloud processing server and the smart air quality sensing module, the analytics module being configured for receiving the sensed air quality data from the smart air quality sensing module, and for analyzing the received sensed air quality data so as to determine an efficiency of reduction of one or more viruses within the air traversing through the air purification module.

18. The system in accordance with claim 16, further comprising a fourth processing engine for generating a QR Code, the QR Code indicating the air quality certification.

19. The system in accordance with claim 18, wherein the QR code, when engaged with pulls up a website on a user device, the website setting forth the air quality data and the air quality certification.

20. The system in accordance with claim 19, wherein the level of air clarification is determined based on one or more government air quality codes or standards.

* * * * *